United States Patent
Scopel

(10) Patent No.: US 12,465,873 B1
(45) Date of Patent: Nov. 11, 2025

(54) TOY AIRPORT APPARATUS AND METHOD

(71) Applicant: Gregory Scopel, Cary, NC (US)

(72) Inventor: Gregory Scopel, Cary, NC (US)

( * ) Notice: Subject to any disclaimer, the term of this patent is extended or adjusted under 35 U.S.C. 154(b) by 0 days.

(21) Appl. No.: 15/731,756

(22) Filed: Jul. 29, 2017

Related U.S. Application Data

(60) Provisional application No. 62/494,170, filed on Jul. 30, 2016.

(51) Int. Cl.
*A63H 33/42* (2006.01)
*A63H 18/00* (2006.01)
(Continued)

(52) U.S. Cl.
CPC .............. *A63H 33/42* (2013.01); *A63H 18/00* (2013.01); *A63H 30/04* (2013.01); *A63H 27/00* (2013.01)

(58) Field of Classification Search
CPC ........ A63H 33/42; A63H 27/00; A63H 18/00; A63H 19/36
See application file for complete search history.

(56) References Cited

U.S. PATENT DOCUMENTS

| | | |
|---|---|---|
| 2,899,910 A | 8/1959 | Vivari |
| 3,716,940 A * | 2/1973 | Bosley et al. ......... A63H 33/30 446/228 |

(Continued)

FOREIGN PATENT DOCUMENTS

| | | | | |
|---|---|---|---|---|
| EP | 2272576 A1 * | 1/2011 | ............. | A63H 19/30 |
| WO | WO-2015014463 A1 * | 2/2015 | ............. | A63H 17/28 |
| WO | WO-2015141803 A1 * | 9/2015 | ............. | A63H 19/24 |

OTHER PUBLICATIONS

Translation EP2272576A1 (Year: 2011).*
(Continued)

*Primary Examiner* — Eugene L Kim
*Assistant Examiner* — Alyssa M Hylinski

(57) ABSTRACT

A method and an apparatus are described for a toy airport and its accessories for a compact interactive landing field system for use by individuals, children in particular, which facilitates life-like airport landing field, airport setting, modular play surface layout for acting-out airport scenarios. Aircraft and airport vehicles can be user-manipulated by hand to provide motion and positioning on and around the toy airport system. Enhanced features can allow use of remote-control aircraft and vehicles. Toy airport playing surface can provide interactive visual and audio simulation to include lights, sound, and markings. Layout pieces are modular, and the individual modules can have lighting systems that are preassembled with any combination of wiring, hardware, firmware for functionality. Lighting can be any combination of color and be with or without on/off flashing or programmed dimming to aide in visual appearance and guidance. Sounds can include actual and realistic aircraft noise and radio talk communications, which expand the simulation effect. Realistic signage, markings, and patterns allow visual simulation and appeal. Airport toy system can allow users to utilize a variety of features that may include, but are not limited to, aircraft bidirectional take-off and landing visual aids, wired and/or wireless communication, smart devices interfaceablility, remote controllability, and embedded firmware capable of upgrade for future accessories and expansion.

4 Claims, 40 Drawing Sheets

(51) Int. Cl.
*A63H 30/04* (2006.01)
*A63H 27/00* (2006.01)

(56) References Cited

U.S. PATENT DOCUMENTS

| | | | | | |
|---|---|---|---|---|---|
| 4,310,974 | A * | 1/1982 | Gdovin | ............. | G09B 9/305 |
| | | | | | 434/42 |
| 4,953,786 | A * | 9/1990 | Arsenault | ............. | A63H 18/02 |
| | | | | | 238/10 F |
| 5,248,276 | A * | 9/1993 | Deleon | ............. | A63H 27/00 |
| | | | | | 446/485 |
| 5,445,552 | A * | 8/1995 | Hine | ............. | A63H 33/042 |
| | | | | | 446/485 |
| 5,788,553 | A * | 8/1998 | Shivers | ............. | A63H 18/02 |
| | | | | | 446/444 |
| 7,980,913 | B1 * | 7/2011 | D'Avanzo | ............. | A63H 18/16 |
| | | | | | 446/175 |
| 8,747,182 | B2 * | 6/2014 | Sofman | ............. | A63H 17/40 |
| | | | | | 446/456 |
| 9,180,380 | B2 * | 11/2015 | Cannon | ............. | A63H 3/006 |
| 9,419,378 | B2 * | 8/2016 | Bdeir | ............. | H01R 11/30 |
| 9,755,356 | B1 * | 9/2017 | Kim | ............. | H01R 13/6205 |
| 9,770,663 | B2 * | 9/2017 | Wilkins | ............. | A63F 18/16 |
| 2001/0045978 | A1 * | 11/2001 | McConnell | ............. | A63F 13/00 |
| | | | | | 348/42 |
| 2004/0096810 | A1 * | 5/2004 | Wells | ............. | A63H 17/25 |
| | | | | | 434/268 |
| 2004/0203314 | A1 * | 10/2004 | Effler | ............. | A63H 33/082 |
| | | | | | 446/85 |
| 2005/0287905 | A1 * | 12/2005 | Olivier | ............. | A63H 18/02 |
| | | | | | 446/108 |
| 2006/0154711 | A1 * | 7/2006 | Ellis | ............. | A63F 13/30 |
| | | | | | 463/30 |
| 2007/0238537 | A1 * | 10/2007 | Allen | ............. | A63H 18/00 |
| | | | | | 472/85 |
| 2009/0004949 | A1 * | 1/2009 | Payne | ............. | A63H 18/00 |
| | | | | | 446/478 |
| 2009/0086792 | A1 * | 4/2009 | Nishizawa | ............. | A63H 30/04 |
| | | | | | 375/135 |
| 2009/0305606 | A1 * | 12/2009 | Coben | ............. | A63H 33/42 |
| | | | | | 446/478 |
| 2009/0305607 | A1 * | 12/2009 | Coben | ............. | A63H 18/021 |
| | | | | | 446/491 |
| 2010/0112337 | A1 * | 5/2010 | Coben | ............. | A63H 18/021 |
| | | | | | 428/323 |
| 2010/0239115 | A1 * | 9/2010 | Richardson | ............. | H04R 5/033 |
| | | | | | 381/384 |
| 2010/0258646 | A1 * | 10/2010 | Tamulewicz | ............. | A63H 18/02 |
| | | | | | 238/10 B |
| 2010/0304640 | A1 | 12/2010 | Sofman | | |
| 2011/0012661 | A1 * | 1/2011 | Binder | ............. | A63F 13/235 |
| | | | | | 307/41 |
| 2011/0105205 | A1 * | 5/2011 | Devecka | ............. | A63F 9/24 |
| | | | | | 463/1 |
| 2012/0129423 | A1 * | 5/2012 | Finizza | ............. | A63H 17/00 |
| | | | | | 446/427 |
| 2012/0129424 | A1 * | 5/2012 | Payne | ............. | A63H 18/00 |
| | | | | | 446/476 |
| 2012/0212241 | A1 * | 8/2012 | Wallace | ............. | A63F 3/00643 |
| | | | | | 324/686 |
| 2014/0024284 | A1 * | 1/2014 | Keenan | ............. | A47D 15/003 |
| | | | | | 446/227 |
| 2014/0099853 | A1 * | 4/2014 | Condon | ............. | A63F 13/245 |
| | | | | | 446/37 |
| 2014/0213140 | A1 * | 7/2014 | Goh | ............. | A63H 3/28 |
| | | | | | 446/175 |
| 2014/0220271 | A1 * | 8/2014 | Meyer | ............. | E04F 13/072 |
| | | | | | 428/34.3 |
| 2014/0342633 | A1 * | 11/2014 | Garcia | ............. | A63H 18/00 |
| | | | | | 446/220 |
| 2015/0168628 | A1 * | 6/2015 | Niu | ............. | A63H 33/22 |
| | | | | | 362/602 |
| 2015/0224418 | A1 * | 8/2015 | Musliner | ............. | A63H 18/02 |
| | | | | | 446/118 |
| 2015/0367247 | A1 * | 12/2015 | Kosmo | ............. | A63H 18/00 |
| | | | | | 446/71 |
| 2016/0074762 | A1 * | 3/2016 | Klein | ............. | A63H 33/42 |
| | | | | | 446/174 |
| 2016/0101370 | A1 * | 4/2016 | Madsen | ............. | A63F 9/1204 |
| | | | | | 446/91 |
| 2016/0144288 | A1 * | 5/2016 | Liu | ............. | A63H 17/26 |
| | | | | | 446/454 |
| 2016/0169495 | A1 * | 6/2016 | DiCiacce | ............. | G09F 19/02 |
| | | | | | 362/382 |
| 2016/0210484 | A1 * | 7/2016 | Shi | ............. | G06K 7/10366 |
| 2016/0271509 | A1 * | 9/2016 | Arboleda | ............. | A63H 33/086 |
| 2017/0023219 | A1 * | 1/2017 | Grunzweig | ............. | A63H 33/046 |
| 2017/0189828 | A1 * | 7/2017 | Hellenga | ............. | A63H 33/042 |
| 2018/0272240 | A1 * | 9/2018 | Soudek | ............. | A63H 3/28 |

OTHER PUBLICATIONS

Translation WO2015/141803A1 (Year: 2015).*
GeminiJets, Inc. Model toy airplanes, airports, airport ground services vehicles http://www.geminijets.com/GJARPTB/.
Ovidio Dejesús Airport Diorama Designs and layouts http://airport-diorama-designs.com/model-airport_1-400_page/.
Miniatur Wunderland Hamburg GmbH Model Toy airport and planes https://www.miniatur-wunderland.de/ https://www.youtube.com/watch?NR=1&feature=endscreen&v=91410Jq6LUY.
Melissa & Doug, LLC (www.MelissaAndDoug.com) Puzzle World (Lights, Camera, Interaction!) Expandable Wooden Construction System "Busy Airport" 69 Pieces.

* cited by examiner

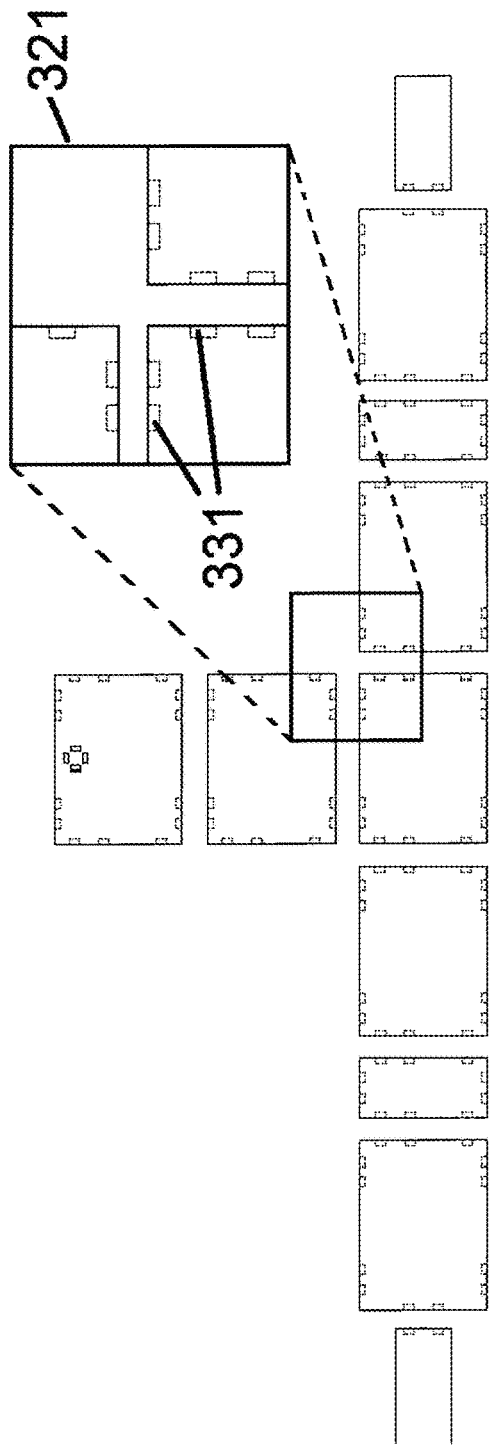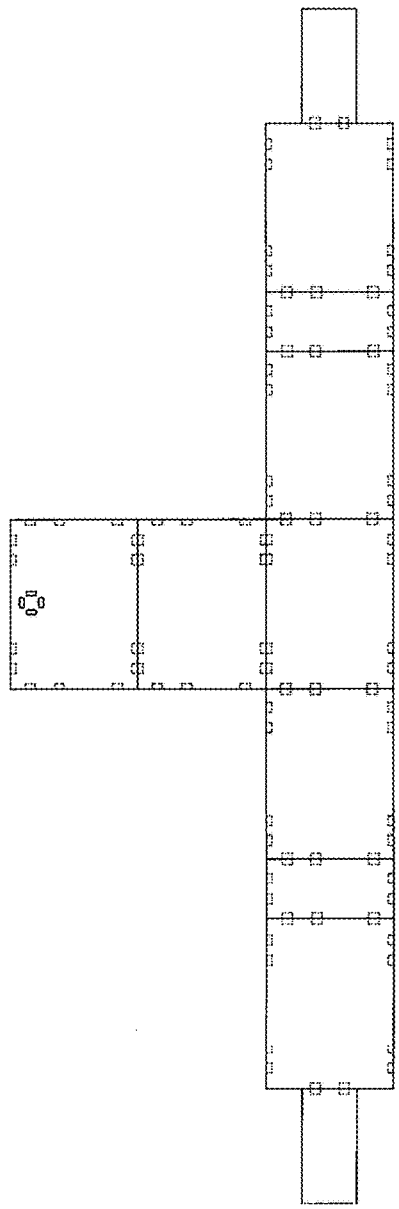
FIG. 3A
FIG. 3B

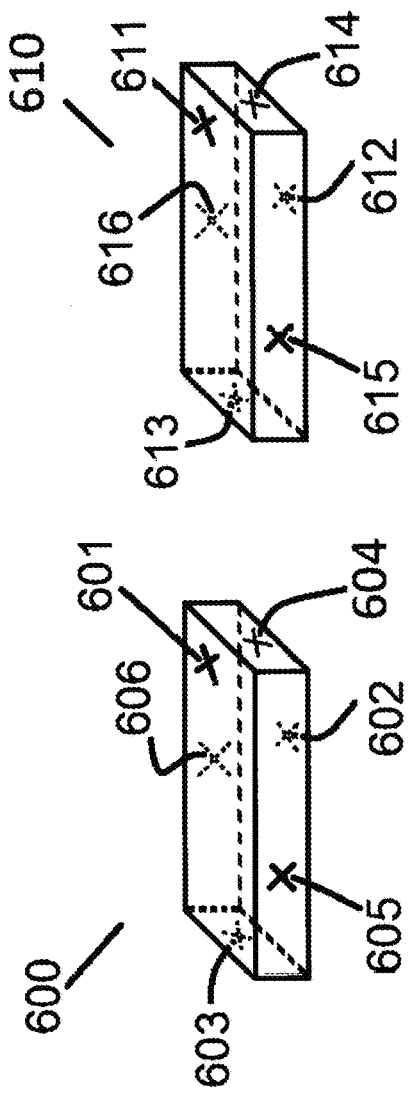
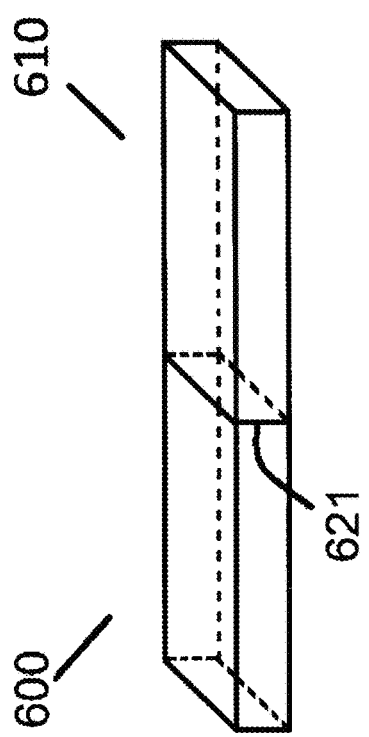

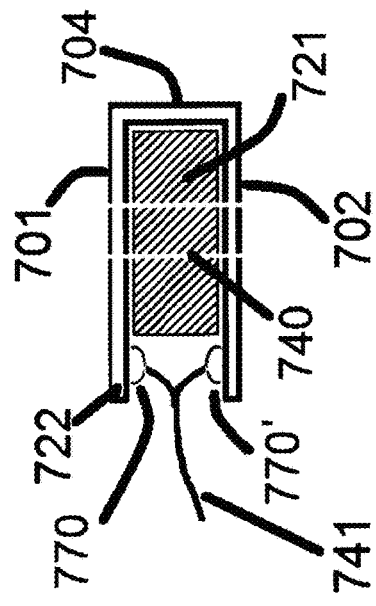
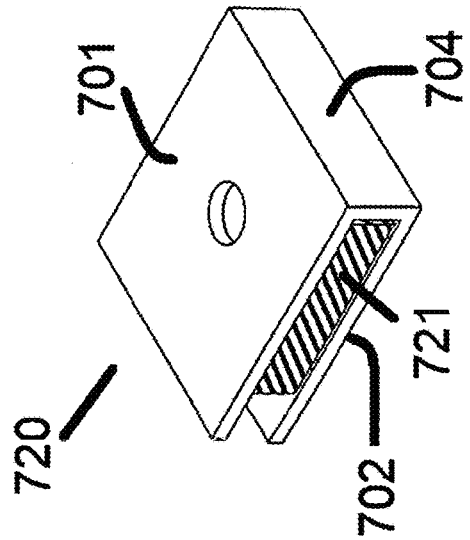
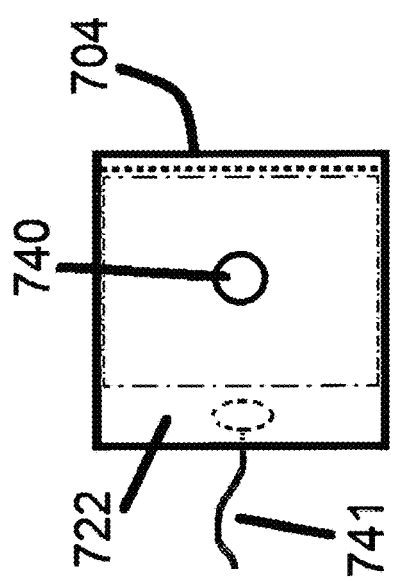
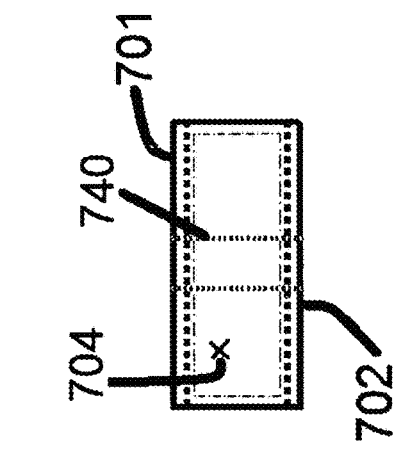

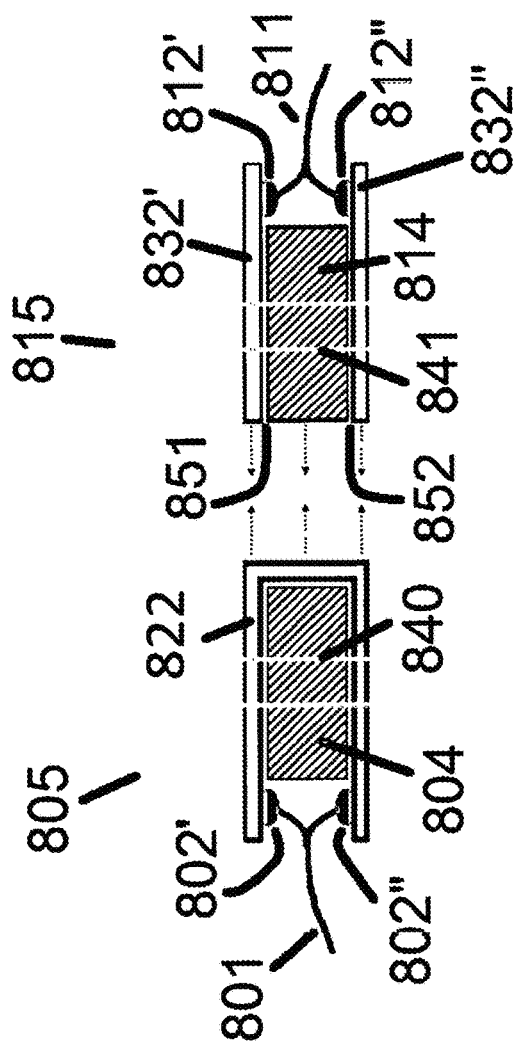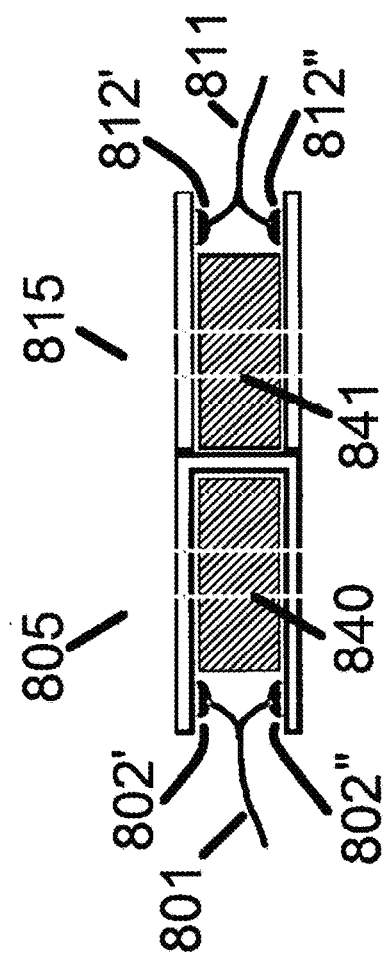
FIG. 8A
FIG. 8B

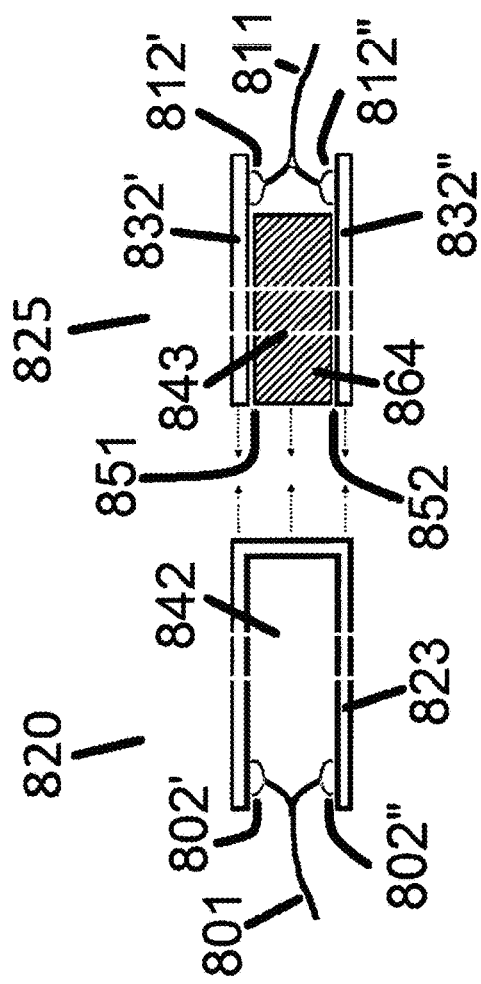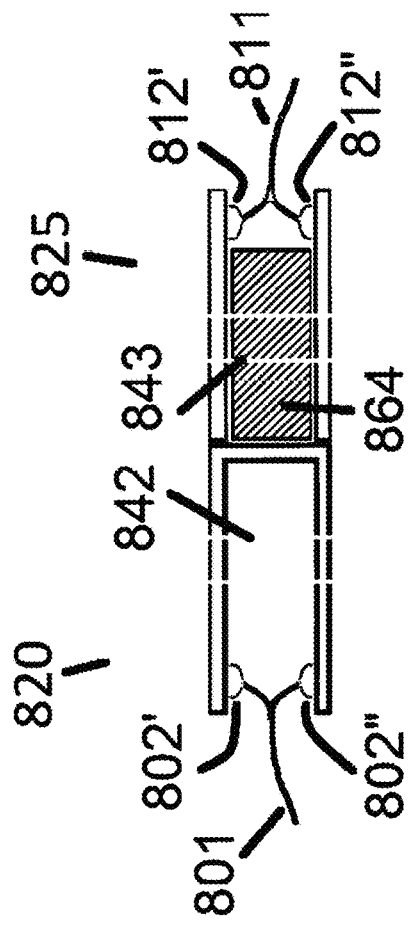

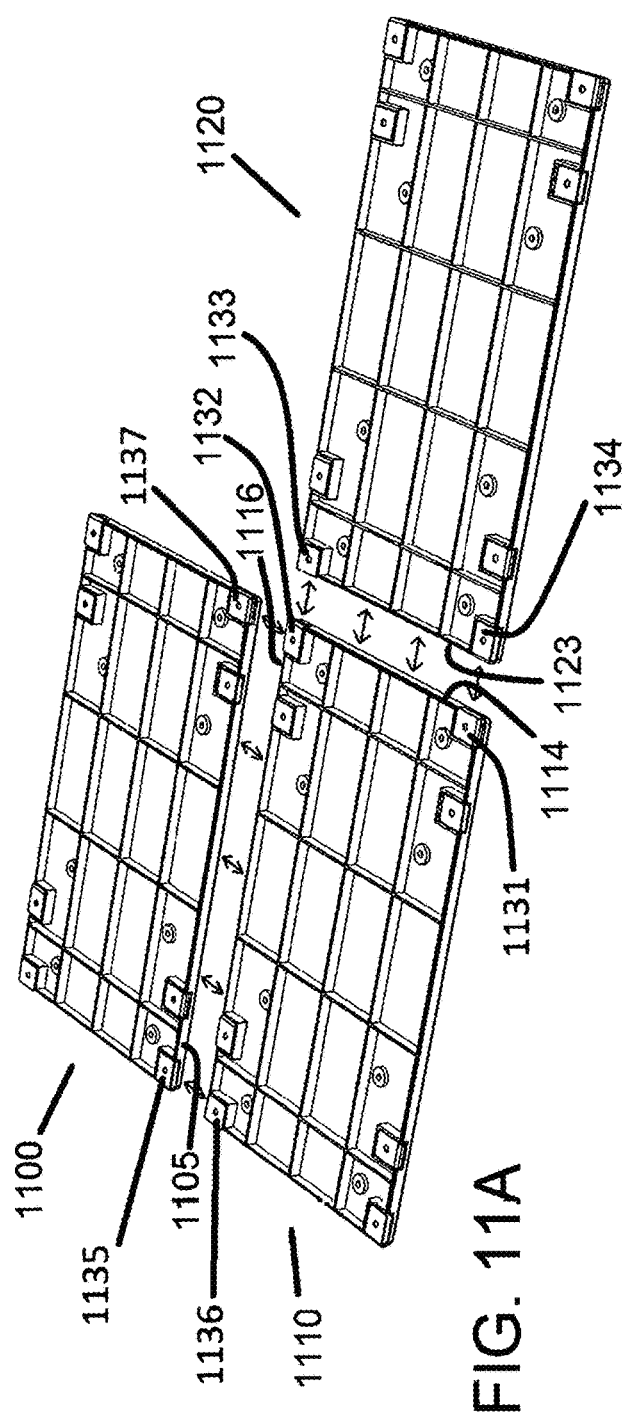
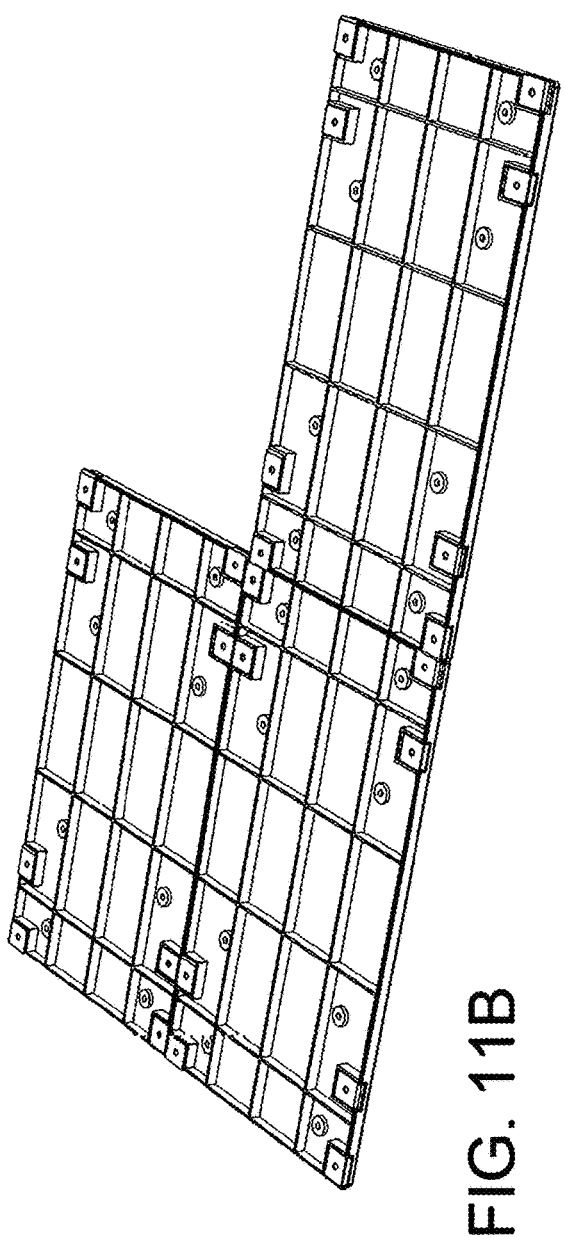
FIG. 11A
FIG. 11B

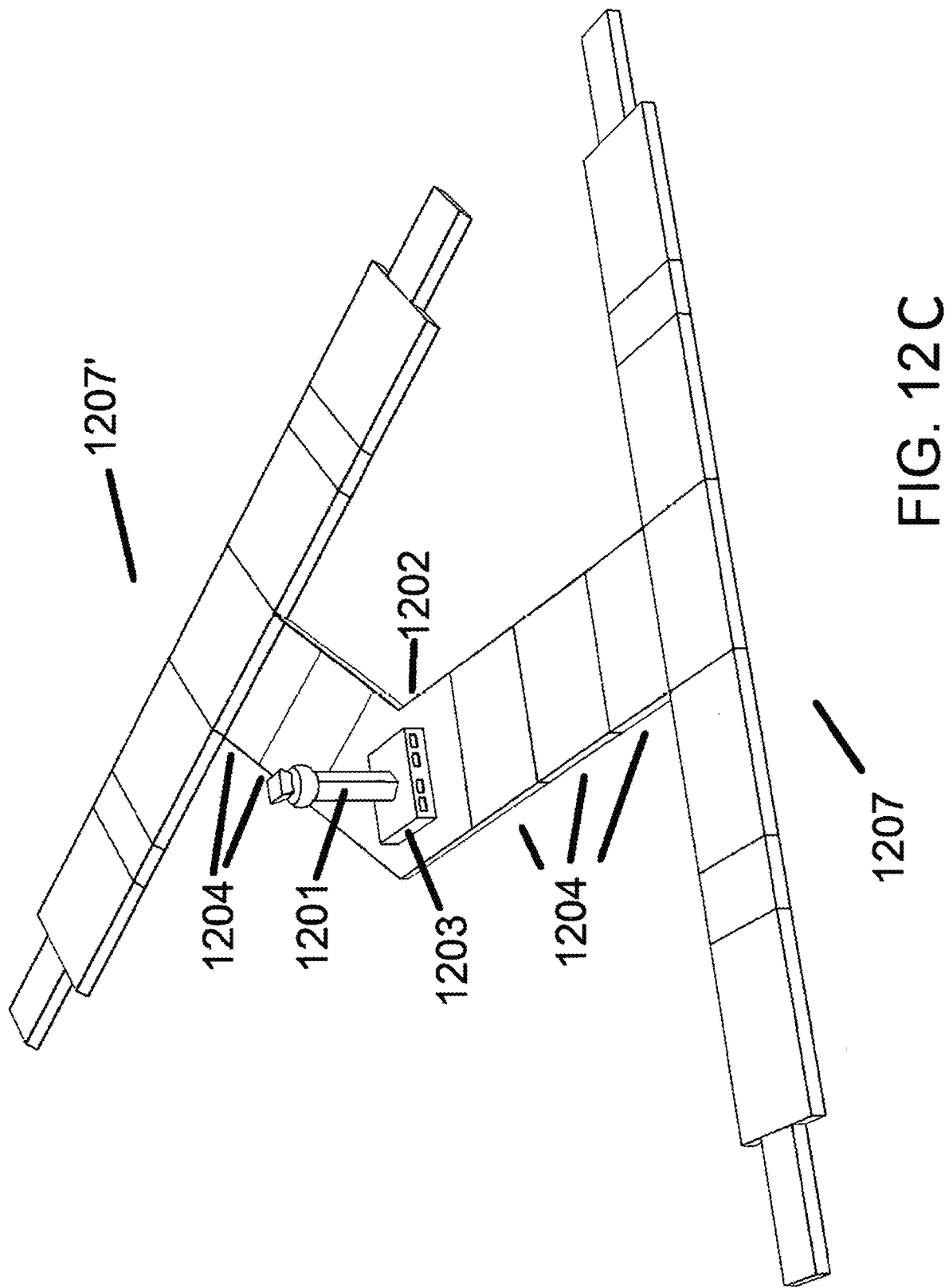

Note: not to scale

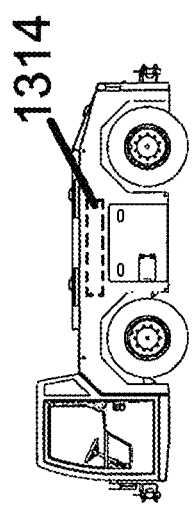
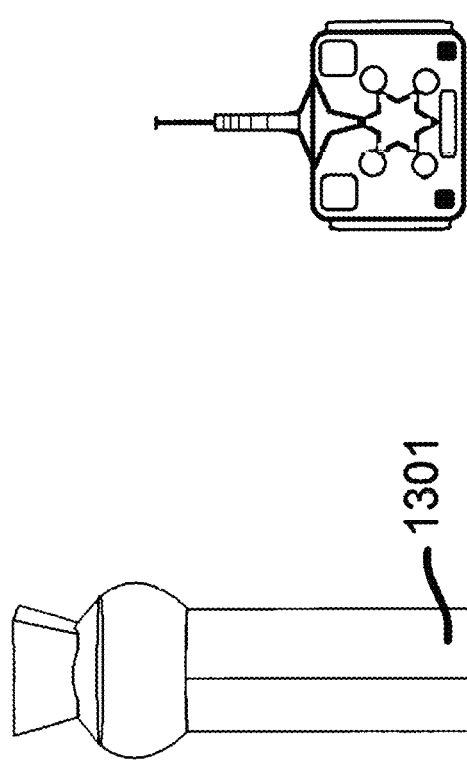
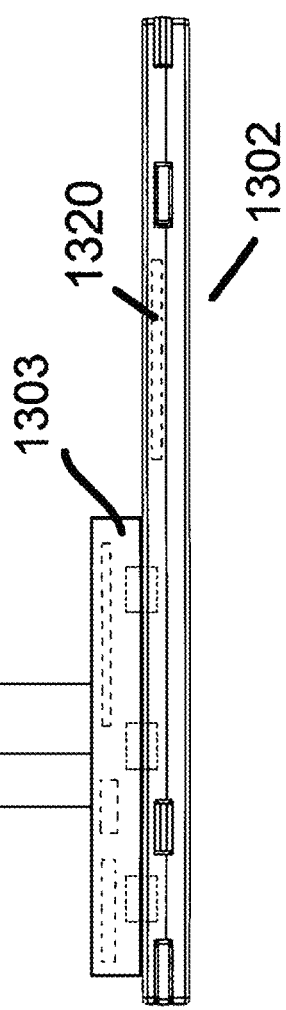
FIG. 13F
FIG. 13E
FIG. 13D
Note: not to scale

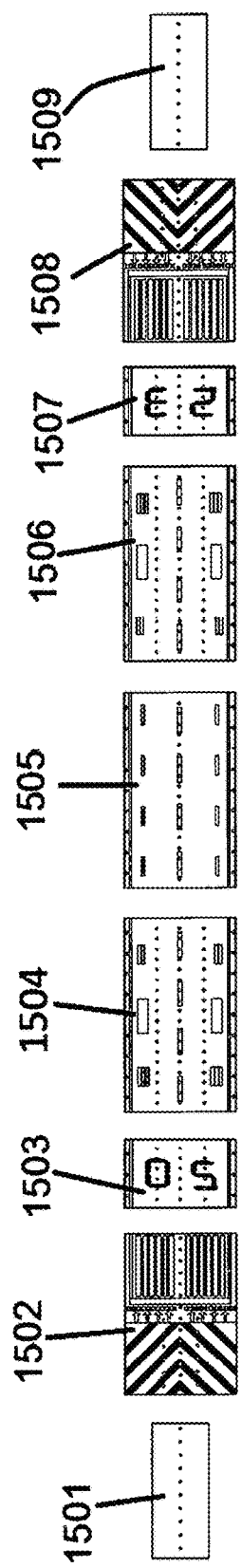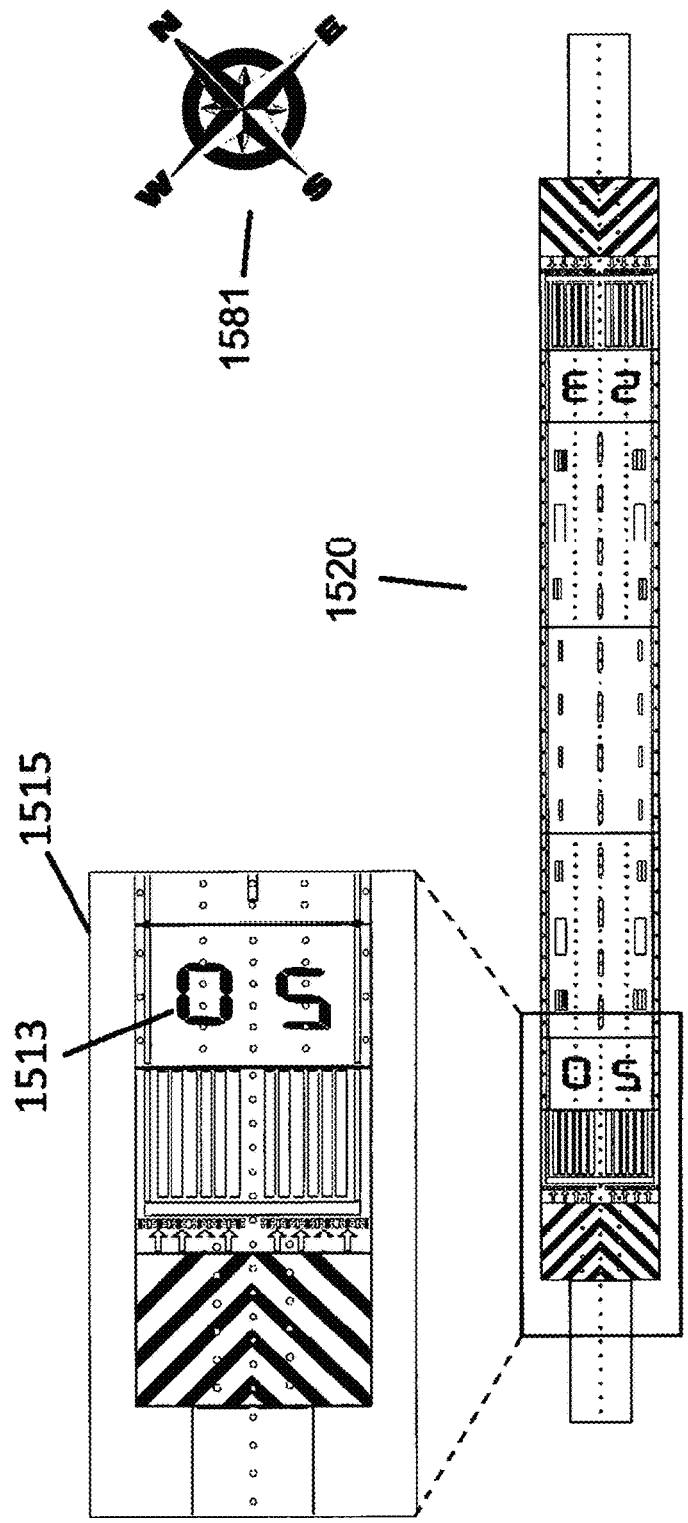
FIG. 15A
FIG. 15B

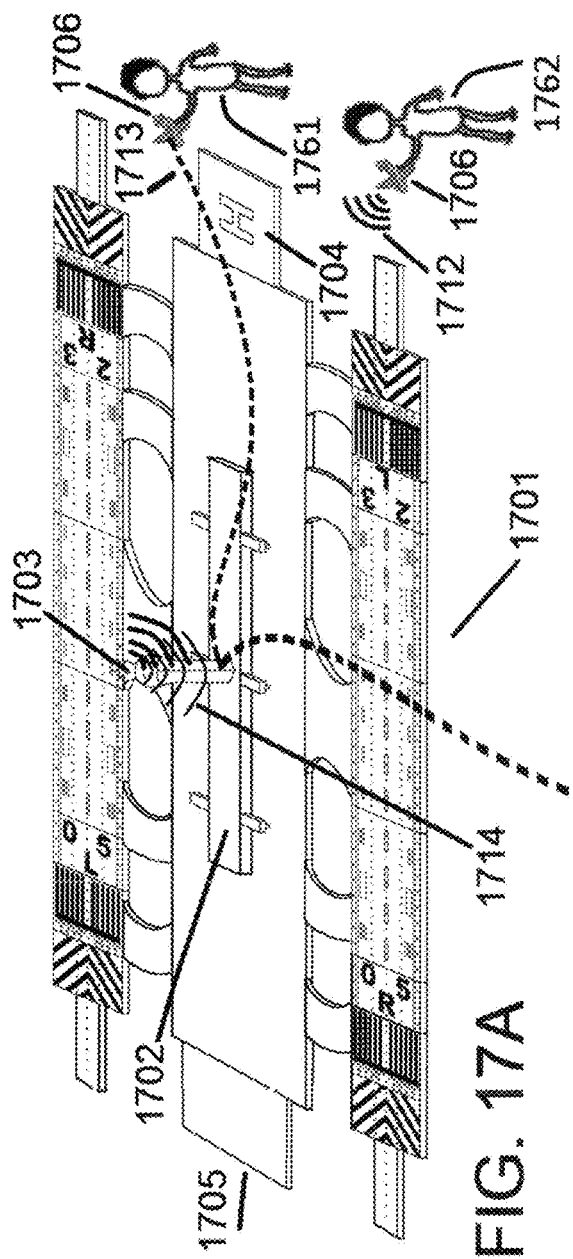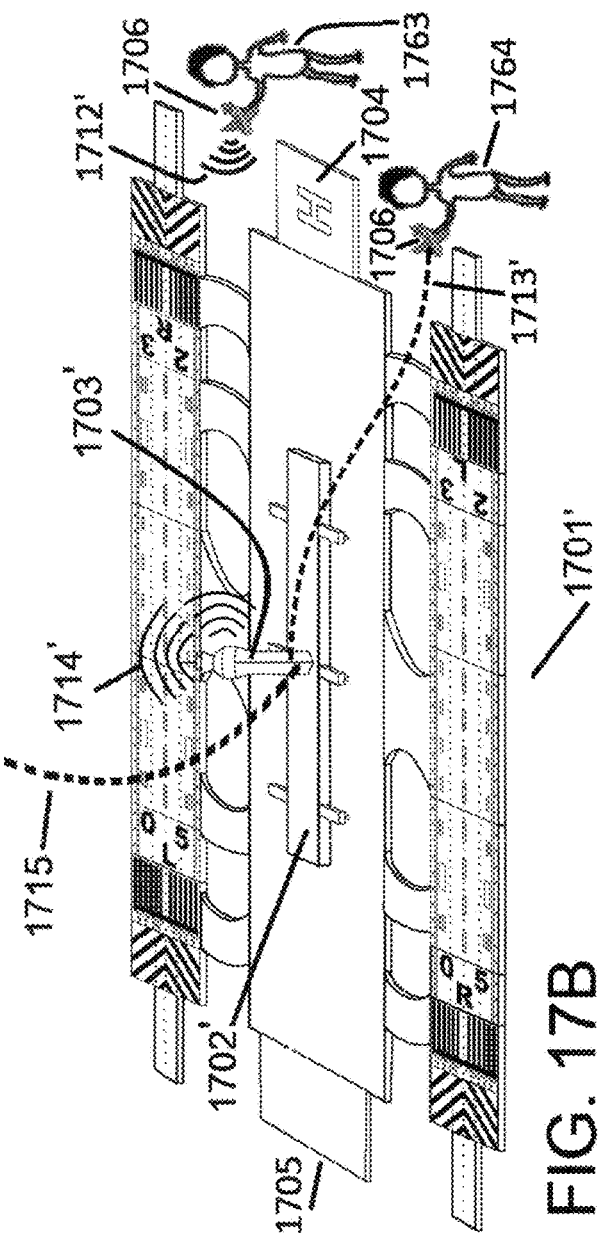

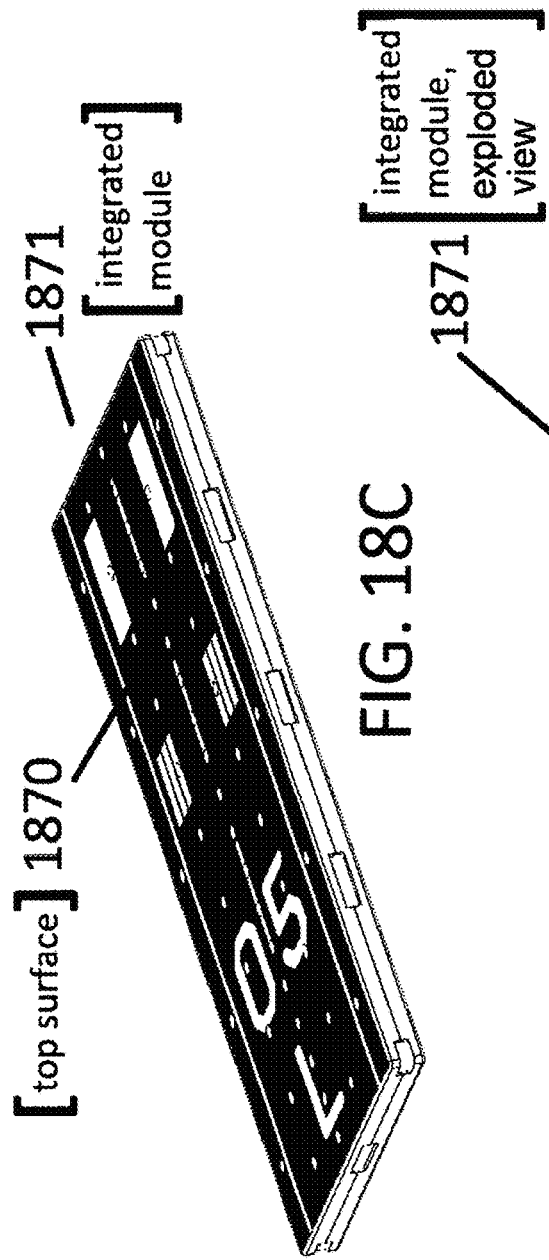
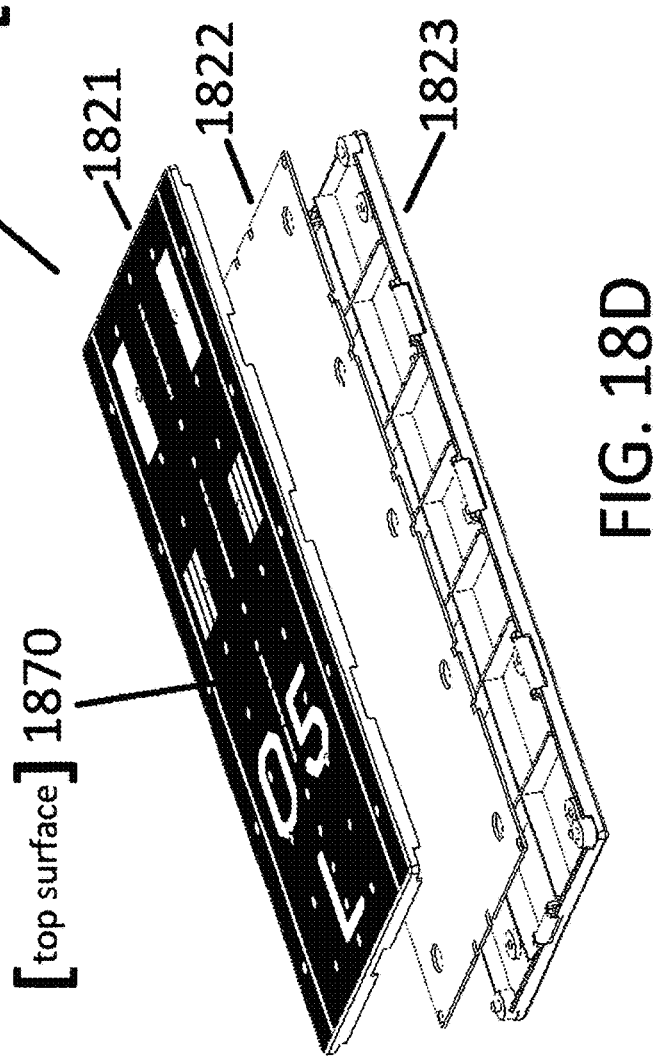
FIG. 18C
FIG. 18D

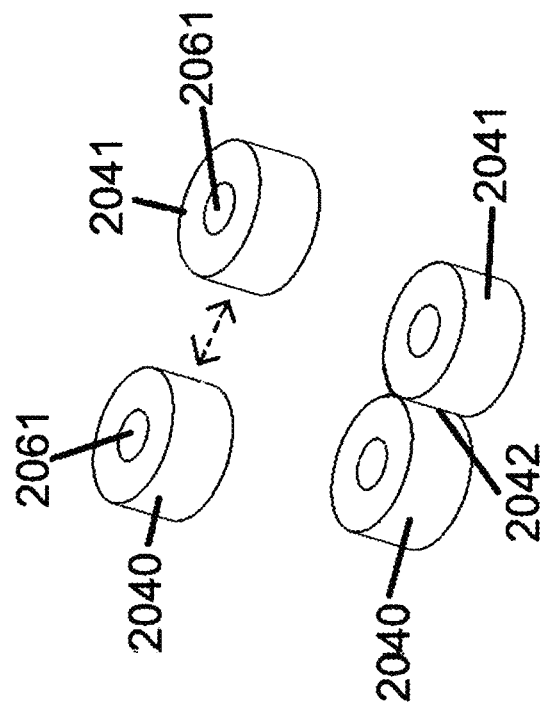
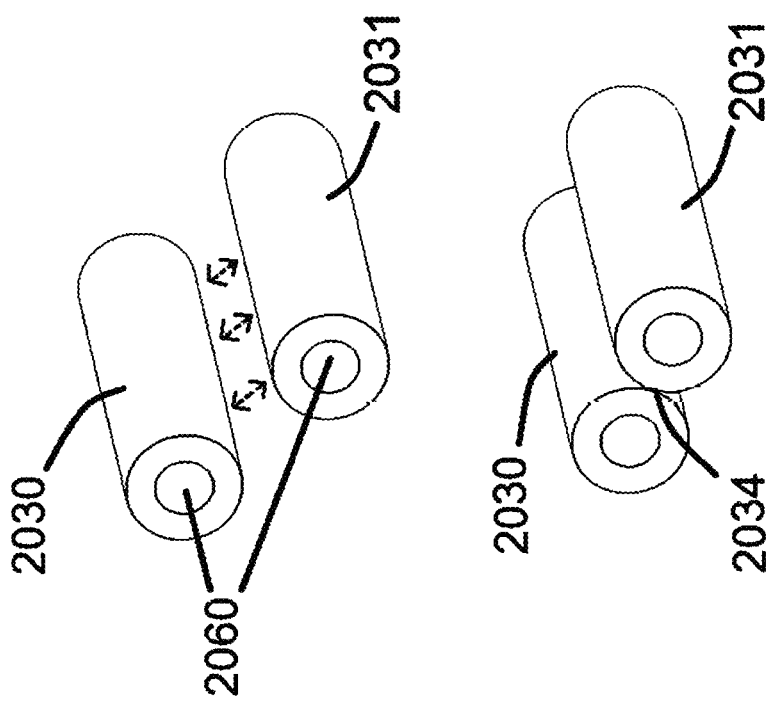
FIG. 20B
FIG. 20A

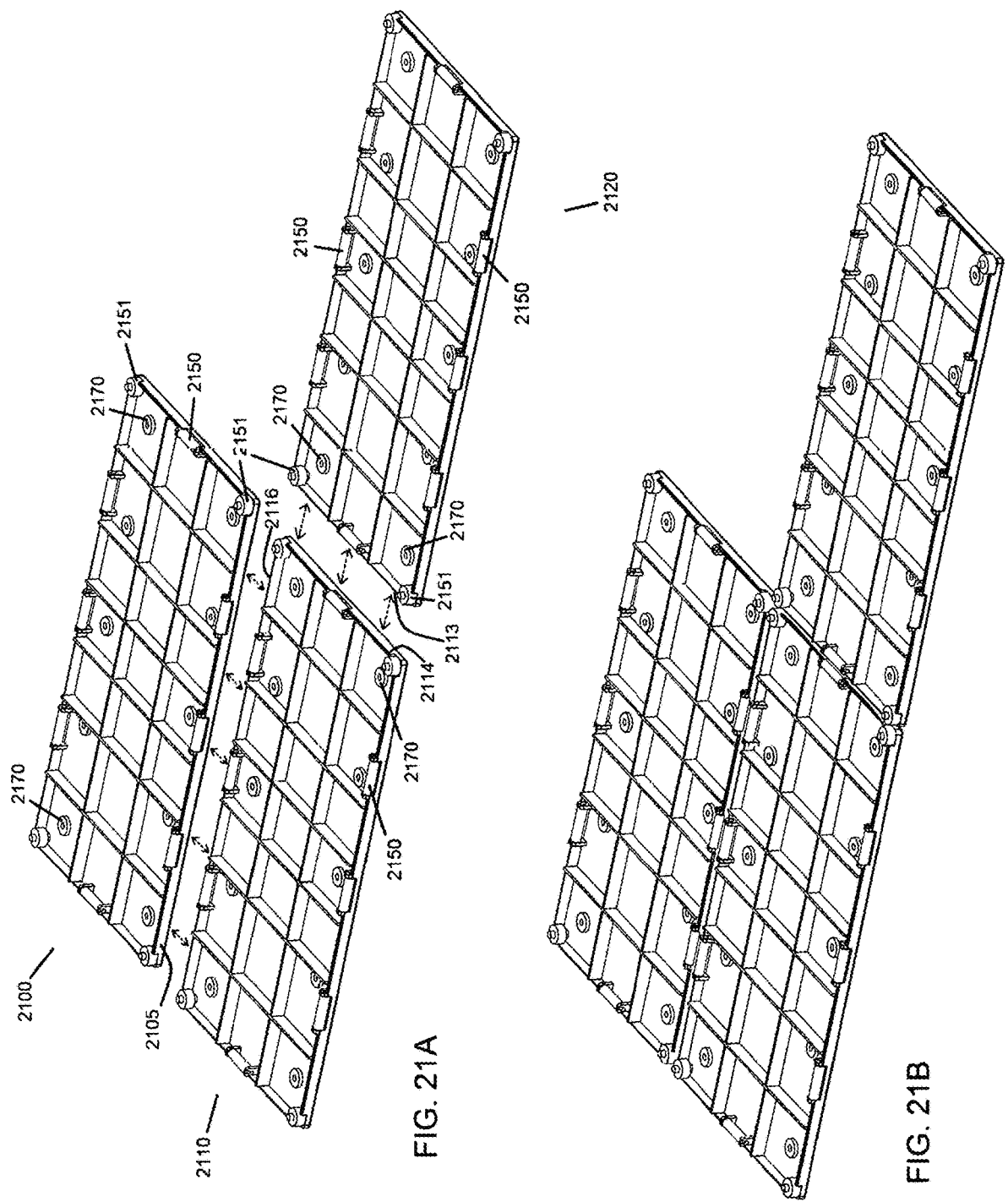

TOY AIRPORT APPARATUS AND METHOD

RELATED APPLICATIONS

The present invention claims priority of and is a conversion of U.S. Provisional Patent Application No. 62/494,170 filed Jul. 30, 2016 and titled "TOY AIRPORT APPARATUS AND METHOD." The contents of such provisional patent application are incorporated herein by reference.

FIELD OF THE INVENTION

The present system relates to toy airport landing field systems, specifically interactive types, for use by individuals, children in particular, which facilitates life-like (realistic) airports of a sufficiently small physical scale for use as a toy airport, airport simulator, or both, featuring, for example, runways, airfields, landing fields, taxiways, passenger terminals, airport traffic towers (ATT), aprons, and accessories, which allow physical play, simulation, role playing, and following instructions. This invention is in the technical field of toy interactive simulators. More specifically, this invention pertains to toy airports.

BACKGROUND OF THE INVENTION

The invention is concerned with a model airport and accessories for use primarily as toys for children. More advanced embodiments of this invention can be used for flight instructional purposes, Age rationale: Ages 4 to 8 have an ability to construct/build toys and be interactive with toys using their imagination. Most children in this target group already own and operate handheld electronics such as Nintendo DS, tablets, and smart phones. They are able to easily follow electronic instructions, but rely on intuitive graphical interfaces and game similarity to learn the rules and play the games. Most games start with simple lessons that show the kids how to play and then become increasing harder as the levels increase. With non-electronic toys, this age group likes to build creatively or follow step-by-step instructions, for example, when building a detailed Lego plan.

Also, this age range typically starts being interested in music, both playing musical an instrument and listening independently, including listening and watching DVDs, CDs, and songs on iPods, MP3 users, smart phones/devices. In addition, this age range also has most likely started to collect objects, like Bakugans and Pokemon cards (younger), video games with tie-in characters (Skylanders), and hobbies (like coins or stamps). This age group has most likely already owned and used remote control vehicles (helicopters, quadcopters, cars, boats, robots) even though they are expensive and do not last long for kids in this age group (several hours to several months only). This age group is unlikely to be very familiar with Microsoft flight simulator but has definitely played airplane combat or other simulator (driving or flying type) games on PC and/or a handheld device.

A toy airport or toy landing field typically requires a substantial amount of topographically flat area.

Referring to FIG. 1, the art described in U.S. Pat. No. 5,248,276 features a single plate of track, without modularity or connectivity.

Referring to FIG. 2, the art described in the U.S. Pat. No. 2,899,910 features sectional assembly yet overall is unnecessarily complicated in that it specifies the mechanically captured motion of motorized (self-propelled) toy planes along grooves in the track assembly, similar to model cars on a slotted track (slot car track). U.S. Pat. No. 2,899,910 describes a confined, constrained system by having elevated sections of track. This confines the flight patterns and prevents the user from handling the toy planes directly—or whimsically—as a matter of play. U.S. Pat. No. 2,899,910 has limited stimuli—no lighting is disclosed and there is no audio sound and no radio control, no radio communications, and no other remote control.

Moreover, prior related art either lacks modularity of the assembly. Prior related art lacks a combination of modularity and electronic features, such as lighting and/or communications and/or audio. In addition, prior art lacks the realistic features of airport layout, markings, and/or communications.

SUMMARY

Embodiments of the present invention include a method and an apparatus.

The ideas in this disclosure describe a toy airport system that simulates a smaller-scale version of real-life aircraft and airport settings in terms of appearance, feel, and/or sounds, as an educational and instructional toy. This toy airport can be used by one or more players. Moreover, one or more toy airport systems can be used by one or more players at a time.

The present invention is a toy airport system, with some embodiments that include the interactive types for use as a toy and/or airport simulator; with some embodiments containing, for example, one or more of any of the following: runways, airfields, landing fields, airport traffic towers (ATT), and accessories, which allow physical play, simulation, and manipulation by the users.

In particular, in the context of this disclosure, physical play simulation may include, for example, the use of the toy's surface so that toy aircraft and other toy components are placed, and/or moved, and/or manipulated. In other examples, the toy components themselves can be semi-autonomous or entirely autonomous, by interacting with the toy's control circuitry, detectors, and/or embedded media, and/or remote devices.

The toy airport can be used by one or more players/users in an ad lib manner. For example, a new player (or novice player) can interact with the toy system—in an entirely ad lib manner—as a free play experience. As a user gets more experience, more features can be used and/or added to enhance the airport simulation experience.

Versions of the toy airport can have features to enhance game simulation experience, with instructions and/or purposes to accomplish objectives. This enhancement can be done by means of communications between the airport toy and other devices and/or players, and can include but are not limited to the following: personal digital assistant (PDA and/or Smart Device) such as a phone, pad, tablet, or laptop, (or multiple user's PDAs and/or devices). The toy airport can be capable of different game setups, including but not limited to downloading or specifying different scenarios, characteristics, airport locations, wind directions (weather conditions), or other physical conditions.

The toy airport systems (apparatuses) can include size-scaled structures of landing field (or fields) and airport/aircraft facilities that can be interacted with by the users. In other words, in some examples, actual physical devices can be manipulated by players/users, in addition to visual effects.

Some examples of simulations can be visual. For example, visual effects can be comprised of one or more groups of runway lights, taxiway lights, airport tarmac lights, airport terminal lights, or other visual markings. The markings can be made from electrical lights, non-electrical markings, or both. In this context, the word "group" can mean a single light or a plurality of lights. Lights can include steady (no flashing), and/or flashing, and/or sequential flashing to aide in visual guidance and appearance, and the markings allow visual simulation, functionality, and appeal. Lighting patterns can be changed, in some examples, by the user, by the toy's electronic systems control module, or by a combination of the user and the toy's electronic systems control module.

Some examples of simulation can be audible. The toy airport system that is described herein can produce audible sounds depicting realistic aircraft sounds and airport noise. In addition, some audible noises can include radio communications, for example between pilots, or between ground crew and pilot(s). This is sometimes referred to as "radio chatter". The sounds associated with this airport toy expand and enhance the simulation or instructional effects. In addition, the toy can be combined with components to produce audio sounds and speech interactions between multiple components/devices.

The toy airport system can include provisions for wireless communication, wired communication, or a combination of wireless and wired communication between players, between players and toy(s), and between toys. Moreover, the toy airport system and method can use wired communication, wireless communication, or a combination of wireless and wired communication between aircraft, airport traffic tower, electronic systems control module, airport toy to other airport toys, airport traffic tower to other airport traffic tower(s) and other devices/add-ons, smart devices, and software capable of upgrade for future accessories and expansion.

The airport system can have tracking features. For example, wireless communication, wired communication, or a combination of wireless and wired communication between the toy tower and the elements of the toy (aircraft, airport support vehicles, airport support structures) can be used to track and/or monitor the location, status, and details about various elements of the toy.

The airport toy can have a laid-out style in which a user produces a playing surface in a substantially tile-layout format, from individual sections. Tiles (sections) are also called "modules." Examples of toy airport layouts include end-to-end edge-face-to-edge-face connections of individual modules, side-by-side edge-face-to-edge-face connections of individual modules, or a combination of end-to-end connections and side-by-side connections to produce any combination of playing surfaces including: linear airport playing surfaces, branched playing surfaces, or a grid-like playing surfaces having a two-directional (X-Y-Cartesian-like) visual appearance from above. In other words, the toy is laid-out by the user by placing one or more integrated modules next to each other. In addition, there can be accessories and accessory modules.

The airport toy is comprised of individual modules for user's ease of connecting other modules in order for a user to put together a toy lay-out pattern. It also follows that a toy layout pattern can be easily taken apart by a user. The toy layout can be made from one or more modules. For this toy, each individual module is designed and manufactured as a self-contained, integrated module. An individual module itself is not meant to be taken apart by the user(s).

The laying-out of modules by the user (the physical laying-out of the toy) is produces a visual appearance of an airport setting, of which of the top surface forms the playing surface of the airport toy. This is analogous to putting a puzzle together in a specific order (specific pattern), to produce a visual appearance of an airport scene.

Keeping with the visual appearance of the airport setting/scene, the top facing surface of the toy airport has markings (visible patterns) which are described as "artwork" in this disclosure. The word "artwork" can interpreted as a material or combination of materials with any combination of opaque markings, transparent areas, and semi-transparent areas, and possibly combined with areas without markings. In other embodiments, any amount of etched markings can be used as part or all of the artwork.

In one example, an artwork layer is designed and fabricated onto the top-facing surface of the module, and thus inseparable from the underlying module by the user.

In another embodiment, the artwork layer, as described in the previous paragraphs, can be separated (connected or disconnected) from the integrated module.

In another embodiment, the artwork layer as described in the previous paragraphs is the only layer of a module. In other words, the artwork is the module itself.

In another embodiment, the artwork layer serves as both the markings layer and the light diffusing layer of a module, with the light sources separate from the artwork layer.

The toy airport can be comprised of parts having quick-connect, quick-disconnect connections, which permit easy assembly and disassembly of the airport toy layout. Examples of the toy airport system includes an airport layout comprised of a plurality of runway modules (sections), taxiway modules (sections), terminal modules (sections), accessories, and other parts, without limitation.

Assembly of the toy airport layout is comprised substantially of linking adjacent modules and/or accessories together using connections. Connections can allow both mechanical and electrical attachment. In one embodiment, connection of individual modules is accomplished mechanically via magnets, and electrically via conductive metal held together by the said magnets, giving rise to an electrical pathway from module section to module section, from accessory to accessory, or from accessory to module section.

This invention can have one or more features, including but not limited to any of the following: modularity (i.e., the toy layout is easy to assemble and disassemble by the users), upgradeability, expandability.

Due to the toy's modularity, easy connection and disconnection of the toy's components facilitates easy setup of the toy's layout, its use, its dismantling, and its storage. The modularity permits upgrade opportunities.

An additional level of interaction can be included by having one-way, two-way, or multi-way communication between a number of entities, which include but are not limited to the following: a given user's toy aircraft and the toy airport, between the user and the toy airport, or between other toy airports. In other words, this toy enables simulation by the user (or by a group of users) to engage with the toy airport via physical interaction and wireless communication that is provided by both hardware and software. The toy system may have a microprocessor, communication electronics, and software. More than one participant can play at one time. Communication can occur between all players and the toy, or between selected players and the toy, or between selected players.

This toy apparatus and method encompasses the combination of many different technologies or combination of features, and is disclosed herein, including claims.

Previous statements/paragraphs in this writing have outlined this invention considerably broadly, so the text that follows will detail how this invention makes contributions to the art.

BRIEF DESCRIPTION OF THE DRAWINGS

FIG. 3A is an overhead view of an example of components of the present invention made from connectable modules. In this view, the modules are separated from each other, namely, modules for a landing field surface, taxiway, and an airport traffic tower (ATT) module.

FIG. 3B shows an overhead view of an example of the toy airport system shown in FIG. 3A, where the individual modules are connected without substantial gaps between modules. This view shows connected modules for a landing field surface, taxiway, and an airport traffic tower module.

FIGS. 4A-4B show an expanded portion (also called an "exploded view") of a region of the example toy airport.

FIG. 4C shows possible lighting patterns and markings that can be used.

FIG. 5A shows a perspective view as one example.

FIGS. 6A-6B show two simple blocks for figurative purposes. These blocks are substantially parallelepipeds, and are shown for the purpose of defining nomenclature used for identifying the six faces (sides) of modules or of connectors or other block-shaped components described in this disclosure. The modules or other components described in this disclosure however are not limited to parallelepiped shapes. FIG. 6C shows the blocks next to each other.

FIGS. 7A-7D depict one embodiment of a magnetic connector for achieving mechanical connection, electrical continuity, or a combination of mechanical connection and electrical continuity between modules. FIG. 7A shows a top view. FIG. 7B and FIG. 7C show two side views of an example connector. FIG. 7D shows a perspective view.

FIG. 7E shows a top view, and FIGS. 7F-7G show side views. FIG. 7H shows a perspective view. This type of connector can be used as one of the mating connectors for the connector shown in FIGS. 7A-7D.

FIGS. 8A-8B show side profiles of disconnected and connected views of an example of a mating set of magnetic-type connectors (i.e., a set of two connectors in this example). FIGS. 8C-8D show side profiles of disconnected and connected views of a further example of a mating set of magnetic-type connectors. The examples shown in FIGS. 8A-8B and FIGS. 8C-8D can provide mechanical support and also can provide electrical continuity across the mated connection.

FIG. 11A is a perspective view of an example of three arbitrary building blocks (modules) of an embodiment of the present invention that are proximate to each other, but separated, where only the base (bottom) layer of each of the three modules is shown. FIG. 11B shows an example where the individual building blocks (or modules) are connected.

FIG. 12C is a perspective view of one embodiment of an airport toy comprised of two runways that are not parallel to each other, plus other modules and structures.

FIGS. 13A-13F show example components of an airport toy described herein. FIG. 13A shows an aircraft. FIG. 13B shows a helicopter. FIG. 13C shows a quadcopter. FIG. 13D shows an airport (side profile), and FIG. 13E shows a user's controller device (user interface), where the device depicted in FIG. 13E can include smart devices, tablets, phones, PCs, laptops, or joy sticks. FIG. 13F shows an example of GSE (ground support equipment).

FIG. 14A shows a view of a set of modules that are proximate to each other, but disconnected. FIG. 14A also includes a heliport module and side modules for other accessories, such as runway indicators, taxiway indicators, and PAPI, or other signage.

FIG. 15A is an overhead view of an example of possible artwork for the top-facing surface. In FIG. 15A, connectors between modules are not depicted.

FIG. 15B shows an overhead view of an example of possible runway artwork of a toy airport of this disclosure, with the individual runway artwork, connected together. In other words, this is an example of what the top-facing surface could look like.

FIGS. 17A-17B show users interacting with example airport toys, with a wireless remote connection and with a wireline remote connection, as perspective views.

FIGS. 18C-18D show an integrated module where artwork is integrated into the top layer and where the artwork is not user-removable.

In FIG. 19A, a set of modules are proximate but disconnected. FIG. 19B shows the set of modules are connected into a grid pattern.

FIG. 20A shows an example of a pair of cylinder magnets not connected to each other, this figure also shows an example of a pair of cylinder magnets connected to each other. FIG. 20B shows an example of a pair of ring magnets not connected to each other and this figure also shows an example of a pair of ring magnets connected to each other.

FIGS. 21A-21B shows a case where three example modules are connected together with example ring magnets and example cylinder magnets. For each of the three modules shown, the only layer shown is the base layer (or support section). FIG. 21A shows the modules proximate to each other, but disconnected. FIG. 21B shows the modules as connected together.

FIG. 22B shows an example of a possible use of the invention described in this disclosure.

DETAILED DESCRIPTION OF THE INVENTION

Figure 1:
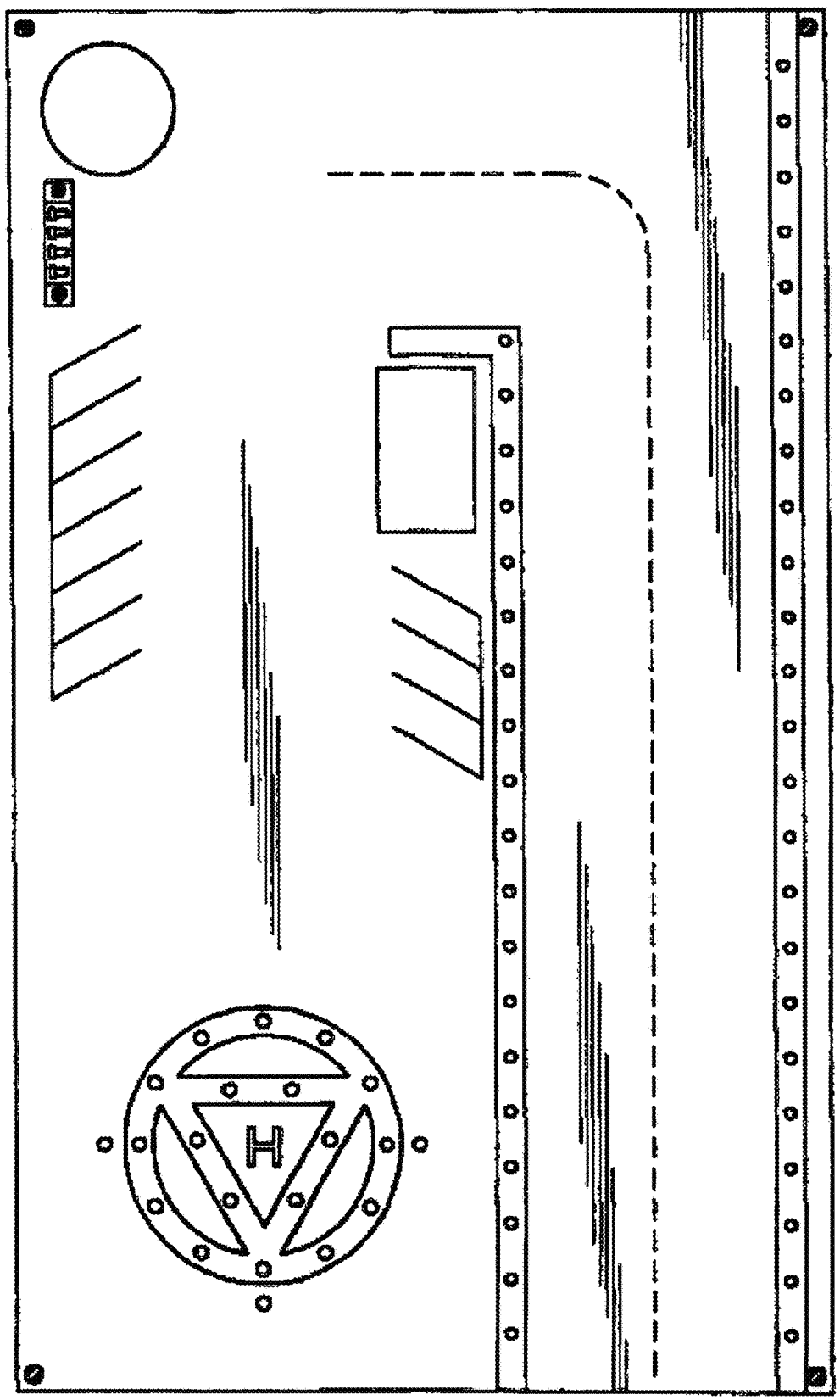
FIG. 1 shows a landing field toy as shown in U.S. Pat. No. 5,248,276.
Figure 2:
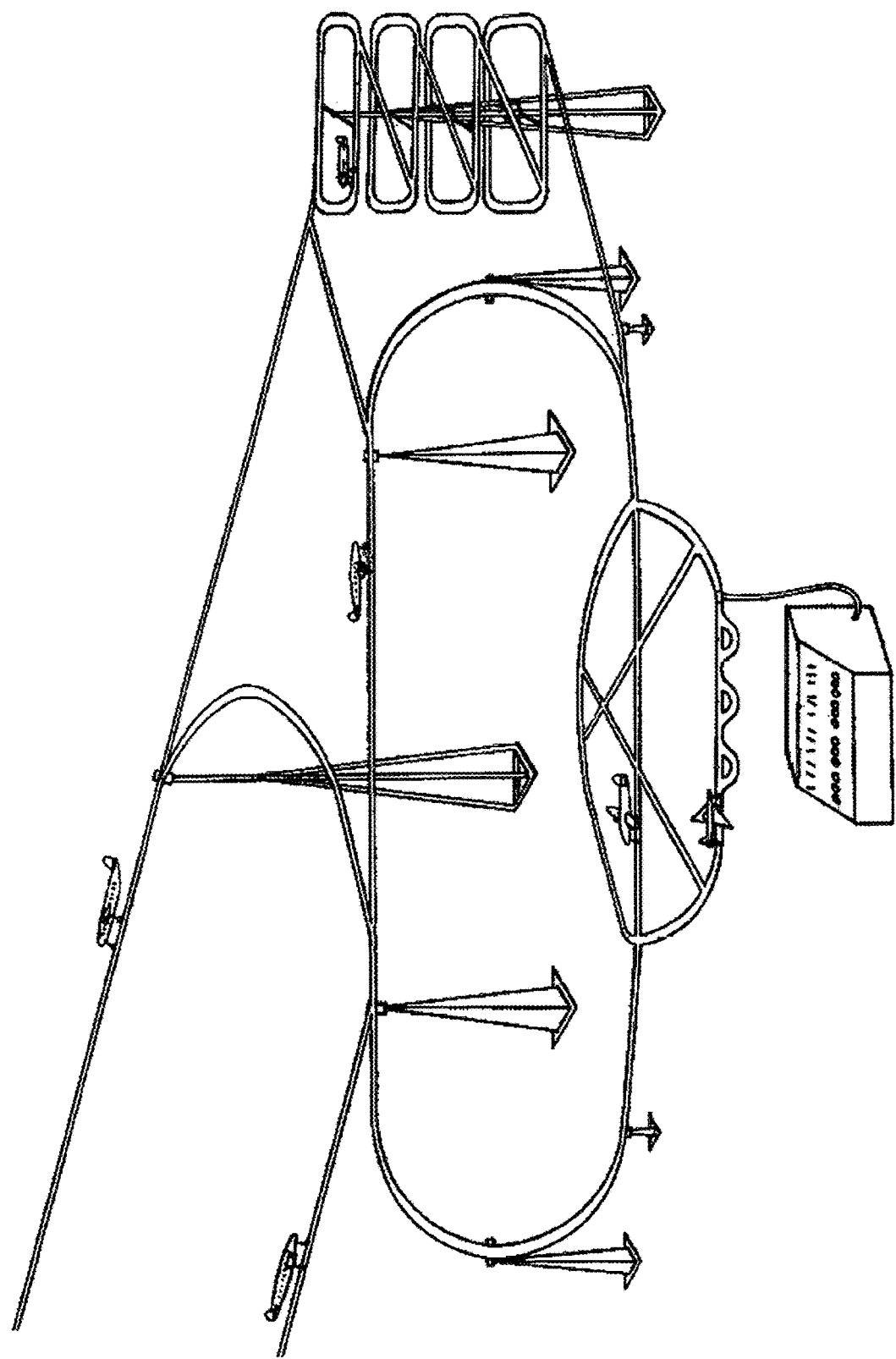
FIG. 2 shows a landing field toy as shown in U.S. Pat. No. 2,899,910.

Presented herein is a method and apparatus for realizing any combination of an airport toy, airport game, airport toy setting, and airport toy instructional tool. The method and apparatus can provide a realistic airport toy and/or airport simulation experience for the participants.

Subheading: Terminology

The following terminology used herein is related to the process of producing the toy airport, and is related to the description of some of the parts, methods, and operations presented in this disclosure. The meaning of other terms will be clear to those in the art from the usage and/or definitions provided herein, and/or from common usage in the art.

The word "module" refers to the individual assembly part of which a set of modules are connected together to lay out a toy airport. Alternative terms for module include, but are not limited to, "module section," "section," "block", "tile," "building block," "assembly," "subsystem", "attachment," "segment," "unit," and "accessory."

In this disclosure, the words "connector," "connector assembly," "connector subassembly" (or "connector subassemblies") refers to the sets of individual components that connect modules together mechanically, electrically, or a combination of mechanically and electrically, to form an airport toy layout.

In this disclosure, the "surface facing up" is the surface on which toy aircraft and other toy components are placed and/or are moved upon. The phrase "surface facing up" is equivalent to the phrases "top facing surface", "top surface," and "playing surface." In addition, the word "surface" is equivalent to the word "face" in this disclosure.

In this disclosure, the phrase "surface facing down" is equivalent to the phrases "bottom facing surface", and "bottom surface."

The word "airstrip" has synonyms that include, but are not limited to, "airfield," "runway," and "landing field." The word "airport" includes the airstrip and other surfaces and structures that aircraft and support equipment can experience or can encounter in an airport environment.

The term "sequencing," has synonyms that include, but are not limited to, the words "scrolling," "flashing," "racing", "programmed flashing," of lights, and refer to the patterns of lights on the toy, some of which may be time dependent, producing a pattern that can indicate takeoff and landing direction or runway status, or status of other toy components. The lights may be colored or not colored, depending on their intended function.

The term "toy" has synonyms that include, but are not limited to, the words "game," "modol," "simulator," and "system."

In this disclosure, the words "wired" and "wireline" mean the same thing, that an electrical connection or connections are made with wire or cable, and can pass electrical power, electrical signals, data, communications, and information.

The word "user" is the same as the word "player" or "participant" in this disclosure. These words can be used and interpreted interchangeably throughout this disclosure.

Moreover, the word "user" in its singular form, can be interpreted as the plural form "users", meaning one or more user.

The words "element," "member," and "entity" have the same meaning in this disclosure, meaning a component or constituent of a whole.

In this disclosure, the words "sheath" is equivalent to "casing," "jacket," "encasement," and "sheathing."

The words airfield, runway, landing field, and landing strip, all refer to the takeoff and landing sections of the toy described herein.

Presented herein is a method and apparatus for constructing a realistic toy airport and/or landing field. This method and apparatus can be stowed compactly and help save shipping space due to its designed modular sections, its ease-of-assembly, and its ease-of-disassembly of an airport toy layout. The apparatus and method can also permit communication between the toy, its user, other toys, and other users. The method and apparatus presented herein, having modular sections, is upgradeable to more sophisticated layouts, features, and accessories. In addition, various accessories can be incorporated to enhance the realistic behavior of the toy, such as a runway heading indicator, taxiway indicator, and terminal gate indicator. Another example of an accessory is a heliport pad or helipad. Accessories can also be modular and therefore can be easily attachable and detachable.

The toy, in addition to runway (airfield) modules, can have other airport-related modules, including taxiway modules, terminal modules, and Air Traffic Tower (ATT) modules. Moreover, this disclosure discusses toy aircraft, and includes toy ground support equipment (GSE) that can be used to simulate realistic airport settings.

This toy is substantially comprised of modules and connectors, described herein. The combination of modules and connectors are the building blocks for an assembled layout of a toy airport. Connector subassemblies are an integral part of most of the modules. Connector subassemblies can be comprised of one or more elements.

This toy airport is scalable to smaller and larger sizes.

Individual modules of the toy airport are attached together using connectors that can provide mechanical linkages, electrical continuity, or a combination of mechanical linkages and electrical continuity for the toy's assembly and/or circuitry. However, the connectors, as mounted in the modules, need not be fully set (fully affixed) in place. In other words, the connectors can have mechanical tolerances and mechanical play in any or all directions, for ease of assembly of the layout and operation of the toy.

If electrical signals are desired between modules, then the mechanical connections can be designed to also achieve electrical continuity between modules. Wirings (or electrically conductive pathways) are sometimes referred to as "busses," as in "power bus" and "communications bus." These busses can be used for functions that include electrical power, DC, AC, RF, data, and communications.

In some examples, the mechanical connector serves a mechanical purpose only, with electrical connections supplied separately. In this case, the airport toy has electrical power, but power (or other electrical function, such as data or communications) can be presented to each module separately, from individual power sources such as, but not limited to, batteries.

In addition, some embodiments can have modules of the airport toy are non-powered. Note that for non-powered airport toys, the connectors only act as mechanical connectors. Some accessories are not modules yet can be attached to a module's surface. In the same way, components (for example, some accessories) can be non-powered, where connectors only act as mechanical connectors.

Subheading: Integrated Modules and Layered Module Construction

The modules for this toy can be preassembled. Modules can be prewired assemblies whose electronics and internal parts are generally not accessible to the user. In other words, they can be self-contained modules featuring connectors that permit a module-to-module connectivity.

In this disclosure, many of the possible components of the toy, such as modules and connectors, are substantially right parallelepipeds in shape. To establish nomenclature for some of the discussions herein, the faces of the parallelepipeds are referenced in FIGS. 6A-6C. For this disclosure, we use the word "entity." The word "entity" herein means any part or subassembly of the toy, and need not be monolithic. The entity 600 has six faces: a top surface, a bottom surface, and four edge-faces, including a top surface 601, bottom surface 602, left edge-face 603, right edge-face 604, near edge-face 605, and far edge-face 606. Likewise, the entity 610 has six faces: top surface 611, bottom face 612, left edge-face 613, right edge-face 614, near edge-face 615, and far edge-face 616.

FIG. 6C shows the two entities 600, 610 mated together so that there is no significant gap between the parallelepipeds. The mating surface region 621 is shown in FIG. 6C. In this example, a mating surface 621 is made between a right edge-face 604 and a left edge-face 613. However, mating surfaces can be made between any of the six faces on each of the two parallelepipeds to be connected, depending on their design, function, or placement. Moreover, cases are possible where more than two parallelepiped-shaped entities are connected together.

The six-faced parallelepiped shape described herein is only one example of possible embodiments for components of the toy. The six-sided parallelepiped was selected for discussion because of its logical shape and construction, but it should be noted that this airport toy and its modules and accessories are not limited to six-faced parallelepiped shapes. Any shape (for example, curved shape, or eight faces, or nine faces), can be used, if said shape is suitable for use in an airport toy. For example, looking at the top surface from above, a module can be curved-shaped or intersection-shaped, for having enhanced layout patterns.

The toy airport layout is assembled by attaching modules together. Each step in the toy layout process is concerned with attaching two adjacent modules to each other, a first module and a second module. In one embodiment, connectivity is made from the first module to the second module using the left edge-face, right edge-face, near edge-face or far edge-face of the first module, and connecting to the left edge-face, right edge-face, near edge-face or far edge-face of the second module. In the same manner, accessory sections can be attached using any of the six faces of a module. The top facing surface is used for placement of the toy planes, markings, lights, accessories, features, and other toy airport features. Embodiments of this airport toy have individual parallelepiped-like modules, resembling rectangular tiles, that are the following approximate sizes: 7 inches by 14 inches by/2 inches, 7 inches by 7 inches by 2 inches, and 7 inches by 3% inches by 2 inches. In other words, in some embodiments, an airport layout pattern is comprised of a set of modules based on a combination of each of these sizes. The layout pattern can change, in general, based on the design of the toy, however the set of modules is comprised of a combination of any of these three sizes. In addition, in some embodiments, there are one or more T-shaped modules, which are %2-inch thick, by 14-inches by 7-inches, narrowing down from 7 inches to about 3 inches. These are example sizes for modules, whereas module dimensions can be designed to be any desired size. Thus, this toy, and the modules and sections that make up this toy, are scalable by design to larger and to smaller sizes.

Figure 12A:
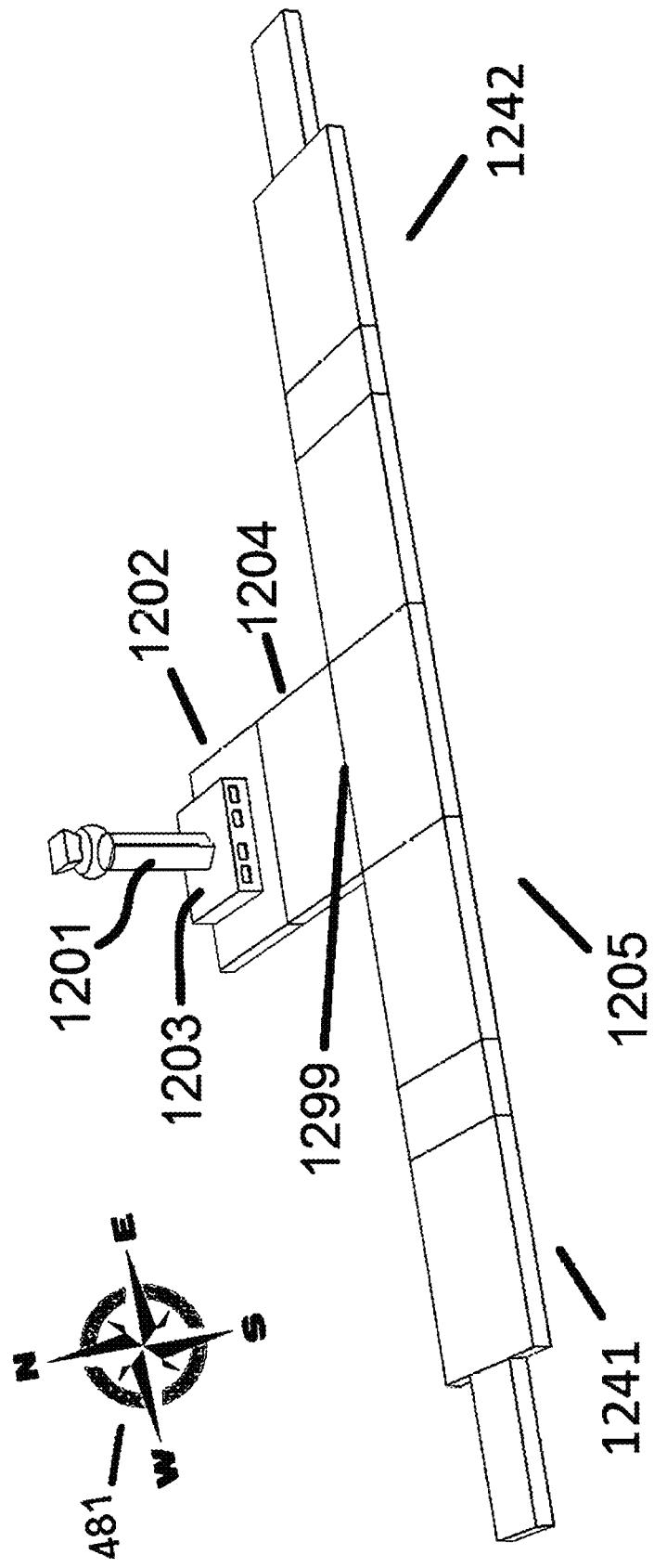
FIG. 12A is a perspective view of one embodiment of an airport toy comprised of a single runway plus other modules and structures.
Figure 12B:
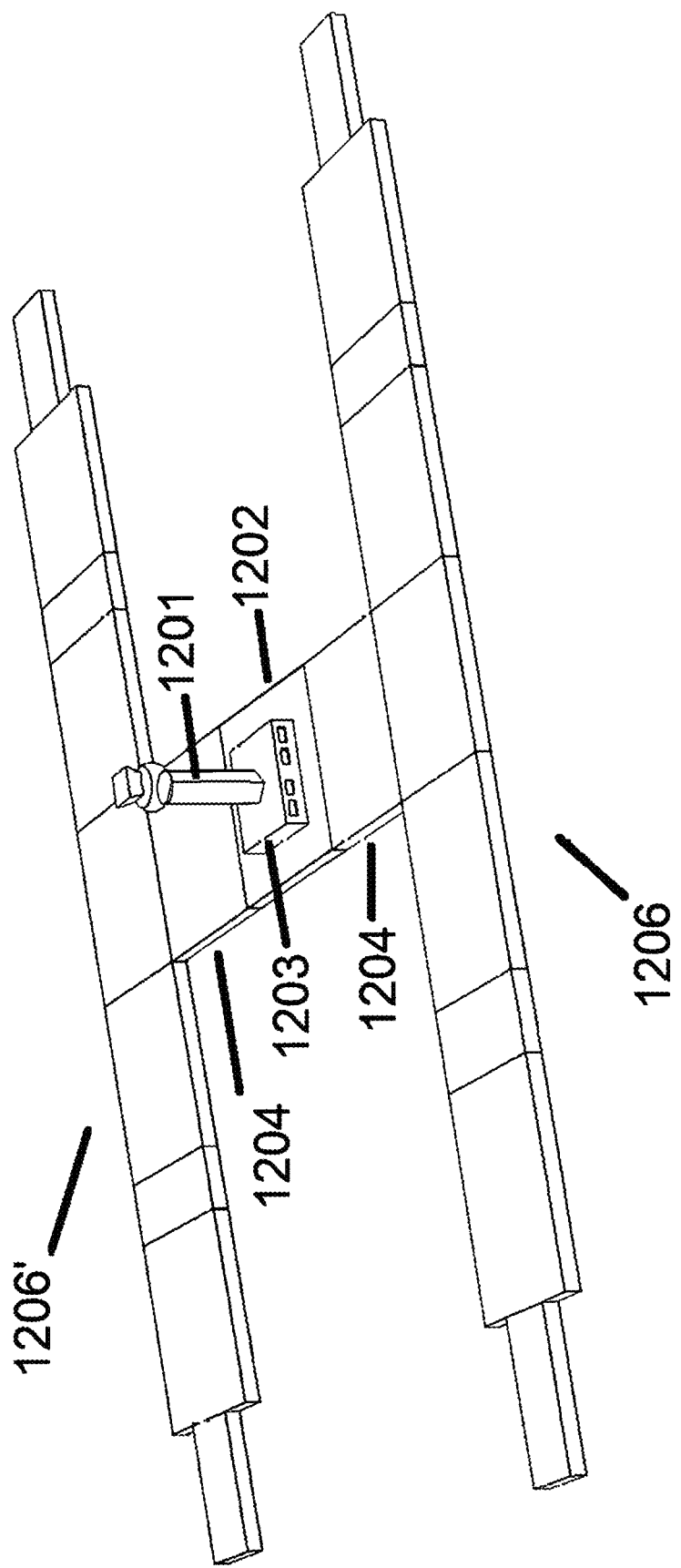
FIG. 12B is a perspective view of one embodiment of an airport toy comprised of two runways that are parallel to each other plus other modules and structures.

The airport toy can be laid out by a user in a substantially tile-layout style from individual sections. Sections are also called modules. Examples of toy airport layouts include end-to-end edge-face-to-edge-face connections of individual modules (FIGS. 15A-15B, for example) to form a single line of modules, with only a runway layout and no branching of the layout. Examples also include side-by-side edge-face-to-edge-face connections of individual modules (FIGS. 12A-12C and FIG. 16A, for example), or a combination of end-to-end connections and side-by-side connections (FIGS. 19A-19B, for example) to produce either a linear airport playing surface, a branched playing surface, or a grid-like playing surface that has a grid-like visual appearance from above. An example of a linear airport playing surface layout is in FIGS. 15A-15B. Examples of linear combined with branched playing surfaces are shown in FIGS. 12A-12C, where there is a branch at side-by-side intersection 1299. An example of grid-like airport playing surface layouts are shown in FIGS. 17A-17B and in FIGS. 22A-22B.

Figure 5A:
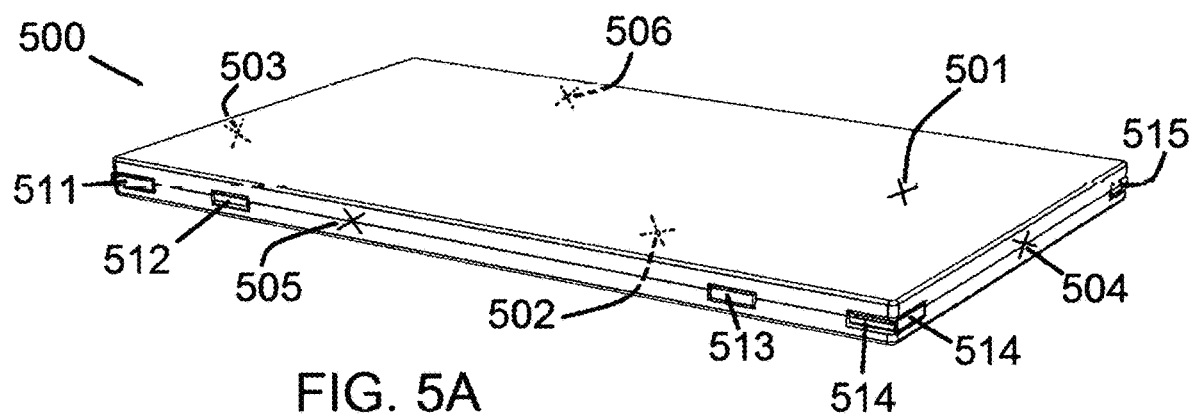
FIG. 5A shows an example module (building block) for the toy airport.

The modularity facilitates connection, disconnection, storage, manufacture, and shipping of the toy airport. Referring to FIG. 5A, each rectangular-shaped module is substantially a right parallelepiped with six surfaces. An example module 500 is shown in FIG. 5A. In this disclosure, the six faces can be called as follows: top surface 501, bottom surface 502, left edge-face 503, right edge-face 504, near edge-face 505, and far edge-face 506.

Returning to FIG. 5A, in regard to modules used for sections of the toy, the top surface 501 can also be called the "surface facing up" or the "playing surface." Moreover, for some examples, the bottom surface 502 could, as part of a toy layout assembly, be flipped-over 180 degrees (rotated 180 degrees) and thus serve as the top facing surface, and likewise the top surface 501 can thus be flipped-over 180 degrees (rotated 180 degrees) to serve as the bottom surface (or the "bottom facing surface") of the toy.

Continuing with FIG. 5A, an airport toy can be comprised of a series of modules that are attached together using connector subassemblies. These connector subassemblies are an integral part of the module 500. Connectors, if incorporated during manufacture, are integrated into modules, and thus are not intended to be removed or taken apart by a user. In this perspective view, the rectangle-like entities 511, 512, 513, 514, 515, shown on two edge-faces 505, 504, only show some of the possible connectors and connector locations that are used for assembling the layout of the toy. In FIG. 5A, connectors for the left edge-face 503 and far edge-face 506 of the module 500 are not shown. The rectangle-like entities 511, 512, 513, 514, 515 in FIG. 5A depict only the exposed (outer) surfaces of the connectors, and not the full 3D structure of these connectors.

Figure 5B:
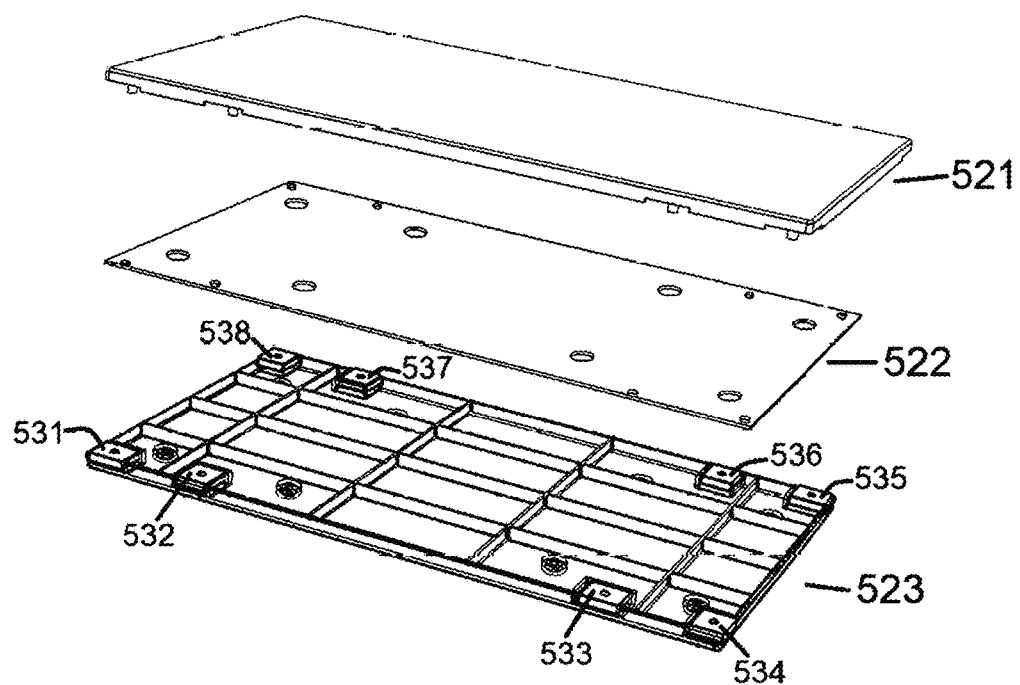
FIG. 5B shows an exploded view of a layered module based on the example shown in FIG. 5A. In the example shown in FIG. 5B, the layered components are comprised of a base (bottom) section, and middle section, and a top section.

Now, turning our attention to the example in FIG. 5B, an integrated module can be constructed from one or more layers in its fabrication. In FIG. 5B, the module shown is made of three layers 521, 522, and 523. The top layer 521 is the playing surface, and this layer 521 may also include provisions for supporting components (including artwork) for visual simulation effects. In the example in FIGS. 5A-5B, artwork is supported on the top layer 521 as part of the manufacturing process for that layer, as an inseparable, integrated part of the top layer, thus the artwork is an inseparable, integrated part of the example module 500, and can be observed by the user visually on the top surface 501. The middle layer 522 can support electronic components and other components for one or more functions, not limited to the powering of the toy's electronics. The bottom layer 523 can be used for rigidity, and it can support the connectors.

Continuing our discussion of integrated modules and layered module construction, and keeping with the visual appearance of the airport setting/scene, the top facing surface of the toy airport has markings (visible patterns) which are described as "artwork" in this disclosure. The word "artwork" can interpreted as a material or set of materials with any combination of opaque markings, opaque areas, transparent areas, and semi-transparent areas, and possibly combined with areas without markings. In other embodiments, any amount of etched markings can be used as part (or all) of the artwork. In some examples of the airport toy layout, the top-facing surfaces of modules of an airport toy and the bottom-facing surfaces both can have airfield displays (artwork).

Individual modules are integrated structures, meaning that they are manufactured to be of integrated constructions and are not meant to be taken apart by the user. Modules can have artwork integrated into the module's top surface. For example, FIG. 18D shows three layers of an integrated module, a bottom layer 1823, an electronics layer 1822, and a top layer 1821. The artwork in this example is an integrated part of top layer 1821 and thus the entire module, including artwork are fabricated as a single integrated module. Further considering this example, FIG. 18C shows the module of FIG. 18D in an unexploded view 1871, as assembled during manufacture.

Figure 18A:
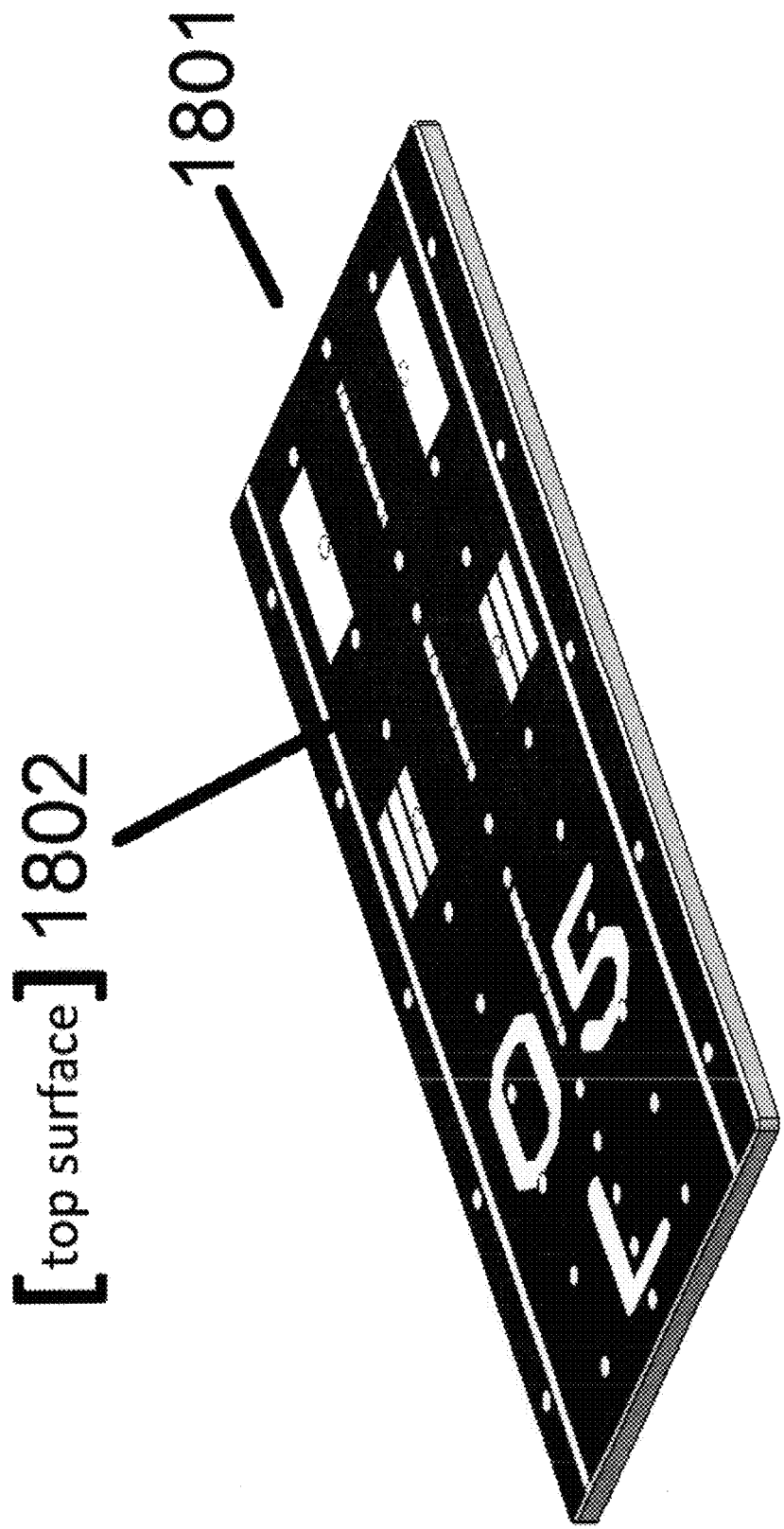
FIG. 18A shows example an example of a user-removable artwork layer.
Figure 18B:
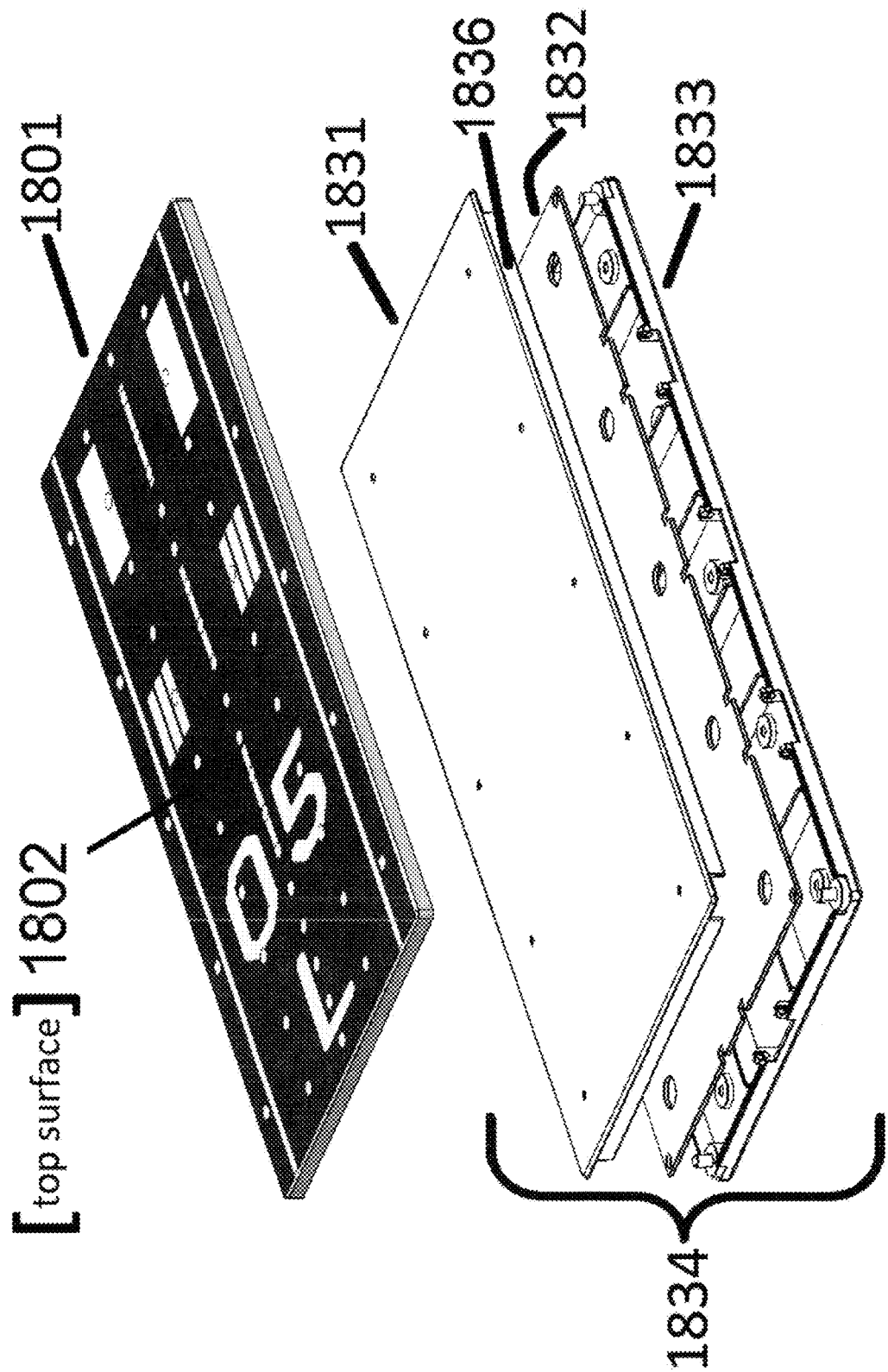
FIG. 18B shows an integrated module capable of supporting a user-removable artwork layer as in FIG. 18A.

However, there are some examples where the integrated module 1834, shown to FIG. 18B, are manufactured without artwork integrated into them. In these examples, the modules can support a separate, user-attachable and user-removable artwork layer (refer to FIGS. 18A-18B, reference number 1801) that can be placed on to the top surface of an integrated and factory-assembled module 1834. Thus, the artwork layer 1801 is an independent structure that can be used to display artwork for the top-facing surface 1802 of the module, and is shown in FIGS. 18A-18B. In addition, an artwork layer 1801 can be used to customize or change the layout or appearance of an airport toy.

An example of an integrated module 1834 with removable artwork 1801 is shown in FIG. 18B. In FIG. 18B, the example integrated module 1834 is shown as an exploded view of its set of layers 1831, 1832, 1833. In this example, layer 1831 is a light diffusing layer, layer 1832 is an electronics layer, and layer 1833 is a bottom layer.

Elaborating on these layers in FIG. 18B, one or more light sources can be positioned on or near the electronics layer 1832 so that the light diffusing layer 1831 can be illuminated. The removable artwork 1801 is designed to work with diffuse lights, where electrically powered lights (for example, individual LEDs) can be integrated into the electronics layer 1832 at various locations in the module and whose light is used to uniformly illuminate a light diffusing layer 1831. In another embodiment, light sources are placed around the perimeter 1836 of the diffusive material 1831, thereby illuminating the diffusive material inward from its edge-faces and with light directed inward of the diffusive material, in a light-piping manner.

Figure 22A:
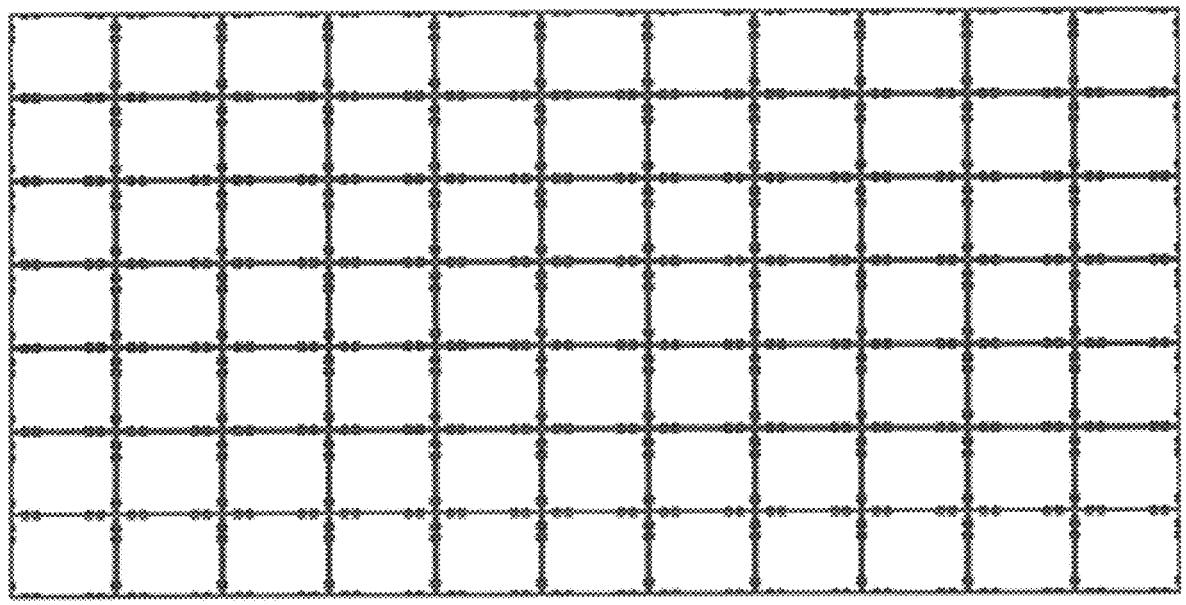
FIG. 22A shows an example of a grid of modules as shown in FIG. 19B.
Figure 22B:
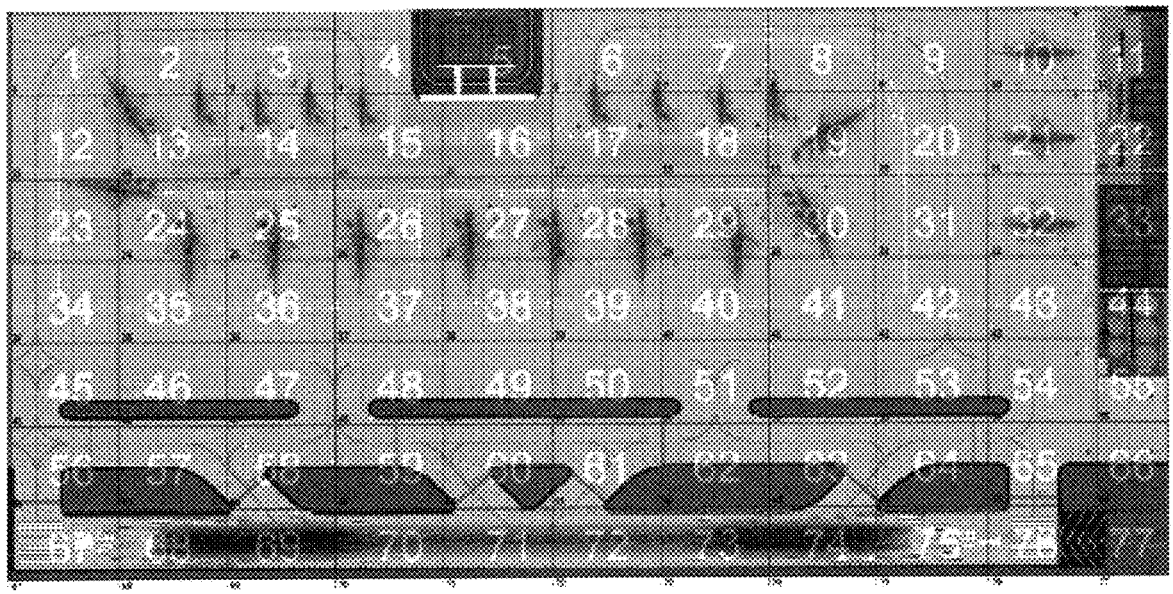
FIG. 22B shows a case where a commercially available overlay, mat, foil, or diorama is placed on top (over) a grid of modules.

A further example of removable artwork layer is of a grid-pattern layout of integrated individual modules, with a removable artwork mat spanning multiple modules (or all modules), and is shown in FIGS. 22A-22B, to be discussed later.

In another embodiment, shown in FIG. 18A, there is only one single integrated layer, and it is described as the artwork layer 1801. In this example the artwork is integrated in to (or on to) the single-layered module 1801. Thus, for this example the artwork layer 1801 is the entire module. Thus, in the example, the factory fabrication process produces each module with only a single overall layer, supporting artwork, and with a means for connecting more than one artwork modules together. In other words, an airport toy is laid-out by a user by connecting artwork modules together, without further structure underneath, to form an airport toy layout scene. However, due to its versatile single-layer-construction, artwork layer 1801 can be easily used in another embodiment, as shown in FIG. 18B.

FIG. 18B depicts away of that layer 1801 (artwork layer) can be used with an integrated module 1834 underneath. Thus, for enhanced features, an airport toy can be laid out using a combination of artwork layers 1801 with integrated modules 1834 underneath to form a toy airport layout scene.

Considering further with FIGS. 18A-18B, the artwork layer 1801 has any combination of transparent areas, translucent openings, colored openings, and other opaque or non-opaque markings on the playing surface 1802 to permit visual aid, appearance, and guidance to the player. The artwork can be illuminated from underneath for visual enhancements. The layers 1831, 1832, 1833 (everything but the artwork layer 1801) are fabricated together as an integrated module 1834, and the module 1834 can be passive or electrically active for supporting any combination of features, including lights, sound, compasses, communications, and detectors.

Now we turn our attention to FIGS. 18C-18D, where artwork is integrated in to (or on to) the top layer 1821 and thus the artwork is not separable by the user from the integrated module 1871 itself. Other examples of lighting can be comprised of discrete, individual lights or with any combination of discrete and diffuse lighting. An example of discrete lighting is presented here for an integrated module 1871 as shown in FIGS. 18C-18D. An exploded view of integrated module 1871 of FIG. 18C is shown in FIG. 18D. The artwork that is integrated in to or on to the top layer 1821 is designed to be illuminated using discrete lights, where electrically powered lights (for example, individual LEDs) in or near the electronics layer 1822 and whose light can be observed through the top layer 1821. Thus, the light provides an enhancement to the playing surface 1870. In this example, there is a spatial correspondence between the windows/openings in the artwork for the top layer 1821 and the discrete light sources.

Figure 18E:
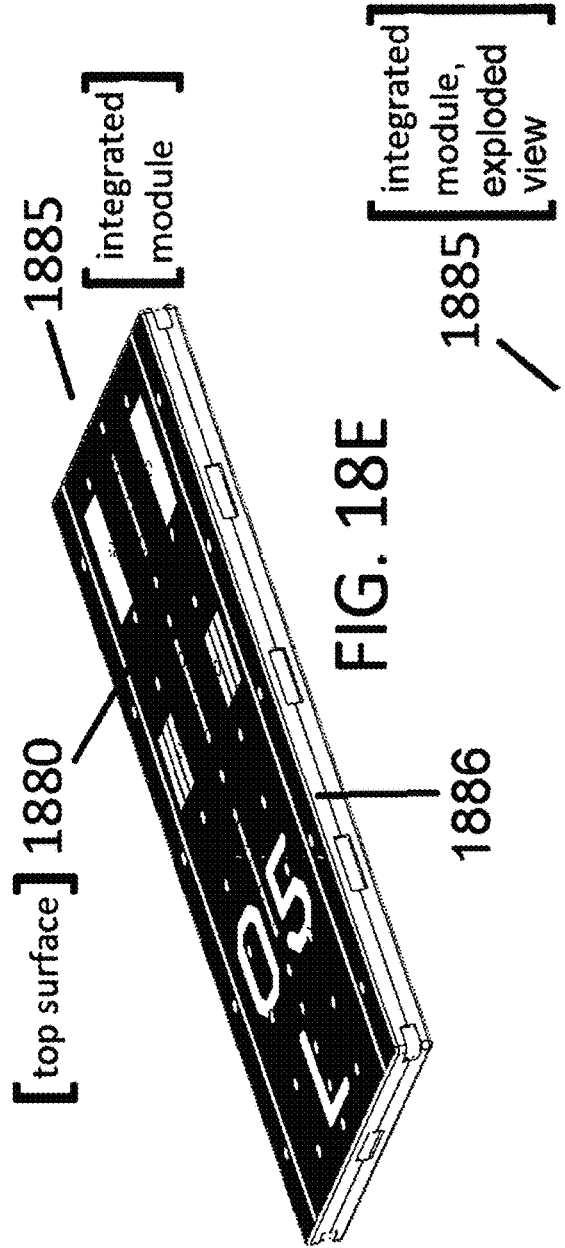
FIGS. 18E-18F show an integrated module where artwork is integrated into the top layer and where the artwork is not user-removable, and where a light diffusing material is integrated into the top layer.
Figure 18F:
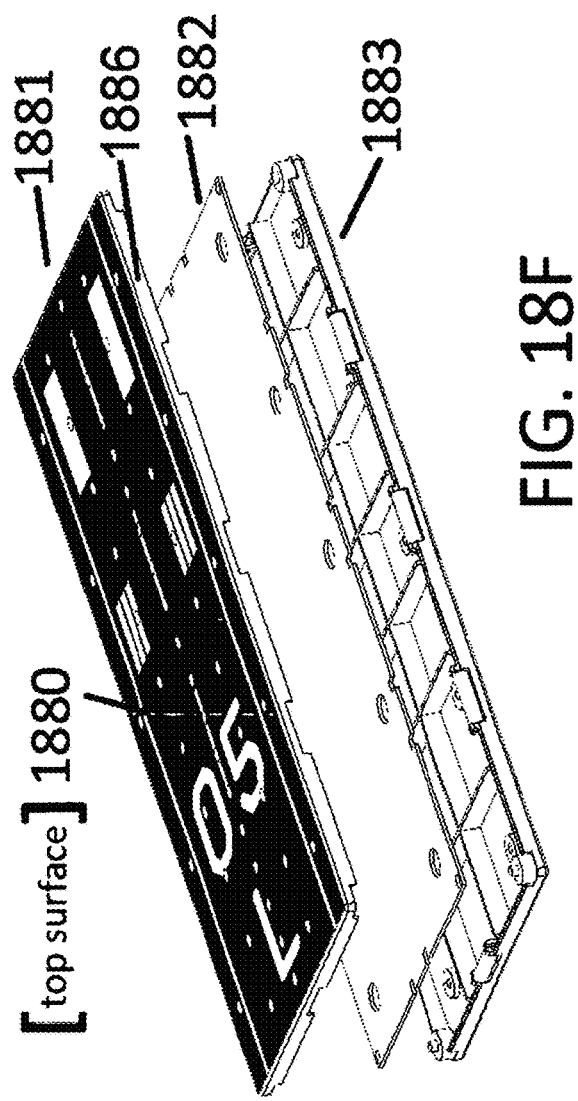

Now we turn our attention to FIGS. 18E-18F, where artwork is integrated into (or onto) the top layer 1881 and thus the artwork is not separable by the user from the integrated module 1885 itself. In this example, the top layer 1881 is fabricated from light-diffusing material. In this example, the top layer artwork 1881 is designed to work with diffuse lights, where electrically powered lights (for example, individual LEDs) can be integrated into the electronics layer 1882 at various locations in the module and whose light is used to uniformly illuminate a light diffusing material in the layer 1881. This diffuse light can be observed by the user, from above, through the top layer 1881 at one or more areas. Thus, the light provides an enhancement to the playing surface 1880 (also called top surface).

Referring further to FIGS. 18E-18F, in another embodiment, light sources are placed around the perimeter 1886 of the light-diffusive material in the top layer 1881, thereby illuminating the diffusive material inward from its edge-faces, in a light-piping manner.

The light diffusing layer may be fully transparent, fully translucent, fully opaque, or any combination of these properties. One embodiment has a translucent layer of plexiglass for diffusing light. The light diffusing layer can be made from plexiglass with one or more frosted, etched, engraved, rough-polished surfaces, or any combination of these surfaces. Other materials for the light-diffusing layer can be used, such as polycarbonate, acrylic, glass, plant-based plastic, or any transparent or semi-transparent medium suitable for diffusing light. One example of a material for light diffusing layers is a non-yellowing polycarbonate.

Figure 24:
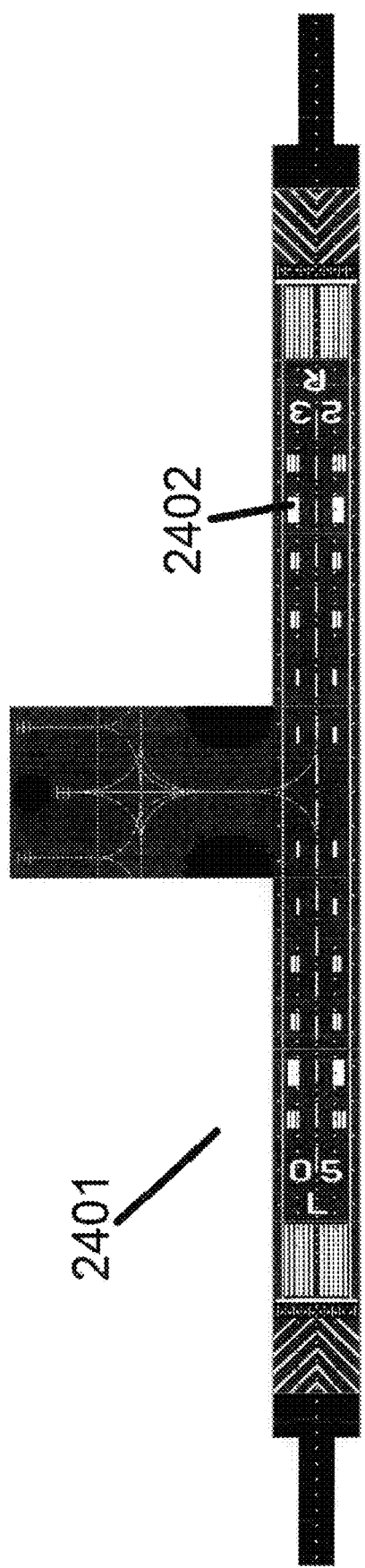
FIG. 24 shows another embodiment of an airport toy with example artwork, as an overhead view.

Another embodiment of an airport toy 2401 with example artwork 2402 is shown in FIG. 24, as an overhead view.

Subheading: User Layout of Toy Airports

Now we turn our attention to how users connect modules together to form an assembled airport toy. The airport toy is comprised of a series of one or more modules that can be connected. Modules are attached together in a systematic manner, as a series of assembly steps, where one module is connected to the next adjacent module, until the desired layout is completed. The method of connecting one module to the next adjacent module can be considered for this discussion as an individual assembly step, where a first module is connected to a second module.

Elaborating on the use of the word "connected," in the sense of connection of modules or accessories of a toy airport, "connected" means that one or more modules are mechanically linked, electrically linked, or a combination of mechanically and electrically linked together to form a toy airport. Connections can provide an ability to move (or roll) toy objects along the playing surface smoothly, without significant gaps in the playing surface. The connectors may or may not conduct electricity. Some embodiments have the modules and accessories connected to each other, for mechanical support, or for electrical continuity, or for both mechanical support and electrical continuity. In some embodiments, connectors are not used. In other words, one or more of the modules and accessories are placed next to (or near) each other, without explicit mechanical connections and/or without electrical connections.

Going back to our discussion of how players (users) put together (assemble) an example airport toy layout, we describe an example assembly method (by users) as a sequence of steps. Consider two modules, a first module and a second module, to be attached together with connectors. For this example, embedded or semi-embedded connectors can be the means of attaching the two said modules. For one example, there can be a pair of mating connectors: a first connector and a second connector. The first connector is mounted within the first module, and a second associated connector is mounted within the second (adjacent) module. The mechanical placement of these connectors permits substantial alignment between mating connectors because the first and second modules are lined-up during assembly of the layout toy.

In one embodiment, as the modules are positioned by the user so that they are proximate to each other, the corresponding connectors develop a magnetic force that draws the connectors together to make the connection between the first and second modules. Thus, we have described two adjacent modules being connected together with one pair of mating connectors. However, there may be more than one connector on (or in) any face of a module, resulting in more than one mating pair of connectors for attaching one module to another module. This is further described in the next paragraphs, with an illustrative example.

In some embodiments, where connectors are in or on the top or bottom surfaces of a module or accessory, the connectors are substantially not protruding, permitting a substantially planar bottom surface (bottom face) and substantially planar top surface (top face) so that the toy apparatus lays substantially flat on a floor, table, or flat surface, and so that toy aircraft and other vehicles can move along the top surface without obstruction. In this regard, the phrase "substantially not protruding" means that the connector does not extend beyond said module surfaces significantly, so as to allow the layout of the toy to lay flat on a support surface (floor), and to not obstruct vehicles and aircraft on the playing surface. As an example, connectors are "substantially not protruding" for a top surface if the connector does not extend beyond the surface by more than 5 mm. Likewise, as an example, connectors are "substantially not protruding" for a bottom surface if the connector does not extend beyond the bottom surface by more than 5 mm.

In some embodiments, the connectors provide for mechanical and electrical connection across segments or modules, connecting one edge-face of a first module, to an edge-face of a second module, and for connecting a second edge-face for a second module to a first edge-face of a third module, and continuing in this manner until a user assembles a complete airport toy layout. For these connections, where connectors are on edge-faces of a module or accessory, the connectors are substantially not protruding, providing substantially planar edge-faces so that the modules are laid-out together to form a toy airport layout without significant gaps between edge-faces of connected modules. In this regard, the phrase "substantially not protruding" means that the connector does not extend beyond said edge-faces by a significant amount, for example, so that a resulting gap between two modules, once two modules are connected, is not more than 2 mm.

A given mechanical connector (for connecting modules) can also be considered to be a "subassembly" of its constituent parts that make up the connector. Therefore, in this disclosure, we occasionally use the term "subassembly" to refer to the "connector" or "connector assembly." There can be one or more of these connector assemblies mounted on or in each face of a module. Some faces of a given module may have no connectors.

Figure 9A:
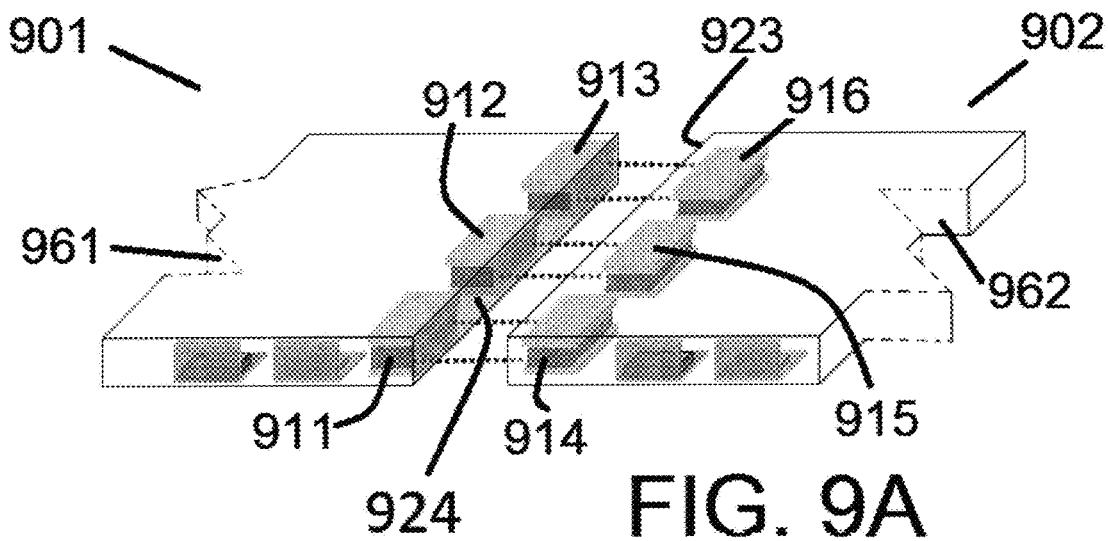
FIG. 9A shows a view of two modules that are proximate, but disconnected, having example magnetic connectors.
Figure 9B:
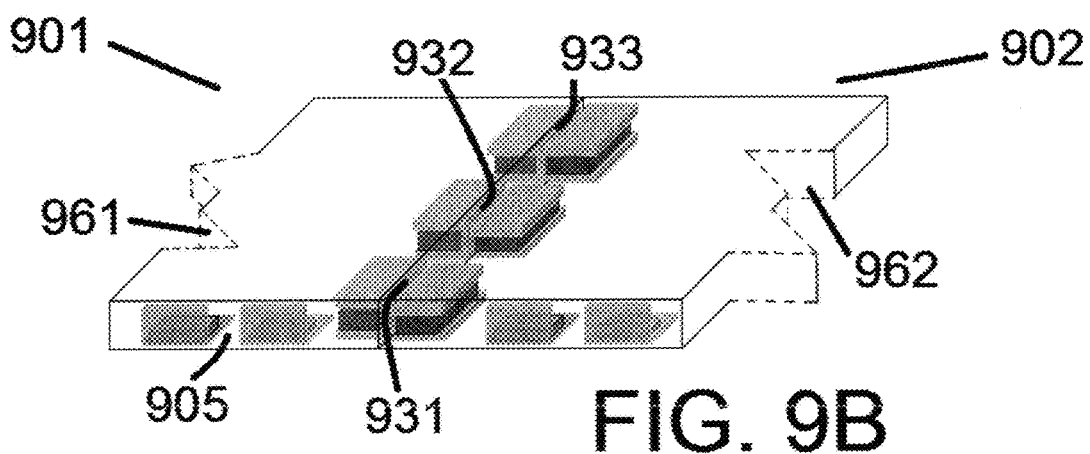
FIG. 9B shows a view of two modules that are connected using example magnetic connectors.
Figure 9C:
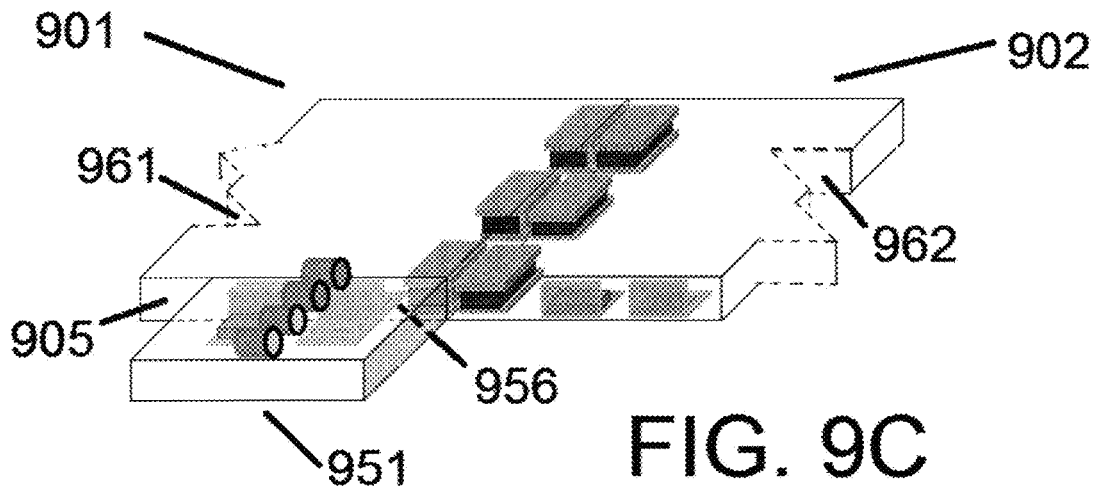
FIG. 9C shows connected views of three modules using example magnetic connectors, showing a location where one accessory module can be connected to one of the two modules depicted in FIGS. 9A-9B.

Now, we consider a case where more than one connector subassembly is mounted on or within a module's face. As an example, FIGS. 9A-9C show upper perspective views of adjacent modules that house multiple magnetic mechanical connectors. Referring to FIG. 9A, as an example of the method of attaching modules to each other, a pair of modules, comprised of a left (first) module 901 and a right (second) module 902 are brought into proximity to each other for a means of attachment to each other. In this example, the right edge-face 924 of the first module 901 supports three connectors 911, 912, 913 that are embedded or semi-embedded into the module 901. Likewise, the left edge-face 923 of the second module 902 supports three connectors 914, 915, 916 that are embedded or semi-embedded into the module 902.

To further describe the example connection process, as the modules 901, 902 are positioned proximate to each other, the corresponding connector subassemblies develop a magnetic force that draws the subassemblies together to make connections between the first and second modules, of which the end point of this process is shown in FIG. 9B. Thus, FIG. 9B shows three connections 931, 932, and 933 making contact. These interconnections can provide mechanical attachment or can provide a combination of mechanical attachment and electrical connectivity.

One way of establishing stable electrical connection from the left module 901 to the right module 902 is to make the electrical connections with the aid of mechanical connector subassemblies 911-916 that are comprised of conductive elements, partially conductive elements, or a combination of conductive and nonconductive elements. In addition, the conductive path can be independent of (separate from) the mechanical connectors, electrically connecting the first module to the second module in one or more locations that are separate (electrically isolated) from one or all mechanical connectors that are used for the two modules being connected. The actual locations of the connectors on a face can change, depending on the design of the module; therefore, the locations depicted in FIGS. 9A-9C are example locations.

With continuing reference to FIGS. 9A-9C, the embodiments depict connectors capable of making continuous and secure mechanical connections by magnetic forces between connectors, thus holding modules together. The mechanical connection can be facilitated by magnetic attraction, by employing magnets within the structure of the connector itself. The right edge-face 924 of the left module 901 and the left edge-face 923 of the right module 902 are depicted in FIG. 9A with figurative break lines 961, 962 to indicate only a portion of each individual module is depicted in this figure.

FIG. 9A shows illustrative dotted lines to depict the possible alignment of the connectors of one module to the corresponding connectors of an adjacent module. The connectors depicted in FIGS. 9A-9C are substantially embedded within the module, in other words they are not substantially protruding. In FIGS. 9A-9C, the connector subassemblies are substantially embedded within the modules, yet it is possible in some embodiments that connectors can extend beyond any face of its module. In addition, other embodiments of this airport toy can use connectors that are not fully embedded into the module. Moreover, it is possible to use connectors that result in small gaps between modules when connected; in other words, —when the modules are connected for laying out an airport toy, small gaps between faces of adjacent modules of up to 2 mm in separation can occur.

As another example, connectors can be fully embedded within a given module, or substantially embedded within a given module. Thus, in some embodiments, when the modules are brought together to make a connection, the mating connectors themselves do not physically contact (touch) each other—they are connected magnetically, through the modules' surfaces, where only the modules' surfaces touch each other, and not the connector. This example is not shown explicitly with FIGS. 9A-9C.

Moreover, other embodiments of this disclosure utilize other connector types to make mechanical connections that provide electrical continuity from one module to another module. Such connectors may or may not protrude substantially from a face of a given module. An example of an embodiment of an alternative mechanical connection is an electrically conductive pin-and-socket mechanism, which uses friction and mechanical tolerances to align and connect one module to another module, while permitting electrical continuity from one module to another module. Although no electrical wires are depicted in FIGS. 9A-9C, it is understood that there can be connective conductive wires, PCB traces, or any combination of conductive wires and PCB traces, attached to the connectors—depending on the desired design—for the operation of the toy.

Figure 16A:
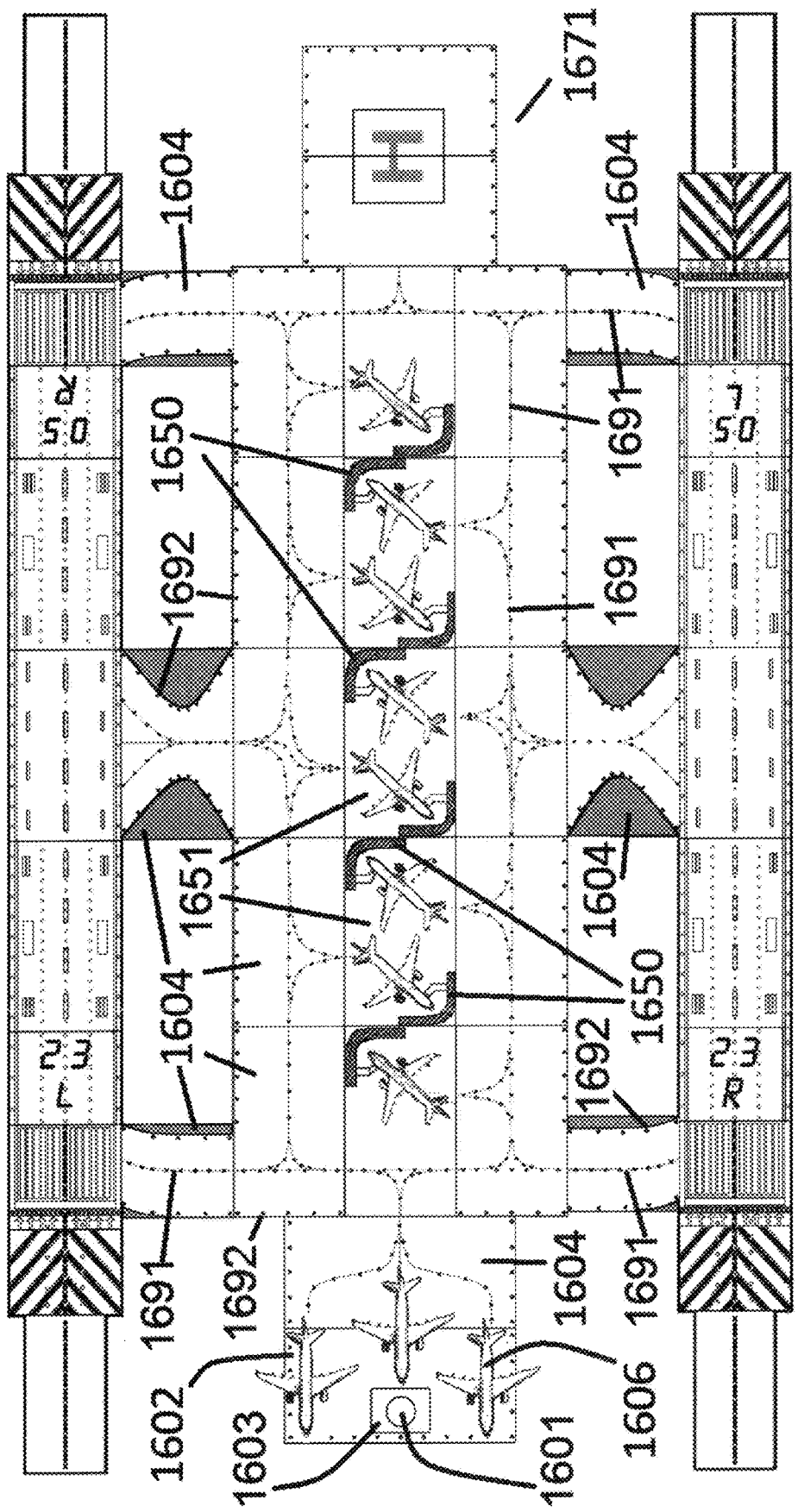
FIG. 16A shows another embodiment of an airport toy of this disclosure, as an overhead view.

The magnetic and electrical connections described herein can be substantially not protruding from any module surface. This has advantages during the player's assembly of the toy to form an airport toy layout. For example, if many modules are required to form an entire airport toy in a grid pattern, for example beyond a linear runway where modules are laid-out edge-face to edge-face, then connection mechanisms associated with a given module are designed to connect at both a near edge-face or far edge-face, and perhaps also at a right edge-face and/or left edge-face. Connection of modules end-to-end, from edge-face to edge-face, in combination with connection of modules (and/or accessories) at any face, constitute a "two-directional" (X-Y Cartesian-like) grid of modules (and/or accessories). An example of this is shown in FIG. 16A. Conventional pin-and-socket mechanisms, having protruding pins or connectors, can—in some embodiments—be problematic in forming a two-dimensional grid of modules. Some embodiments of this toy airport have a combination of connector types, for example pin-and-socket connector plus, for example, magnetic connectors that are less protruding. In this context, the word "protruding" means that the connector extends beyond the face of the module.

In addition, other connector mechanisms can be used for connecting modules for mechanical connection, electrical connection, or both mechanical and electrical connection for this toy, including pogo-pin style, spring-loaded, retractable connectors, and non-spring-loaded friction-based connectors. Sometimes these pins & sockets can be encased in their own connector housing (or "header"), and in other examples, these pin & sockets can be stand-alone entities mounted on the face of a given module.

Now we consider an accessory module 951 for the airport toy. The accessory 951 is connected to the near edge-face 905 of the pair of modules 901, 902 as shown in FIG. 9C. In this example, the accessory shown is a PAPI (Precision Approach Path Indicator—as one type) module 951 but could be, in the location shown, any accessory module for the toy airport. For the PAPI accessory module shown, its far edge-face 956 is connected to the near edge-face 905 of the corresponding module. In FIG. 9C, three modules 901, 902, and 951 are shown connected together using the mechanical or mechanical electrical connector method described in this disclosure. For the embodiment shown in FIG. 9C, the connectors are magnetic, and thus the modules are attached together with magnetic forces or a combination of magnetic force and frictional forces. Furthermore, for the embodiments depicted in FIGS. 9A-9C, the connectors are capable of providing electrical continuity between modules 901, 902, and 951.

Subheading: Details of Connectors

Now we are turning our attention to a more detailed description of examples of connectors that are used in the modules and accessories for an airport toy. Connector assemblies can mate, attach, or connect to each other using mechanical forces. Example forces may include, but are not limited to, magnetism, friction, or a combination of magnetism and friction.

In this disclosure, for describing connector assemblies, the word "sheath" is equivalent to "casing," "jacket," "encasement," and "sheathing," and generally refer to the component or components surrounding a connector to form a functional connector assembly.

Now we turn our attention to FIGS. 7A-7H for describing two separate examples of connector assemblies that can be used to connect modules & accessories together for the airport toy layout. The two connector subassemblies described in FIGS. 7A-7H will be detailed here using FIGS. 7A-7D as illustrating a first example 720, and using FIGS. 7E-7H as illustrating a second (independent) example 730. These connectors 720, 730 are presented herein as two independent examples, which are not intended to necessarily mate to each other, but can be designed to mate with each other. For the examples in FIGS. 7A-7H, there are magnetic elements 721, 731 mounted within (placed within) each of the two subassemblies, 720, 730, respectively. For the two connector examples shown in FIGS. 7A-7H, each of the two connectors can be regarded as "subassemblies," comprised of a magnet element and one or more sheathing elements.

Wiring(s) that attach to the connector assembly can have discrete wires; or, the electrical connection can be directly integrated with the connector sheathing, by direct integration with, for example, one or more circuit boards that are internal to a given module.

Now, we turn our attention to FIGS. 7A-7D, which correspond to four views of a connector subassembly 720 as follows: FIG. 7A is a top view, FIG. 7B is a side view, FIG. 7C is a front view, and FIG. 7D is a perspective view. In this example, the connector is parallelepiped-like, where the right edge-face 704 of the connector subassembly 720 shown in FIG. 7D is also referred to as the mating face (right edge-face 704) f the connector subassembly 720.

In the connector subassembly example 720 shown in FIGS. 7A-7D, the sheathing element 722 is comprised of three sections 702, 704, 701 that cover the bottom surface, right edge-face, and top edge-face, respectively, of magnet element 721 to provide a continuous "U" shaped sheathing element 722. In this example, the near edge-face and far edge-face of magnet element 721 are not covered substantially by any sheathing material. The connector in this example, FIGS. 7A-7D is comprised of a magnet element 721 encased in a substantially "U-shaped" sheathing element 722. The material used for the sheathing 722 (or casing 722) can be electrically conductive or not conductive, preferably conductive so that electrical connections can be made.

It should be noted that for subassembly 720, the substantially "U-shaped" continuous sheath shown in the example can have embodiments where the sheath covers or partially covers any or all of any of the sides of the magnet element.

In addition, the exact shape of the magnet or its sheath does not need to be generally right-parallelepiped. Either the magnet or sheath (or both) can be any geometrical shape that will permit a magnetic attraction from one connector to another connector. Moreover, the magnetic element in said connectors can be designed to be free to rotate so that the poles of the magnets can self-align (with an attractive force between connectors) when the connectors are positioned proximate to each other. The examples shown in FIGS. 7A-7H are two embodiments, for illustrative purposes.

In another embodiment, the magnet element(s) can be embedded in the module, near the module's face. This approach is different from the use of an integrated connector sub-assembly as shown in FIG. 7 in that it uses magnets that are substantially embedded in one or more modules. The magnets may or may not be sheathed in a sheathing material as shown in FIG. 7. The magnets in this example may or may not be free to rotate. When the two modules are positioned proximate to each other, the first and second modules develop an attractive force between the faces of the module to produce a magnetic mechanical connection between the two modules.

As an example of how to implement the connector 720 in an airport toy, we consider two separate modules to be connected together by the user. Connector 720 is mounted in the first module, so that it is embedded or semi-embedded into the right edge-face of the first module. A second connector 720 is mounted in the second module so that it is embedded or semi-embedded into the left edge-face of the second module. The two modules are positioned proximate to each other. The connectors, being magnetic, exert an attractive force on each other and the two modules thus attract each other. The connectors can thus make contact and form a mechanical connection between the two modules. Zero, one or more connectors can be used per face, for each module face.

Figure 7E:
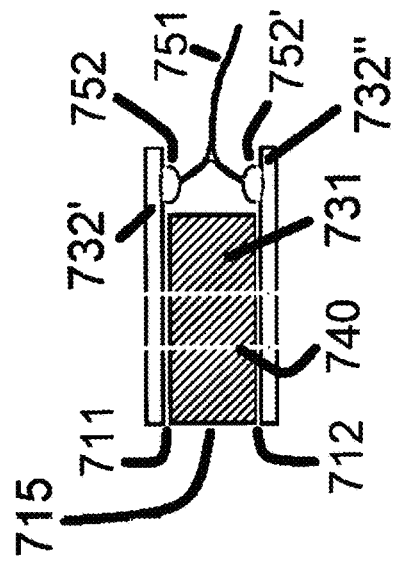
FIGS. 7E-7H depict another embodiment (another type of connector) of a magnetic connector for achieving mechanical connection, electrical continuity, or a combination of mechanical connection and electrical continuity between modules.
Figure 7F:
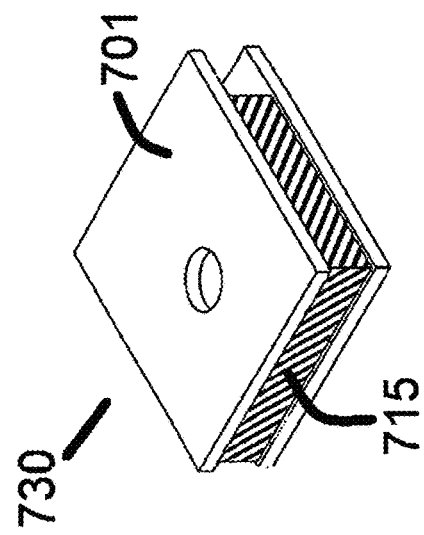
Figure 7G:
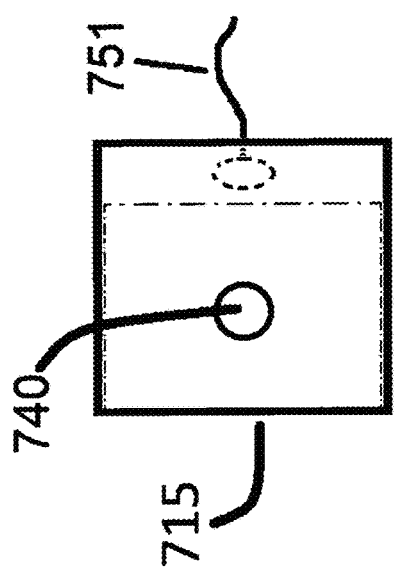
Figure 7H:
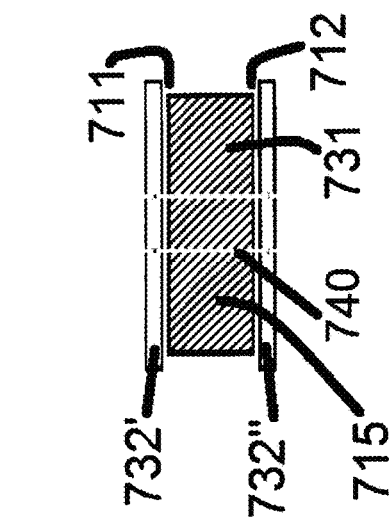

Similar to the illustrations shown in FIGS. 7A-7D for the first connector subassembly, the illustrations shown in FIGS. 7E-7H correspond to four views of a second connector subassembly 730: FIG. 7E is a top view, FIG. 7F is a side view, FIG. 7G is a front view, and FIG. 7H is a perspective view. In this example, the connector subassembly 730 is parallelepiped-like, where the near edge-face 715 shown in FIG. 7H is also referred to as the mating face (near edge-face 715).

The connector in this example in FIGS. 7E-7H is comprised of a magnet element 731 sandwiched between two separated sheathing elements 732' and 732" and are shown mounted over the top surface 711 and bottom surface 712, respectively. For the example shown in FIGS. 7E-7H, the two sheathings, a first sheath 732' and a second sheath 732' are close to (or are in contact with) the magnet element 731, but the sheaths 732', 732" are not in direct contact with each other and do not form a "U-shape" sheath. The material used for the sheathing can be electrically conductive or not conductive, preferably conductive so that electrical connections can be made. FIG. 7B shows an electrical conductor, wire, or trace 741 that is connected in one or more places 770, 770' to an electrically conductive case or jacket 722 that substantially surrounds a magnet element 721 to permit electrical continuity.

In FIGS. 7A-7H, an opening 740 is shown for each subassembly 720, 730 that permits the use of a locating pin, locating guide, or fastener. This opening 740 does not need to be circular in cross-section nor in the center of any parts of the assembly. This opening 740 can pass through magnetic members 721 and its sheathing element 722. Moreover, this opening 740 can pass through magnetic member 731 and sheathing elements 732', 732".

In summary, FIGS. 7A-7H show two styles of magnetic connectors, one style with a substantially U-shaped sheath 722 and one style with a separated-style sheath 732', 732".

It is clear that other combinations of connectors are possible, for example, a U-shape sheathed connector to a U-shaped sheathed connector or as separated-style sheathed connector to a separated-style sheathed connector.

Now that we have discussed FIG. 7, we turn our attention to FIG. 8. FIG. 8 offers side views of possible examples of magnetic connections that can support electrical communication between the connectors (and ultimately, therefore, between the modules).

FIGS. 8A-8B depict an example of a connector showing side views of magnetic mechanical subassemblies for possibly achieving electrical connection. A magnetic electrical connection is comprised of a first connecting subassembly 805 and a second connecting subassembly 815. For the first connecting subassembly 805, an electrical conductor, wire, or trace 801 is connected in one or more places 802', 802" to an electrically conductive case or jacket 822 that substantially surrounds a magnet element 804 to permit electrical continuity. The jacket 822 may be touching the magnet element 804 or it may be near (and not touching) the magnet element 804. The second connecting subassembly 815 is used to engage with the first connecting subassembly 805. The second connecting subassembly 815 is comprised of a conductor 811 that is connected in one or more places 812', 812" to make an electrical connection 812', 812" to a conductive case or jacket. This jacket is comprised of one or more elements 832', 832". For example, 832' is positioned on or near the top surface 851 of the magnet 814, and 832" is positioned on or near the bottom surface 852 of the magnet element 814. These elements 832', 832" substantially enclose a magnet member 814.

Continuing with FIGS. 8A-8B, when the first connector subassembly 805 and second connector subassembly 815 are placed in proximity to each other, the magnet members 804, 814 attract each other, thereby bringing the magnets and electrically conductive casings (or jackets, or sheathings) into contact, and thereby making an electrically communicative (conductive) pathway between them, as shown in FIG. 8B.

The electrical connections 802', 802", 812', 812" can be solder, welding, epoxy, spring contact, washer contact, or any other method of connecting conductive materials together.

Further continuing with FIGS. 8A-8B, openings 840, 841 are shown in the first subassembly 805 and second subassembly 815, respectively, that permit the use of locating pins, locating guides, or fasteners. The openings 840, 841 do not need to be circular in cross-section nor in the center of any parts of the assembly, and can pass through the magnetic members 804, 814 and their jackets, respectively. In this context, locating pins allow the connectors to be guided or aligned in place within the module with sufficient mechanical tolerances, thereby permitting the connector to have some mechanical play in a plurality of directions, as needed, to facilitate an adequately aligned connection. In other words, the connector assemblies can be positioned with locating pins, permitting some amount of free motion to facilitate the connection.

Now, we turn our attention to FIGS. 8C-8D, which depict another example of a connector showing side views of subassemblies 820, 825 for achieving mechanical and/or electrical connection. For this example, a mechanical and/or electrical connection is comprised of a first connecting subassembly 820 and a second connecting subassembly 825. Furthermore, the first subassembly 820 is described here as comprised of a sheath of material 823 that can be attracted to magnets, and this sheath 823 does not enclose a magnet element in this example. The second subassembly 825 in this example is comprised of a magnet element 864 and a sheath. For the first connecting subassembly 820, an electrical conductor, wire, or trace 801 is connected in one or more places 802', 802" to an electrically conductive case or jacket 823. In this example, for subassembly 820, a magnet member is not included as part of the subassembly 820. However, this example method can permit electrical continuity when connector subassembly 820 is connected to a mating connector, in this example, the mating connector is subassembly 825.

Continuing with FIGS. 8C-8D, the second connecting subassembly 825 is used to engage with the first connecting subassembly 820. The second connecting subassembly 825 is comprised of a conductor 811 that is connected in one or more places 812', 812" to make an electrical connection 812', 812" to a conductive case or jacket 832', 832". In this one example, this jacket is comprised of two sheathing elements 832', 832". For example, 832' is positioned on or near the top surface 851 of magnet member 864, and 832" is positioned on or near the bottom surface 852 of magnet member 864. These sheathing elements 832', 832" substantially enclose a magnet member 864. Stated here, an individual connector's sheath can in general be comprised of one or more sheathing elements; these sheathing elements may or may not physically touch each other in a given connector subassembly.

Continuing with FIGS. 8C-8D, openings 842, 843 are shown that permit the use of locating pins, locating guides, or fasteners. The openings 842, 843 do not need to be circular in cross-section. The opening 843 and can pass through the magnetic member 864 and its sheathing elements 832' and 832". The opening 842, in this example, can pass through the jacket 823. In this context, locating pins allow the connectors to be guided or aligned in place within the module with sufficient mechanical tolerances, thereby permitting the connector to have some mechanical play in a plurality of directions, as needed, to facilitate an adequately aligned connection. In other words, the connector assemblies can be positioned with locating pins, permitting some amount of free motion to facilitate the connection.

For all cases described for this disclosure for magnetic connections, the design of an example connection can be represented by the connection of two modules, a first module and a second module. The first module can support one or more magnetic connector of any type, and this connector can be comprised of one or more magnets; in addition, the connector also can be comprised of other materials that are not magnetic. The connector in the second module can be comprised of have any magnetizable (ferromagnetic) materials, such as iron or an iron alloy so that the first module to develops an attractive force with the second module, so that the two modules form a magnetic mechanical connection Connectors can be comprised of electromagnets, instead of or in addition to permanent magnets.

Connectors can be comprised of no magnets. For example, a first module with a first connector that can be a non-magnetic mechanical connector which can connect to a second connector in a second module that is a non-magnetic mechanical connector. Examples of non-ferromagnetic connectors are pin-and-socket connector. In other words, the connectors do not need to be magnetic. They can be friction-fitting connectors (without magnets), or can be a mechanical locking mechanism of any type.

Moreover, a first module may mate with a second module without any connectors. For example, by the player (or user) laying out the modules edge-face to any edge-face, in other words, from a first edge-face of a first module to a first edge-face of a second module, and continuing with subsequent modules, to make a layout pattern that forms a toy airport, without connectors of any type.

A first module and a second module can be connected with one or more permanent magnets substantially embedded at or near the faces (and/or corners) of the modules. When the first module is positioned proximate to the second module, and attractive force develops between the facing faces of the modules, so that a magnetic mechanical connection is made.

Figures 20C, 20D:
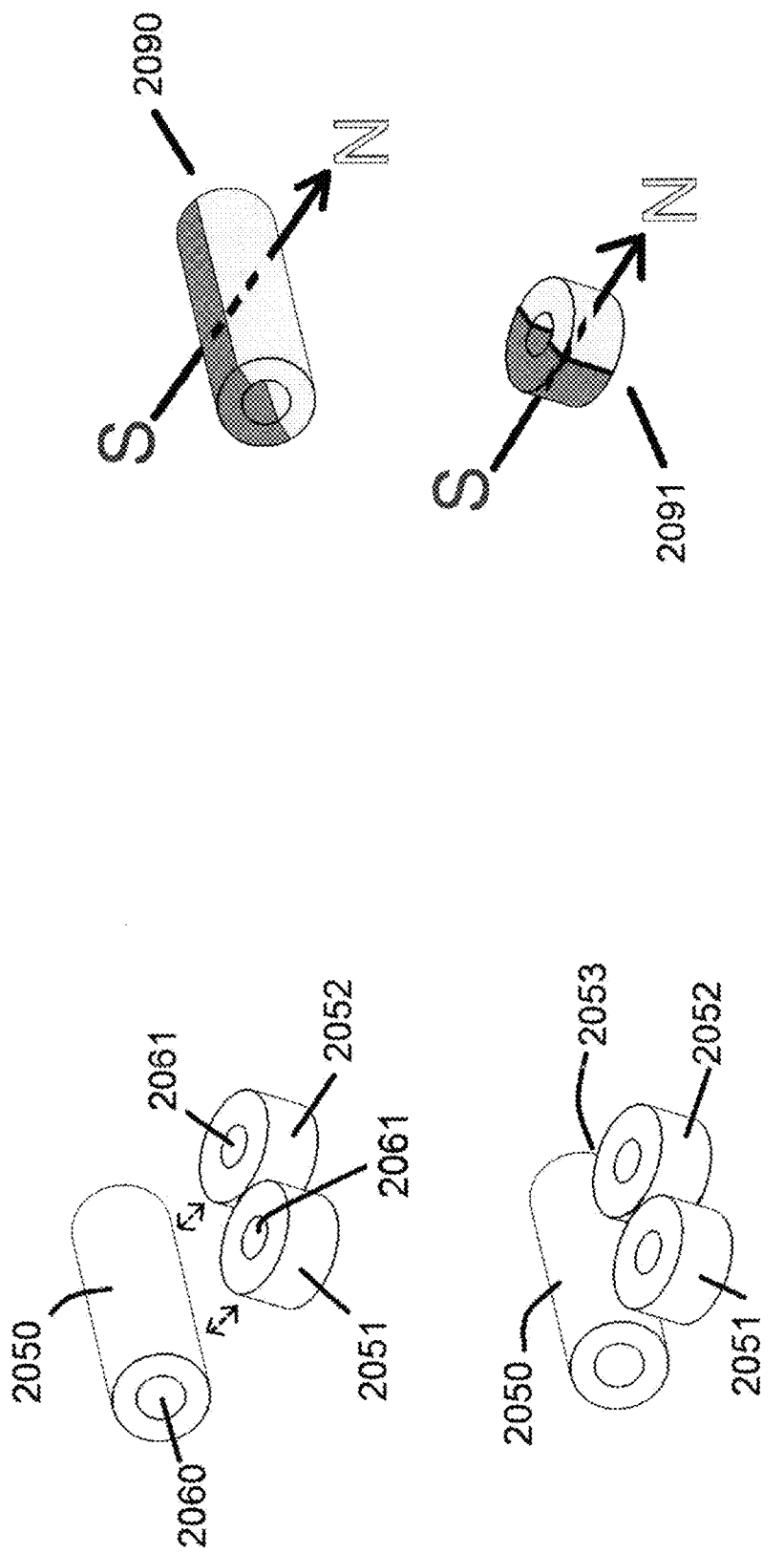
FIG. 20C shows an example of a pair of ring magnets not connected to an example cylinder magnet and this figure also shows an example of a pair of ring magnets connected to each other and connected to an example cylinder magnet.
FIG. 20D shows two examples, for reference purposes, of a magnetization in materials that could be used in this toy for module-to-module connections. This type of magnetization is sometimes referred to as "diametric magnetization." Other types of magnetization can be used, too.

Now our attention jumps to FIGS. 20A-20D, where examples are shown of cylinder-style and ring-style magnets that can be used for the airport toy's connectors. FIGS. 20A-20C show embodiments of cylinder magnets and ring magnets that can be used to assemble the airport toy layout and its accessories. The magnets shown in FIGS. 20A-20D can be used to make one or more connections, in a manner similar to the connectors shown earlier in this disclosure in FIGS. 10A-10H. In addition, the magnets shown in FIGS. 20A-20D can are be used to make one or more connections, as embedded or semi-embedded magnets in modules, in methods similar to those shown in FIGS. 21A-21B, to be discussed later in this disclosure.

For the examples shown in FIGS. 20A-20D, the magnet members 2030, 2031, 2040, 2041, 2050, 2051, and 2052 are magnetized transversely, in a direction perpendicular to the axis of the ring or cylinder. This shown in FIG. 20D, where cylinder magnet 2090 is magnetized transversely, and ring magnet 2091 is magnetized transversely, with the north and south poles as shown, as an example. For the purposes of this disclosure, a magnet that is magnetized transversely is sometimes called "diametric magnetization." The magnet, in other words, can be magnetized in a direction that is perpendicular to its primary symmetry axis. Moreover, individual magnets used for this toy can be magnetized in any direction with respect to its symmetry axis, depending on the design of the toy, to meet the function intended by the designer of the toy, for example, to provide an appropriately directed magnetic force between two modules (or sections) of the toy. Additionally, there are other examples, not shown here, where the magnetization is not transverse, and is not perpendicular to the primary axis of the cylinder or ring.

Now we turn our attention to FIG. 20A. A connection can be made between a first magnet 2030 and a second magnet 2031. In this case, the magnetization is diametric as depicted in FIG. 20D (transverse to the axis of the cylinder), so the attractive force is substantially perpendicular to the outer surface of the circular part of the cylinder, to form a connection 2034. FIG. 20B shows a first ring magnet 2040 and a second ring magnet 2041. In this case, the magnetization for the ring magnets 2040, 2041 is diametric as depicted in FIG. 20D (transverse to the axis of the ring), so the attractive force is substantially perpendicular to the outer surface of the circular part of the ring, to form a connection 2042. In other words, these ring magnets 2040, 2041 experience an attractive force and form a connection 2042. FIG. 20C shows a connection that is comprised of a combination of a cylinder magnet 2050 and ring magnets 2051 and 2052. These magnets 2050, 2051, 2052 experience an attractive force and form a connection 2053. In FIGS. 20A-20C, openings 2060, 2061 are shown that permit the use of locating pins, locating guides, or fasteners. These example openings 2060, 2061 do not need to be circular in cross-section.

The cross-sections of the outer surfaces of the ring magnets or cylinder magnets do not need to be circular. They can be any shape.

Continuing with FIGS. 20A-20D, and similar to FIG. 8 and FIG. 10, the mechanical connection formed by magnetic attraction can also provide an electrical connection. For example, the cylindrical magnets and/or ring magnets can be made of conductive magnetic material. Moreover, FIG. 7 and FIG. 8 show wiring connected to the connectors. Electrical wiring is not shown in FIG. 20. However, wiring can be attached to any or all of the magnets in FIG. 20, if desired. For example, this electrical wiring could be used for any combination of AC power, DC power, and electrical communications.

Continuing with our discussion or ring magnets and cylinder magnets, as another example, the cylinder magnets and/or ring magnets can be coated with an electrically conductive material, such as a metal plating. Cylinder magnets and/or ring magnets can be coated with an electrically conductive material, such as Ni, Cu, or combination (NiCuNi) of these metals, or other electrically conductive materials; the coating or coatings used for covering all or part the cylinder magnets can be nonconductive in some examples. The coating does not need to be plating-style. The coating can be a covering of any material—for example metal—attached by mechanical means. The coating does not need to cover all surfaces of any magnet. If coatings are used, the coating can be electrically conductive, or can be electrically insulating, or any combination of the two.

Figure 10C:
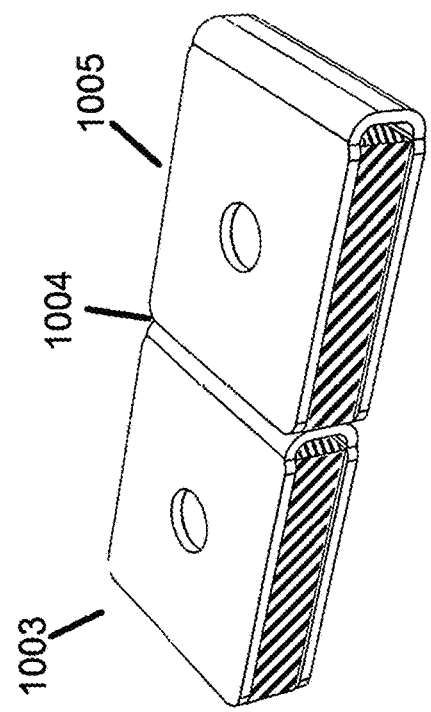
FIG. 10C shows a perspective view of the example of the connected pair shown in FIGS. 10A-10B.
Figure 10A:
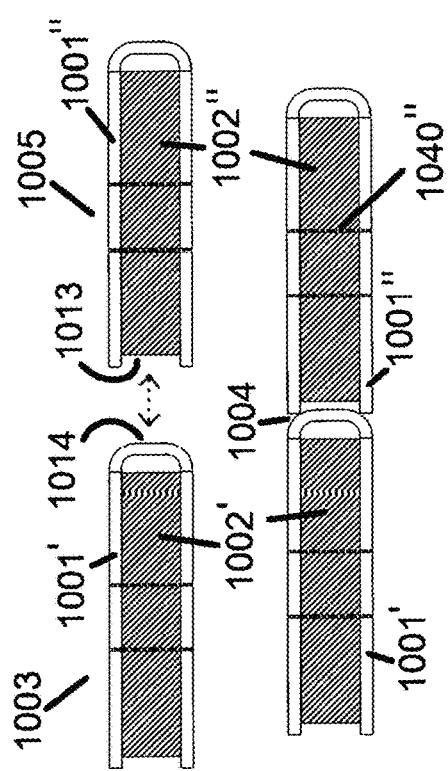
FIG. 10A shows side profiles of disconnected and connected views of an example of a mating set of magnetic-type connectors (i.e., a set of two connectors in this example).
Figure 10B:
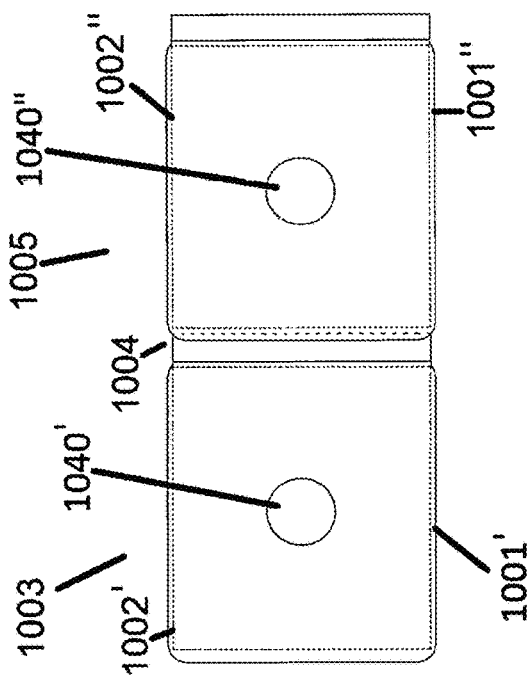
FIG. 10B shows a top view of the connected pair shown in lower portion of FIG. 10A.

Now we are turning our attention to another connection method that can be used to connect modules to modules, or to connect modules to accessories, for an airport toy. FIGS. 10A-10B along with FIG. 10C show variations of the examples shown earlier in this disclosure in FIGS. 8A-8D, without explicitly showing the connecting wires/traces. In FIG. 10A, the magnet member 1002' of the connector 1003 is housed within a monolithic sheathing 1001' that is substantially "U-shaped". In addition, likewise, in FIG. 10A, the magnet member 1002" of the connector 1005 is housed within a monolithic sheathing 1001" that is substantially "U-shaped". The connection assembly in this example has a first connector subassembly 1003 and a second connector subassembly 1005. In FIG. 10A, the right edge-face 1014 of the first connector subassembly 1003 mates with the left edge-face 1013 of the second connector subassembly 1005. These connector subassemblies 1003, 1005 experience an attractive force when placed to proximity to each other to form a connection 1004. Generally, sheaths 1001', 1001" are made out of conductive materials, but can be made out of nonconductive materials in some examples.

In addition, for any connector, the sheath can be made out of conductive materials, semi-conductive material, or nonconductive materials, or any combination of conductive, semi-conductive, and nonconductive materials. FIG. 10B is a top view of the connection shown in FIG. 10A. However, in this specific example, FIG. 10B could also be a bottom view of the connection shown in FIG. 10A. Other embodiments of this connector can be made which are not as symmetric. Geometric symmetry is not a requirement for the magnetic connectors, and not a requirement for connectors that are sheathed, such as the connector assemblies shown in FIGS. 10A-10H.

Figure 10D:
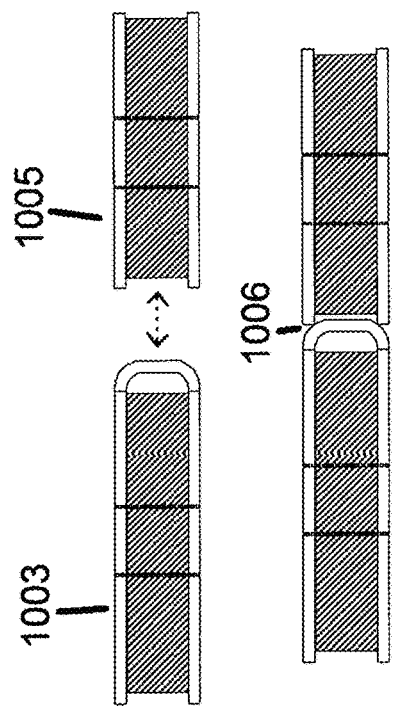
FIG. 10D shows a further example of a mating set of magnetic-type connectors (i.e., a set of two connectors in this example), which shows disconnected and connected side views. This example uses a different edge-face for the connection as compared to FIG. 10A.
Figure 10E:
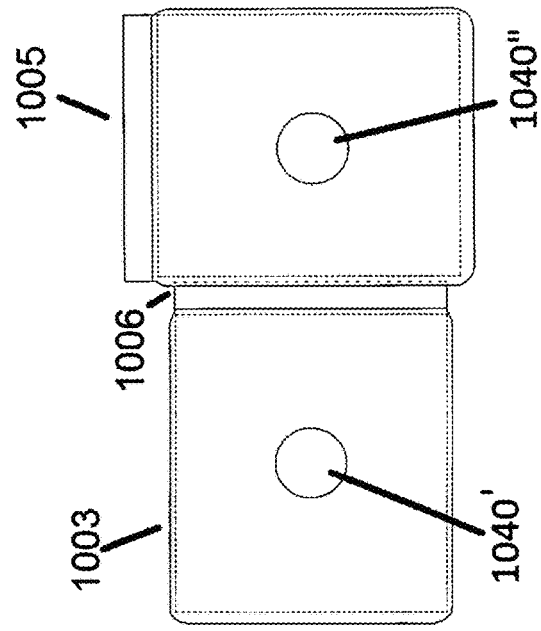
FIG. 10E shows atop view of the connected pair of the example magnetic connector shown in FIG. 10D.
Figure 10F:
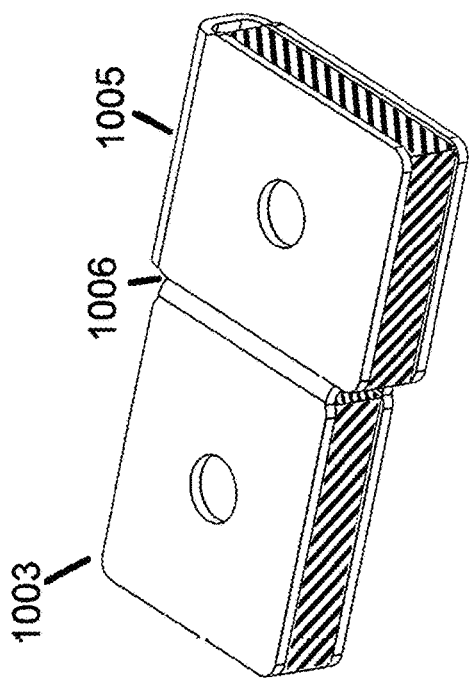
FIG. 10F shows a perspective view of the example shown in FIG. 10D.

Now looking at FIGS. 10D-10E, along with FIG. 10F, another example of the connector subassemblies 1003, 1005 of FIG. 10A is shown. In this example, the second connector 1005 is rotated with respect the first connector 1003. Thus, a connection 1006 is formed between the first connector subassembly 1003 and second connector subassembly 1005. FIG. 10E is a top view of the connection shown in FIG. 10D and FIG. 10F is a perspective view. However, in this specific example, FIG. 10E could also be a bottom view of the connection.

Figure 10G:
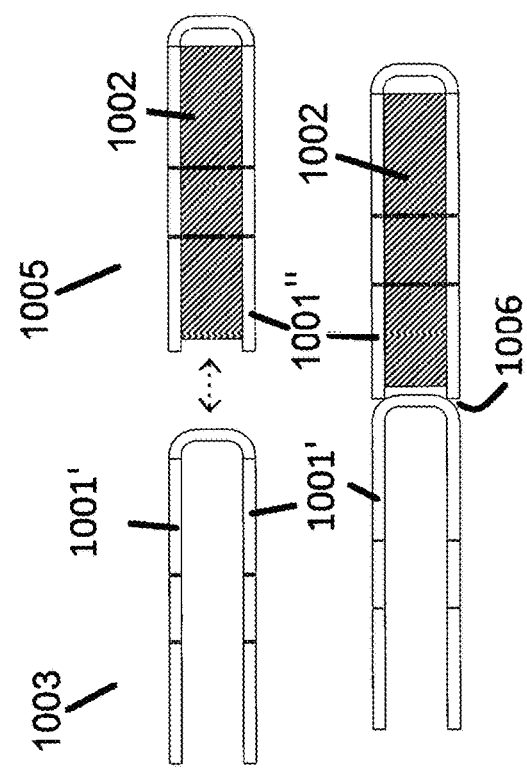
FIG. 10G shows a further example of a mating set of magnetic-type connectors (i.e., a set of two connectors in this example).
Figure 10H:
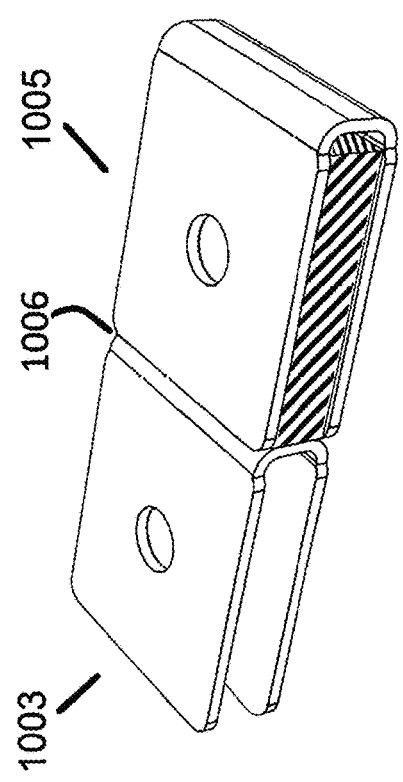
FIG. 10H shows a perspective view of the example shown in FIG. 10G.

In FIGS. 10A-10H, openings 1040', 1040" are shown that permit the use of locating pins, locating guides, or fasteners. These openings 1040', 1040" do not need to be circular in cross-section. These openings 1040', 1040" can pass through the magnetic member 1002', 1002" and their jackets 1001', 1001", respectively The connector subassemblies shown in FIGS. 10A-10H are substantially similar in shape and function, hence the nomenclature and callouts for these magnets and sheathings are assigned herein labeling numbers 1002', 1002", 1001', 1001". However, the depicted sheathing and magnet elements are only exemplary, and other embodiments need not be identical to the depicted elements. Furthermore, other embodiments can have connector assemblies rotated with respect to their opening 1040', 1040" axes, and rotated with respect to their mating connectors, as shown in FIG. 10C, FIG. 10F, and FIG. 10H.

Generally, these magnets and sheathes are examples of connector subassemblies for use in the airport toy. It is understood, that there are many other ways of arranging magnets and sheathes, or magnets and coatings, or some combination thereof, to provide mechanical connections, electrical connections, or a combination of mechanical and electrical connections suitable for use m an airport toy.

Moreover, these examples of connector subassemblies can employ the use of permanent magnet members that are magnetized in various directions, but can be totally or partially replaced by electromagnets. These electromagnets, having properties similar to permanent magnetic members, can be used to attract and join connector subassemblies for use in this airport toy.

Referring now to FIG. 10G and along with FIG. 10H, we show another example comprised of a first connecting subassembly and a second connecting subassembly, where the first connecting subassembly 1005 is comprised of a sheath 1001" that substantially encloses a magnet member 1002, and the second connector subassembly 1003 is made of a magnetizable conductive material 1001' and does not necessarily house a magnet member. Another example (not shown in FIG. 10G and FIG. 10H), which is related to the example shown in FIG. 10G and FIG. 10H, has a magnet member sheathed by 1001' in the first connector subassembly 1003, and a magnet member is not present in the second connector subassembly 1005. This method of making a connection, where one of the two connector subassemblies houses a magnet member and second of the two connector subassemblies does not necessarily house a magnet member, is similar to the method shown in FIGS. 8C-8D.

Subheading: Further Details of Module-to-Module Connections

In this section of this disclosure, we extend our discussion of how modules are connected together by employing the methods outlined during our discussion of FIGS. 9A-9C. In other words, modules are connected together using connector subassemblies that are substantially embedded within said modules. These connector subassemblies permit mechanical connection, electrical connection, or both between modules.

Referencing now FIGS. 11A-11B, an example is shown of three adjacent airport toy modules being positioned for module-to-module connections. In this example, only the bottom layer (base layer) of a multi-layer-style module is shown. These connection methods shown in FIGS. 11A-11B can also be used for any style of module, multi-layer or not multi-layer. The three modules 1100, 1110, 1120 are placed in proximity to each other, as shown 11A. These three modules support a plurality of magnetic connectors, of which seven are called-out for this discussion as 1131, 1132, 1133, 1134, 1135, 1136, 1137. Any or all of these magnetic connectors can be used for mechanical connection. Moreover, any or all of these magnetic connections could also support electrical connection. The near edge-face 1105 of module 1100 is attracted to the far edge-face 1116 of module 1110. The right edge-face 1114 of module 1110 is attracted to the left edge-face 1123 of module 1120. FIG. 11B shows the three modules connected together.

In FIGS. 11A-11B, magnetic connectors 1131, 1132, 1133, 1134, 1135, 1136, 1137 are identified in example locations. The connections, however, can be nonmagnetic, for example, they could be friction-style and/or mechanical interlocking style, without magnets. For the purposes of user assembly of airport toy layouts, the placement of modules next to each other can be accomplished by any means, magnetic means, frictional means, or other mechanical means.

In addition, connector subassemblies can be placed on any or all faces of said module. Some faces of said module can be left without any connector subassemblies.

In another embodiment, modules can be placed next to each other without any connectors—as a side-by-side placement (layout) of modules without the explicit use of any connectors.

Similar to FIGS. 11A-11B, we now consider FIGS. 21A-21B. FIG. 21A shows an example of three adjacent toy airport modules being positioned for module-to-module connections. For the example shown in FIGS. 21A-21B, three modules are shown in the figure, but the example could have used two modules, or four modules, or any number of modules to illustrate this example of module-to-module connection. In the example shown in FIGS. 21A-21B, ring magnets and cylinder magnets are used. Any number (and any combination) of ring and cylinder magnets can be used. For reference purposes, examples of ring magnets and cylinder magnets are shown in FIGS. 20A-20D.

In the example shown in FIGS. 21A-21B, only the bottom layers (base layers) of multi-layer modules are shown. The three modules 2100, 2110, 2120 are placed in proximity to each other, as shown in FIG. 21A. The near edge-face 2105 of module 2100 is attracted to the far edge-face 2116 of module 2110. The right edge-face 2114 of module 2110 is attracted to the left edge-face 2123 of module 2120. FIG. 21B shows the three modules connected together.

For the example shown in FIGS. 21A-21B, any combination of ring magnet or cylinder magnets can be used. In addition, FIGS. 21A-21B show bottom layers of layered module structures; however, the modules in this example do not need to be of a layered-type structure.

Figure 4A:
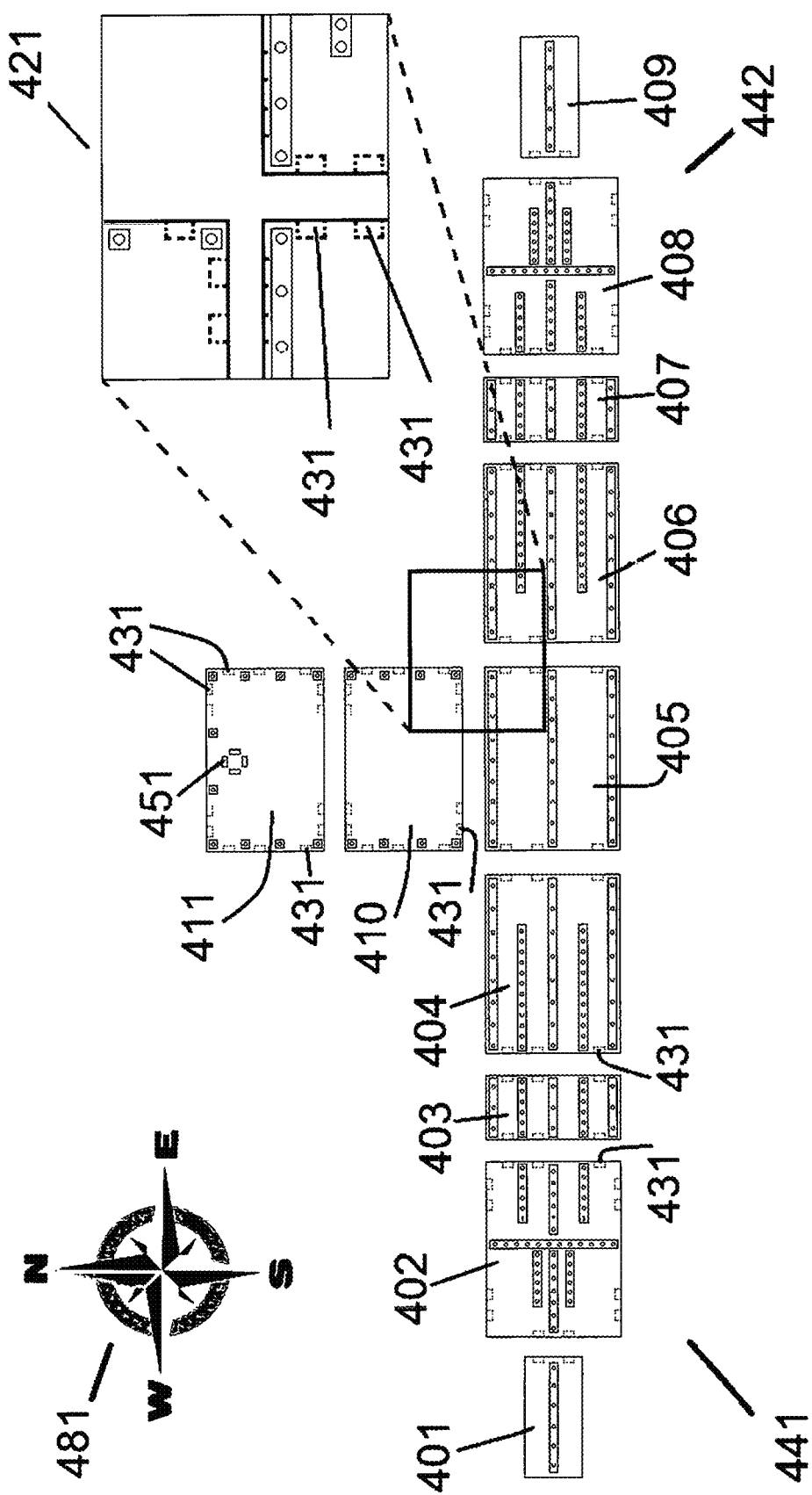
FIG. 4A shows an overhead view of one embodiment of the present invention comprised of individual modules, where said modules are proximate to each other but partially separated.

Subheading: Further Discussion of Module Connections, Airport Layouts, Toy Aircraft, and Terminology Referring now to FIGS. 4A-4B, overhead views of an example toy airport layout are shown, and with expanded views 421, 422. In this example, the toy airport layout can be comprised of landing field modules 401-409, a taxiway module 410, and an electronic systems control module 411. FIG. 4A shows an overview of one example, where the system components are made from eleven connectable modules, where said modules are near each other but not connected. In other words, FIG. 4A depicts examples of connectable modules in close proximity to each other, yet separated from each other. For nomenclature purposes, for this example, the following names for the modules are given: flashing approach lighting section 401, threshold section 402, runway heading and runway designation section 403, runway aiming point and touch zone 404, midsection 405, runway touch zone 406, runway heading and runway designation section 407, threshold section 408, and flashing approach lighting section 409. Taxiway module section 410 and electronic systems control module 411 are also shown.

Figure 4B:
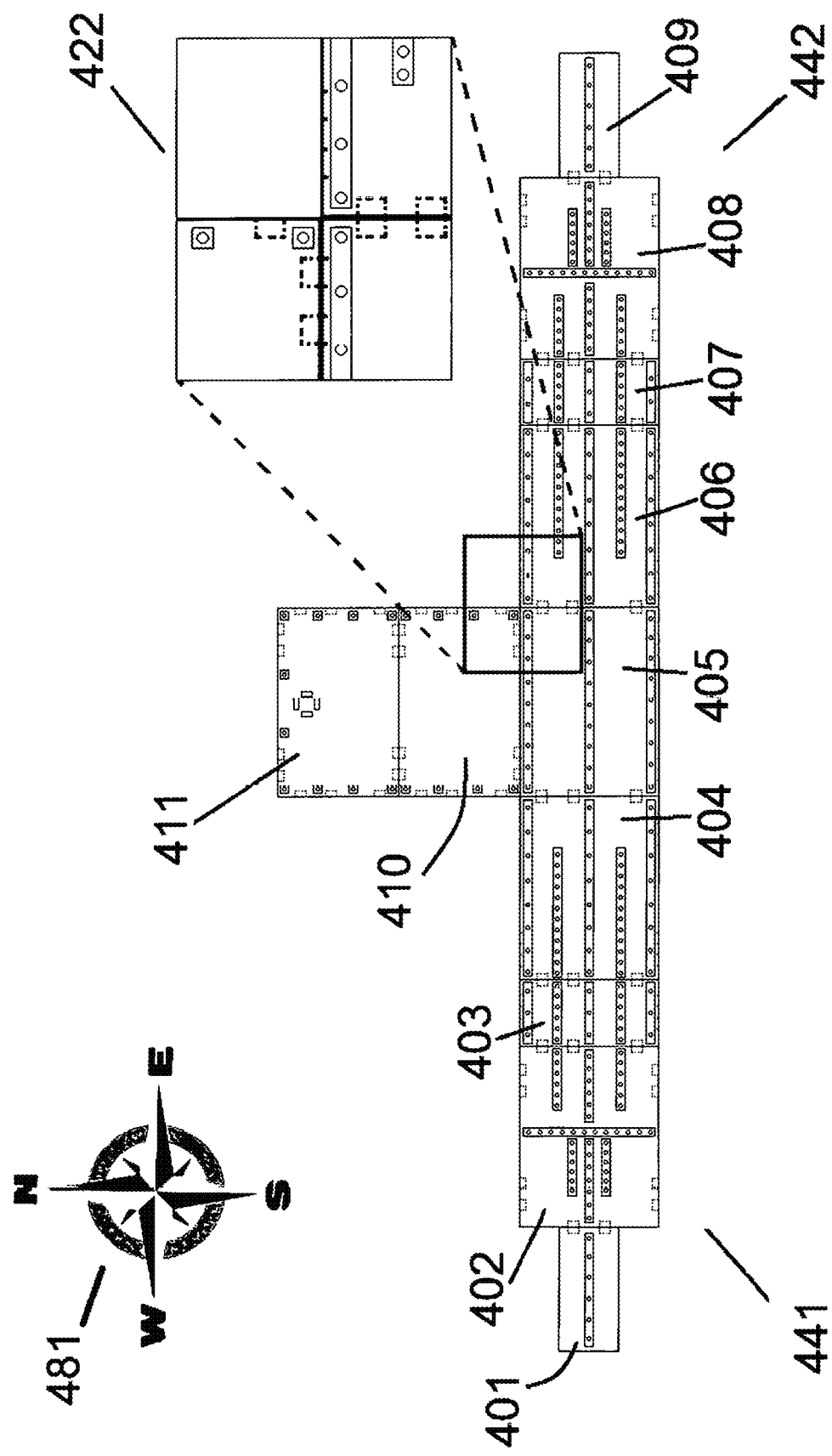
FIG. 4B shows the embodiment shown in FIG. 4A, with said modules connected.

FIG. 4B shows an overhead view that is comprised of eleven connected modules (sections), as were shown in FIG. 4A. Further describing FIG. 4B, the airfield can have two ends; a near end 441 and a far end 442. For the purposes here, the word "end" refers to the portions of the landing field that is distal from the mid-section 405, where the each of the two ends is on opposite sides of the midsection. For landing, the near end 441 is the end of the runway that is closest to the approaching aircraft, and the far end 442 is the end of the runway that is farthest from the approaching aircraft. For takeoffs, the near end 441 is the end of the runway that is closest to the starting position of the aircraft's take-off motion, and the far end 442 of the runway is the end of the runway that is farthest from the starting position of the aircraft's take-off motion.

Now we turn our attention to an example of a feature for the airport runway: the runway can be bi-directional. In some examples of airport toys, toy aircraft can be manipulated to take-off and land. Take-off and landing can be done by the user(s) handling of the aircraft by hand, i.e., using hand-held toy aircraft. In addition, remote controlled aircraft can be used. To illustrate bi-directionality, we have included a directional compass 481 in FIGS. 4A-4B. The wording "bi-directional" in terms of this toy airport means that the original near end 441 (west to east landing and takeoff direction) and original far end 442 of the airfield can be reassigned as a new near end 442 (east to west landing and takeoff direction) and new far end 441, defining an opposite direction for takeoffs and landings as compared to the original takeoff and landing direction. Thus, the airfield runway 401-through-409 can be bi-directional for take-offs and landings. For example, in one scenario of game play, a given number of take-offs and landings could be in the easterly direction, referring the compass 481. Or, in another scenario, takeoffs and landings could be the westerly direction, referring to the compass 481 and the airfield 409 through 401. These changes in landing direction (takeoff direction) can be indicated to the player(s) by airfield lighting patterns or other signaling methods of the toy airport. Further describing this example, depending on the needs of, or determination by, the airport traffic tower, player, or direction of wind, the present near end for take-off can either be the original near end 441 of the runway, or the original far end 442 of the runway. Moreover, this feature adds realism, in some examples permitting the toy to have its direction of takeoffs and landings changed.

Toy aircraft can be passive, (i.e., handheld and not powered), and/or toy aircraft can be interactive (self-powered), and include wired and/or wireless control & communications. Examples of powered toy aircraft include quad-copters or other, self-powered aircraft. Toy aircraft can also include re-entering space vehicles, such as space shuttles (after re-entering the atmosphere, they are sometimes referred to as "astrocraft," "spacecraft" or "spaceplanes."

Figure 14A:
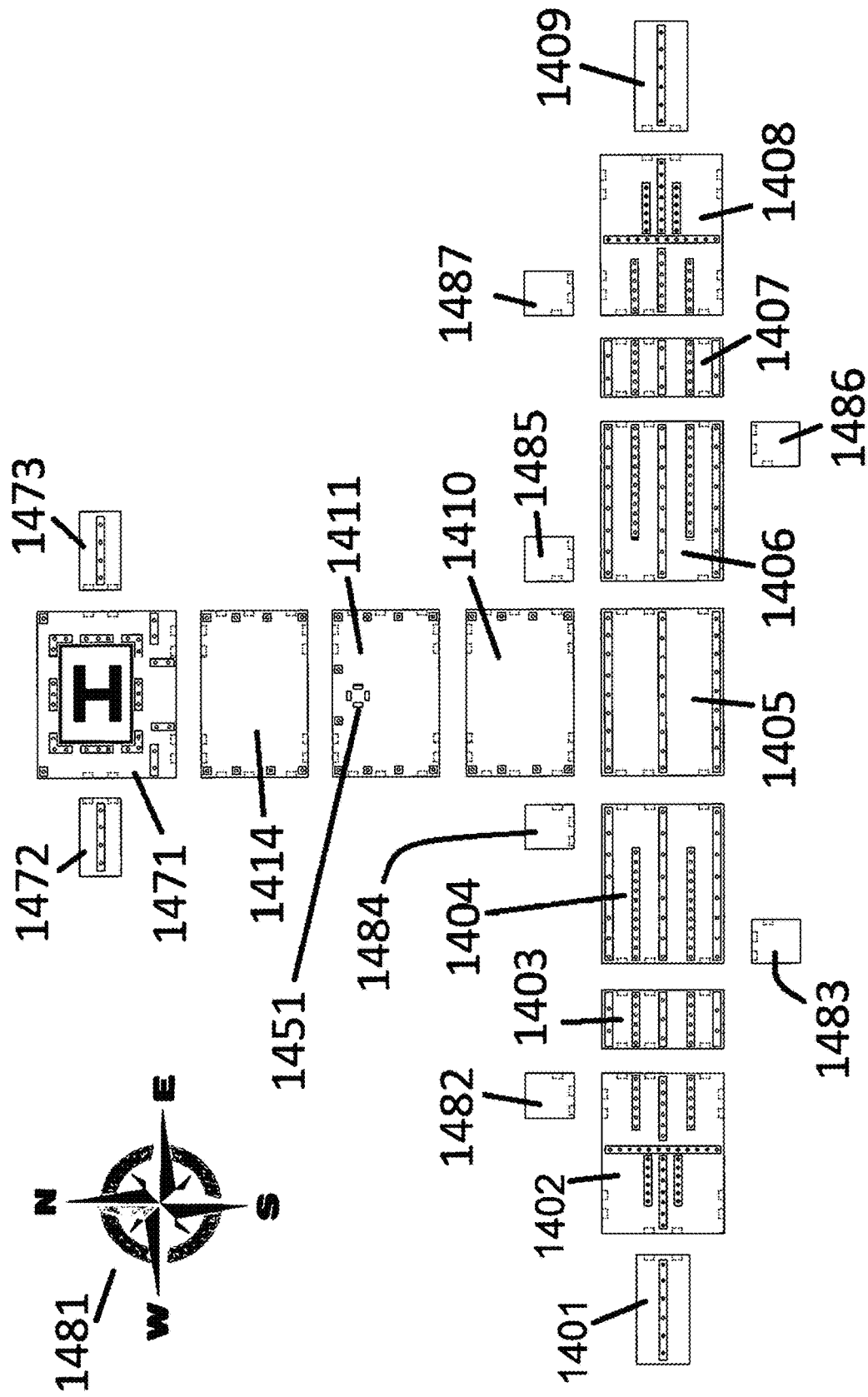
FIG. 14A is an overhead view of an example of possible system components of an embodiment of a toy airport of this disclosure.
Figure 14B:
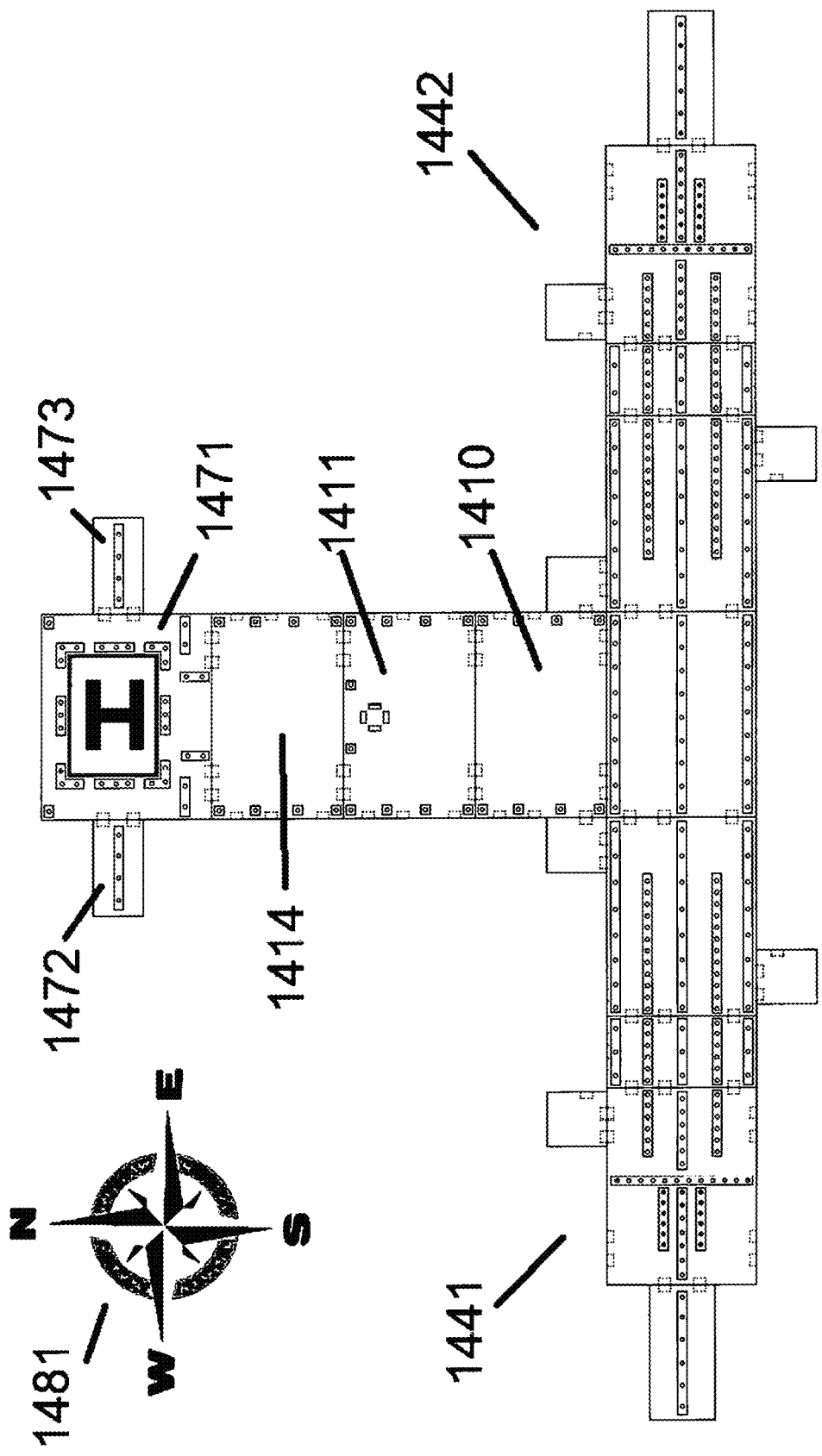
FIG. 14B shows an overhead view of an example of a toy airport of this disclosure with individual modules connected together without substantial gaps between modules.

Turning our attention to an example shown in FIGS. 14A-14B, a layout is shown with modules for a single linear runway, with branching for a taxiway and for accessories, such as an air traffic tower (ATT) and heliport.

Turning our attention to another example, as shown in FIGS. 15A-15B, and as a further example of airport toy realism, a given runway of the toy airport system can have visual alphanumeric runway heading markings 1503, 1507 on one or both ends of the top surface of the runway. These markings 1503, 1507 can be visible to the player(s). These example markings 1503, 1507 can be designed to indicate runway direction with respect to magnetic north, and can be designed to remain fixed (for example, with non-changeable, printed numerals), and can be designed to sense magnetic north and automatically change its displayed heading markings based on the actual direction of the layout of the assembled toy airport. In a real airport, these markings are sometimes called "runway magnetic bearings."

The toy airport can support a compass as an accessory module or as an integrated part of a given module. The compass can be used to sense and/or indicate the direction of north. This directional compass can be digital, analog, or both. The information sensed by the compass can be inputted to the toy control system, such as an electronic systems control module, to provide an automated and/or non-automated means for changing the readout displayed to the users on the runway heading markings. Elaborating, one possible function of a compass is to provide enhanced features, such as a real-time sense of the runway heading direction, to the users' preference in regard to the toy's positioning, as the user changes orientation of the toy airport runway. In a full-scale (real) airport, these heading numbers are based on magnetic north, and sometimes called "runway magnetic bearings." In addition, the compass could be one or more of a number of types of compasses, such as "directional compass," "azimuth compass," and other types of compass systems. Moreover, the compass feature of a smart phone could be used for generating this directional information.

Subheading: Some Examples of Power, Lighting, and Control

Referring now to the example shown in FIGS. 3A-3B, we now discuss an example of a non-electrically-powered airport toy and compare it to a powered airport toy. In this example, the module-to-module connections do not support electrical conductivity. In this example, there could be one or more battery-powered modules, to provide lights, sound, or both lights and sound, but electricity is not conducted from one module to another. Furthermore, this example can be used by younger children, who, while playing with this toy, can obtain assembly skills, problem solving skills, manipulation, coordination, and tactile skills, plus satisfaction and enjoyment.

In contrast to the toy described in the above paragraph where electricity is not conducted between modules, use of a powered airport toy (where electricity is conducted between some or all modules) offers not only the features of the non-electrically-powered airport toy, but also additional features, for example enhanced interactive options such as communications and other devices. Examples shown in FIGS. 3A-3B have features similar to FIGS. 4A-4C, except that FIGS. 3A-3B do not have the runway lights and markings as shown in FIGS. 4A-4C.

Figure 4C:
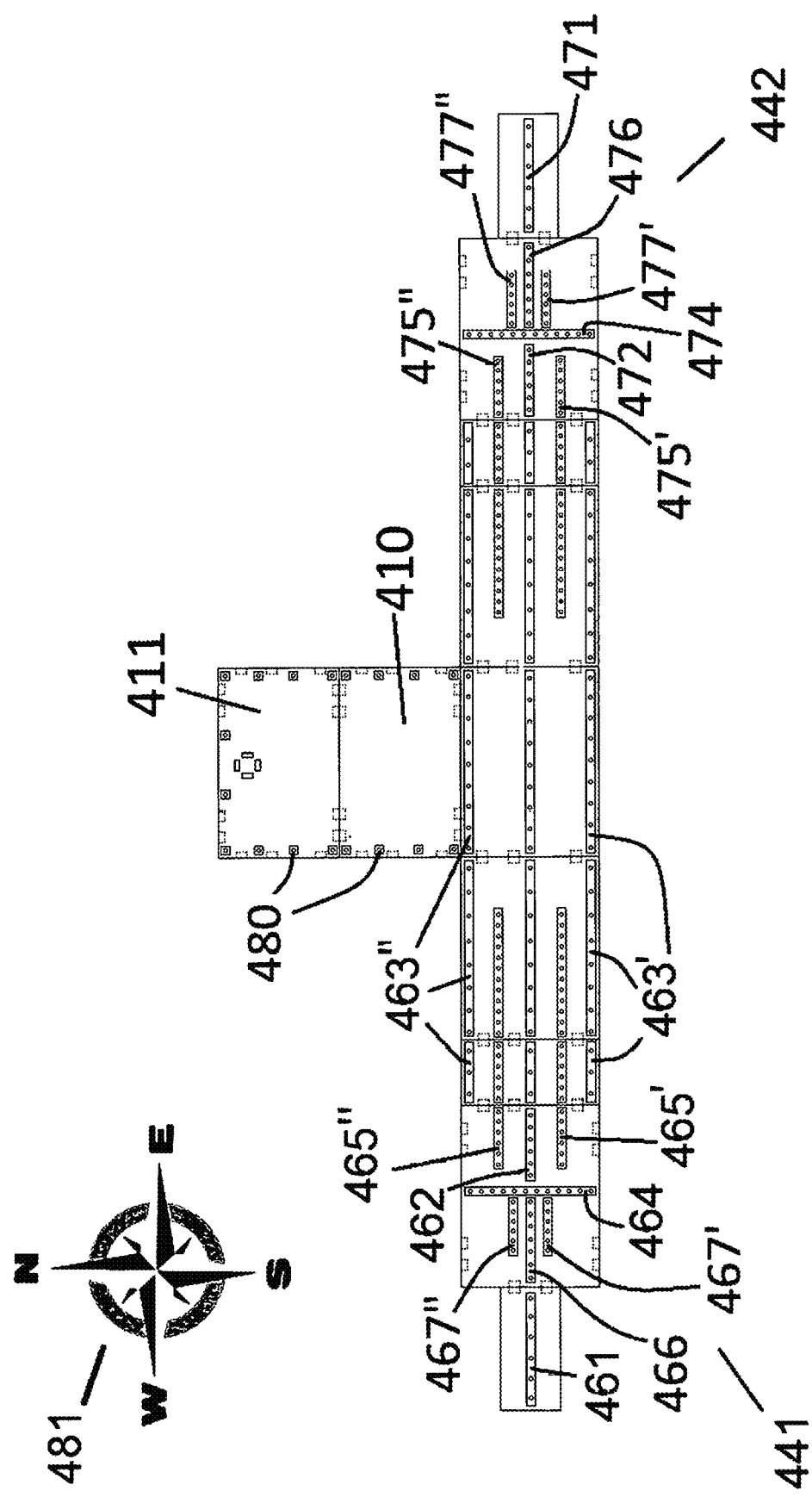
FIG. 4C shows the embodiment shown in FIG. 4A with the modules connected.

The runway markings shown in FIGS. 4A-4C can be any combination of electrically powered lights, electrically powered markings, non-electrically powered lights (chemical or fluorescent markings), and non-electrically powered markings. The toy airport in FIGS. 3A-3B can have artwork depicting realistic runway markings or patterns, similar to, for example, the markings shown in FIGS. 15A-15B. If the toy is a powered toy, the electrical power can be used for a number of features including, for example, lighting, audio, signaling, compass, and communication (wireless, wireline, or both).

Referring back to FIG. 3A and FIG. 4A the features 331, 431, respectively, shown as rectangular box patterns at the faces of the modules, depict some of the many possible locations for mechanical connectors for securing modules (sections) together. The connector locations (and quantity/number of connectors) shown in this one embodiment are possible locations for the connectors, and may or may not be the only locations. Some, all, or none of the mechanical connectors can also provide electrical continuity between sections. In addition, an expanded area 321 is shown, where some of the possible locations of connector subassemblies 331 are identified.

Earlier in this disclosure, we discussed connector subassemblies for linking individual modules and accessories together. These connector subassemblies can achieve mechanical linkage, for fastening modules and accessories to each other. Moreover, by design, these connector subassemblies can provide electrical continuity. The electrical continuity that is designed into the connector subassemblies can be made to meet any combination of DC, AC, and digital requirements. However, the electrical power connections to and from the toy airport are not limited to the mechanical connector subassemblies that are used for making module-to-module linkages. For example, another type of connector can be used for connecting to one or more AC or DC power sources, one or more digital signals, or a combination of power sources and digital signals.

Now, discussing electrical connections further, the connectors for attaching power sources can be located on one or more modules or accessories. The electrical power, for example, can come in (enter) through at least one module. In this disclosure, modules where external power is connected (or where power is sourced) are called "power modules." The electrical power (AC, DC or both) can enter from, be connected to, any of the faces of the power module via electrical connectors suitable for connecting AC power. DC power, digital signals or any combination of AC, DC, or digital.

In some examples, the power supplied to the airport toy can be DC, and can come from a DC-regulated power supply that is connected to an AC mains. In an embodiment, a power source of 24V DC is used, with or without Zener diode protection. In addition, in some examples, the AC can be stepped-down to a lower-voltage AC for safety and used in the toy as well. In summary, the electrical power supplied to the airport toy can be AC, DC or both. In another embodiment, an electrical power source is pulsed-DC. Moreover, power supply converters and power supply inverters can be used with this airport toy. And, in other examples, wireless power (induction-based power) can be used as a power interface for connecting electrical power to an airport toy.

The airport toy's electrical connections between any or all of the toy's connectors, power busses, data busses, and individual components can be discrete wiring or printed circuit board traces of any conductive material. In some examples of the airport toy, the toy is powered by batteries. In some examples, the batteries can be located within one or more modules, or located external to the toy, or any combination thereof.

In addition to a power module or power modules, the toy airport can have one or more electronic systems control modules or "control modules." The power modules and electronic systems control modules can be combined together, as dual-purpose modules. The power module is intended for the inputting of the DC or AC power from an external (or internal) source, and the electronic systems control module house other electronics, such as electronics used for supporting lighting and communication functions. An example of an electronic systems control module 411 is shown in FIGS. 4A-4C. An example of a power module 410 is shown in FIGS. 4A-4C. The power module(s) and electronic systems control module(s), if in separate modules, can be attached directly to each other, but do not need to be attached directly to each other. In some examples of the airport toy, there can be more than one electronic systems control module. In some examples of airport toy, then can be more than one power module. Examples of the toy airport described in this disclosure are not limited to this specific embodiment in that, for example, the power modules and electronic systems control modules can be designed to be connected anywhere in the toy.

Table 1 lists some examples of modules (nomenclature and function) used for an airport toy. These are not the only examples of types of modules for an airport toy.

TABLE 1

Some examples of nomenclature describing modules for an airport toy

| Name of module | Function | Alternative Names |
|---|---|---|
| power module | interface to external power supply | |
| electronic systems control module | broad-based electronics functions (analog and digital) for airport toy | "control module" |
| air traffic tower (ATT) | for aesthetics, realism, for some, all, or none communications interfaces | "ATC Tower" or "Air Traffic Control Tower" |
| ramp tower | communication with aircraft; realism; aesthetics | |
| combination module | combines any or all functions into a multi-functional module | multi-functional module; combination power and control module |

In this particular embodiment, with an overhead view, as shown in FIG. 4A, the module 411 is a combination power module and electronic systems control module. Module 411 has at least one connector 451 that can support features, such as an air traffic tower (ATT). Connector 451 can be mechanical, electrical, or a combination of mechanical and electrical. Power can be supplied directly, through direct electrical connection. Or, power may be supplied indirectly, without explicit electrical contacts, through inductive (near-field) power means, or other (far-field) wireless power means, or power may be supplied with any combination of direct and indirect methods. In addition, similar to the connector sub-assemblies described earlier in this disclosure for use in module-to-module and module-to-accessory connections, the connector for fastening the ATT can use magnetic means for mechanical, electrical connection, or both. The combination module 411 can also have additional electronics such as control electronics, lighting, antennae, speakers and other audio capabilities, digital signal processing (DSP), communication electronics (wireless, wireline, or both), and a microprocessor. The toy airport system can have software. As a further note, the airport traffic tower (ATT) can be fastened to a module connected through a connector of any type, and can be powered, but the ATT itself does not need to be located directly on a power module. In addition, FIGS. 4A-4C show a taxiway module 410.

Now, to provide further examples of one or more use(s) of the electrical nature of the airport toy, we turn our attention to runway lighting patterns. The runway has a lighting system that can accommodate visual aid for users (players) whose toy planes (model planes) could be approaching or taking-off from either direction (bi-directional, as discussed elsewhere in this disclosure). In addition, other parts of the airport can be support lighting patterns, such as lighting patterns for taxiways and terminal areas. The power module 410 and electronic systems control module 411 provide a number of functions, which can include voltages, currents, communications electronics, timing controls, and programmed timing sequences, for the runway's lighting system.

An example of lighting patterns is shown in FIGS. 4A-4C. To list some nomenclature for the modules and, possible lighting patterns, and possible markings, for runway modules, Table 2 and Table 3 are presented below. In other embodiments, non-electrically powered versions of the airport toy could have markings instead of electrically powered lighting patterns. Other lighting patterns, for other possible portions or functions of the toy airport, can be used, but are not listed in Table 2 and able 3. An example of other lighting patterns is taxiway lighting, or lighting patterns for the apron, ramp, and/or tarmac.

TABLE 2

Example lighting patterns for various modules, for this example, viewing from left to right (West end 441 of runway to center of runway), referencing FIGS. 4A-4C

| Module Purpose | Module reference number | Light or lighting pattern reference number | Typical Color |
|---|---|---|---|
| Toy airport side (441), West portion | | | |
| Runway Approach Module | 401 | 46 | White |
| Runway Threshold Module | 402 | 466 | White |
| | | 467', 467" | Red |
| | | 464 | Green or Red |
| | | 465', 465" | White |
| | | 466 | White |
| | | 462 | Warm white |
| Runway Heading Module | 403 | 463', 463" | Warm white |
| | | 465', 465" | White |
| | | 462 | Warm white |
| Touch Zone | 404 | 463', 463" | Warm white |
| | | 465', 465" | White |
| | | 462 | Warm white |
| Center | 405 | 463', 463" | Warm white |
| | | 462 | Warm white |

TABLE 3

Example lighting patterns for various modules, for this example, continuing viewing from left to right (center of runway to East end 442 of runway), referencing FIGS. 4A-4C

| Module Purpose | Module reference number | Light or lighting pattern reference number | Typical Color |
|---|---|---|---|
| Toy airport side (442) East portion | | | |
| Center | 405 | 463', 463" | Warm white |
| | | 462 | Warm white |

TABLE 3-continued

Example lighting patterns for various modules, for this example,
continuing viewing from left to right (center of runway to
East end 442 of runway), referencing FIGS. 4A-4C

| Module Purpose | Module reference number | Light or lighting pattern reference number | Typical Color |
|---|---|---|---|
| Touch Zone | 406 | 463', 463" | Warm white |
|  |  | 465', 465" | White |
|  |  | 462 | Warm white |
| Runway Heading Module | 407 | 463', 463" | Warm white |
|  |  | 465', 465" | White |
|  |  | 462 | Warm white |
| Runway Threshold Module | 408 | 466 | White |
|  |  | 467', 467" | Red |
|  |  | 464 | Green or Red |
|  |  | 465', 465" | White |
|  |  | 466 | White |
|  |  | 462 | Warm white |
| Runway Approach Module | 409 | 471 | White |

An example of an airfield lighting pattern (array) system is shown in FIG. 4C. A depiction of an assembled airfield, as given in FIG. 4C, shows a layout of a plurality of lights, lighting, and/or signaling arrays of lights 461, 466, 467', 467", 464, 462, 465', 465", 463', 463", 475', 475", 472, 474, 477', 477", 476, 471. The arrayed lights can be used to visually aid the user in taking-off and landing. Any given light can be continuously on, continuously off, or flashing on or off at any given rate, intensity, color, duty cycle, or interval. Also shown in FIG. 4C are taxiway edge lights 480.

An embodiment of a typical lighting pattern is shown in FIG. 4C, where there are sets of lights for each runway section. Approaching from a westerly direction, for the runway approach module, there is a set of lights 461. For the runway threshold module, there are sets of lights 462, 463', 463", 464, 465', 465", for the runway heading module there are sets of lights 462, 463', 463", 465', 465". For the runway touch zone (aiming point) module, there are sets of lights 462, 463', 463", 465', 465". For the center module (or mid-section), there are sets of lights 462, 463', 463". In this example, the overall lighting pattern is substantially symmetric, repeating the lighting—in the manner used for the near end (west end)—for the far end (east end) of the runway. For further clarity, refer to Table 2 and Table 3. The colors of the runway lights depend on the needs of the toy designer, and can be based on FAA (Federal Aviation Administration) regulations/guidelines.

Continuing with FIG. 4C and Table 2 and Table 3, arrayed directional lights 461, 471 are also called "sequentially timed flashing lights", and are used to indicate aircraft approach direction, as a visual aid to indicate which end of the runway is to be used for approach during landing. For example, the lighting patterns 461, 471 can be flashed on-and-off in a time-sequence in a "pointing-style" strobe-like manner to indicate directionality-of-landing to help align the player (user) for their approaching aircraft. Moreover, the lights 461, 471 point to the start of the runway (i.e., point to the near end of the runway) to provide information to an approaching aircraft. The arrayed directional lights operate in sequence to aid the pilot in determining the near end and the far end of the runway. Other less-standard runway lighting patterns can be used, too.

The sets of lights 461, 471 are a visual aid for the user (player), and form part of an overall "approach lighting system" (ALS). These ALS lights can be steady-on, or can be scrolling in a strobe-like manner to indicate direction of approach, i.e., to indicate which end of the runway to approach for landing. Any of the individual lights in the set of lights 461, 471 can be set to any level of light intensity, for example, based on visual/environmental conditions. In addition, the approach lighting system can help the player (user) align the aircraft to the runway.

Continuing our discussion of lights 461, 471 for realism and for enhancement of the toy airport, several simulated aircraft landing systems (ALSs) can be used in the design of the toy airport. In some examples, for the basis of simulation for the toy airport, ALS(s) that are recognized by international civil aviation organizations ICAO, for real-life full-scale airports, can be used: Examples include sequenced flashing lights, RAIL (runway alignment indicator lights), REIL (runway end identifier lights), mounted in patterns, and in some examples capable of strobe, in front of either end (or both ends) of the runway, are an extension of the centerline lights and can be used to highlight the runway direction. In some examples, lights can flash in sequence, at a given rate, starting at the light that is positioned the most distance from the runway, and ending prior to either of the two thresholds 464, 474. Moreover, based on the modular construction of the toy airport system, the user (player) can have options for ALS (ICAO, non-ICAO style, or a combination of styles) the indicator light system used for the toy airport.

Turning our attention back to the airport toy's lighting the visual lighting patterns at any location in the toy airport, and for any function in the toy airport, can be made from a number of devices, such as an array of individual LEDs or from a distributed (or dispersed, or diffused) lighting system. Any combination of lighting systems can be used, which may or may not use refractive/reflective devices such as fiber optics or light pipes. The layout and appearance of the lighting can be as realistic as desired.

Moreover, in other embodiments, one or more modules can be comprised of display screens (display monitors, electronic displays) for showing features of any or all of the features of the top surface(s) of said modules. Examples can be, and are not limited to the following: electronic paper, ePaper surfaces/displays, e-Ink, and electrophoretic methods of visual display. The display can be color, black & white, or grey-scale. In the cases where lights are used in any or all parts of the airport toy and its accessories, lights can be inherently colored or comprised of (white) lights. In the case of white lights, the toy airport can use can be, and are not limited to, any combination of overlays, sheets, films, thin films, or filters to color or selectively color sections of the toy's lighting patterns. In addition, multi-color LEDs can be used and/or programmed to provide appropriate colorings.

Further elaborating on the toy airport runway bi-directionality, the lighting patterns can be changed automatically or by the players themselves. A change in the lighting pattern can indicate to the player(s) a change in the directionality of the aircraft landing or takeoff orientation.

A player can facilitate the optimal approach because of simulated wind, weather, traffic patterns, or any other imposed/simulated/imagined conditions of the airfield appropriate to the use of the toy airport. In addition, the toy airport's runway lighting can be controlled randomly by the toy, can be controlled by programming, can be controlled by weather condition data, can be controlled by the user, or can be controlled by some directive of the electronic systems control module or air traffic tower (ATT). The brightness of any or all lights can in some examples be adjusted for day and night operations.

Subheading: Some Examples of Airport Traffic Tower (ATT)

In the context of the toy airport, the airport traffic tower building (also called "ATT building" or "ATT") is an elevated structure that provides largely unobstructed views of the airport traffic, for observation of aircraft in the air and on the ground, up to one or more location points on the playing surface of the toy airport. Traffic, in this context, can include toy aircraft, toy emergency vehicles, toy buses, toy luggage carts, toy food trucks, and toy fueling trucks. Non-aircraft vehicles and other equipment are sometimes referred to as toy ground support equipment (GSE). The airport traffic tower (ATT) can have control electronics or it might not have control electronics, depending on the toy. There can be one or more ATT in a toy airport. In other examples, there are no ATTs.

Turning our attention to the examples in FIGS. 12A-12C and FIG. 13D, the airport traffic tower (ATT) has a tower portion 1201 in FIGS. 12A-12C and 1301 in FIG. 13D. In these examples, the tower portion extends upward from the playing surface. The airport traffic tower may or may not have an optional base 1203, 1303, as shown in FIGS. 12A-12C and FIG. 13D, respectively. The toy airport traffic tower (ATT) plays a role in depicting a realistic airport setting. And, in other examples, the ATT can provide a vantage point as a feature, by having one or more optional operative cameras for use by a player for observing, monitoring, managing, and directing the airspace and toy airport grounds (play-surface area, and environs). In summary, the ATT can be used for a range of functions, as provided by the features of the toy, spanning from imaginary interactive play, to actual monitoring and simulation with position detectors, cameras, compasses, and with communication & display devices.

The toy airport described herein can be expandable, in other words with add-ons as the marketed toy-product develops, and/or as the player (user) acquires more features. In addition, the toy can be scalable in terms of actual size. For example, in one embodiment, the individual runway modules are approximately 7 inches by 14 inches, and in other embodiments, the runway modules are smaller (3.5 inches by 7 inches). In other embodiments, the toy can be larger, suitable for very large indoor areas or for layout outdoors. In some embodiments, a combination of sizes of modules are used. In another embodiment, the physical size is scaled up so that remote controlled (RC) aircraft can be used.

Further looking FIGS. 12A-12C and FIG. 13D, the airport traffic tower 1201, 1301 can be mounted directly on top of the power module 1202, 1302. And, in another embodiment, an ATT can be placed anywhere. An optional mechanical and/or magnetic connector can be used to secure an ATT tower to the toy. Furthermore, any module can have a mechanical, magnetic, mechanical/electrical, or magnetic/electrical connector on the top surface or bottom surface or both surfaces. The mechanical connector can provide electrical continuity between a module and the airport traffic tower. The mechanical connector can use magnets for the connection, or can use other method for mechanical connection, such as a pin-and-socket mechanism.

An airport traffic tower can have a variety of electronics, including lighting (for example, LEDs) and speaker(s), communication electronics, antennae, microprocessors, and active displays. The airport traffic tower (ATT) does not need to be mounted directly to the power module; the ATT can be mounted to any module capable of accommodating an ATT. Or, in one embodiment, an ATT can be self-contained, and not connected to a module. The ATT could also be powered by inductive methods, and not by a direct electrical connection(s).

In one embodiment, a toy airport can be supplied as a kit (or kits), which can be comprised of a runway, power module, and airport traffic tower (ATT). A "kit" is the collection of parts used to assemble an airport toy or a portion of an airport toy. One example of a toy airport kit is the set of components shown in FIG. 12A. In the case of the illustration in FIG. 12A, the components are placed next to each other so that there are no substantial gaps between the components. In some examples of the toy kit shown in FIG. 12, the components are connected together with connectors. This kit illustrated in FIG. 12A can be electrically powered or non-powered.

One example of a kit is a "starter kit," which can contain the necessary parts to assemble a basic airport toy. In this context, a "basic" airport toy could be an entry-level version with a minimum number of necessary pieces to have a functional toy,

Subheading: Runways, Taxiways, and Hangars & Terminal Areas

In addition to one or more airfields or runway playing surfaces, a toy airport can have other playing surface features that can further provide realistic experiences for the player(s). In this regard, we now we turn our attention to aircraft-accessible and GSE-accessible areas, such as the toy airport's runways, taxiways, aprons, aircraft hangars, and terminal areas. Typically, these surfaces, aircraft-accessible areas, are extensions off the runway(s) and are referred to as "tarmac" or "ramp/tarmac".

One embodiment of the toy where the runway has taxiway sections leading to a passenger terminal is shown in FIGS. 12A-12C. In this example, the airport traffic tower (ATT) 1201 is connected to (or placed on) an airport terminal 1203, which in turn is connected to (or placed on) a power module 1202. In this embodiment, the runway can have taxiways 1204 leading to a passenger terminal and ATT layout. The toy airport terminal 1203 could represent the same function as a passenger terminal, or it could represent other functions, for example, for administrative or general aviation purposes.

Continuing with FIGS. 12A-12C, these figures illustrate examples that include one or more runways. In FIG. 12A, an example of an airport toy layout with one runway 1205 is shown. In FIG. 12B, two parallel runways 1206, 1206' are shown, and FIG. 12C shows two runways 1207, 1207' that are not parallel (skewed with respect to each other). Moreover, a toy airport can have more than one runway of any combination of parallel and non-parallel runways.

Now we turn our attention to FIGS. 14A-14B in order to highlight the expandability of the airport toy. FIGS. 14A-14B show an overhead view of an embodiment that is related to the example shown in FIGS. 4A-4C. FIG. 14A depicts a toy airfield plus taxiway modules 1414, 1410, heliport pad 1471, signage accessories 1482, 1483, 1484, 1485, 1486, 1487, and flashing indicators 1472, 1473 as disconnected modules (disconnected sections). FIG. 14A also shows a module 1411 that is a combination power module and electronic systems control module. This module 1411 can have one or more connectors 1451 that support features, such as an air traffic tower (ATT). The connector 1451 can be mechanical, electrical, or a combination of mechanical and electrical. The flashing indicators 1472, 1473, can indicate to the players (users) the status of the helicopter pad (heliport) 1471. FIG. 14A depicts a toy airfield whose sections are disconnected for illustrating modularity. The modules in the examples shown in FIGS. 14A-14B may or may not be electrically powered, and the types of signage can be, but are not limited to the following: taxiway indicators, runway indicators, or PAPI. FIG. 14B shows modules connected.

The toy can have a module that serves as a heliport pad (or "H-pad") 1471 as shown in FIGS. 14A-14B. A "heliport" or "heliport pad" (or "helicopter pad," or "quadcopter pad") is a landing surface for a toy aircraft. This heliport can have sensors of one or more types, but not limited to, pressure sensor(s), visible light sensor(s), infrared (IR) proximity sensor(s), Hall-effect sensor(s), or any other type of sensor. This heliport module can have any combination of markings, lights, flashing lights, and sequencing lights (similar to other airport toy modules).

Elaborating further regarding indicators, sensors, and devices that can be located throughout the toy, which include but are not limited to toy accessories, airport-related indicators may emit visible light, and also for toy-related features, indicators may emit visible or non-visible signals, such as infrared signals. One purpose can be to have a "readable surface" for use in identifying and controlling the placement and motion of aircraft and GSE.

For the airport toy described in this disclosure, the visual display (or indicators) on a signage accessory can be electrically powered, or non-powered, or any combination of powered and non-powered.

The airfield depicted in FIGS. 15A-15B has runway heading modules 1503, 1507 which can have alphanumeric lettering on their top facing surfaces. As a realistic example, a runway that is directed approximately southwest to northeast, for approaches, landings, and takeoffs from the southwest direction to the northeast direction, the alphanumeric designation would be "05" (50 degrees with respect to north), as approaching near end to far end of the runway layout. In contrast, for a geometrically opposing takeoff, approach, and landing direction (180 degrees in the opposite direction), this alternative near end would be labeled "23" (230 degrees).

In this airport toy, runway heading alphanumeric letterings (symbols/characters), can be marked or printed, with any combination of methods, including but not limited to the etching and painting on a runway module. And, runway heading alphanumeric letterings can be indicated by an electrically powered visual display. Markings thus can be any combination of passive markings (etching, painting, etc.), and electrically powered. Examples of electrically powered displays for accessories for an airport toy include LCD, LED, or other electrically powered displays. In addition, for toys that have electrically powered displays, one or more input(s) to these displays can be from one or more analog compasses, digital compasses, or both analog and digital compasses.

Continuing our discussion, FIG. 15A is presented here for showing examples of runway marking style. FIG. 15A depicts an overhead view of an example of a runway's individual modules for the toy airport described herein, separated into connectable and dis-connectable modules 1501, 1502, 1503, 1504, 1504, 1505, 1506, 1507, 1508, 1509, and showing runway markings. FIG. 15B shows these modules connected together as an assembled runway 1520. FIGS. 15A-15B are similar to the layout examples shown in FIGS. 4A-4B, but FIGS. 15A-15B do not depict a toy's accompanying modules; for example, FIGS. 15A-15B do not depict taxiway modules, terminal modules, electronics systems module, power module, ATT, or other accessories. However, the example in FIGS. 15A-15B shows possible markings, for example semi-transparent marked surfaces (or marked films or other materials) that overlay the top surface of runway light markings. Other examples of markings include, in addition to semi-transparent markings, any combination of painted, etched, embossed, engraved, sketched, or stamped.

Continuing further with FIGS. 15A-15B, the markings can be entirely non-electrically-powered, or can a combination of electrically-powered and electrically non-powered. Moreover, for an electrically powered version of an airport toy, at any moment the toy or part of the toy is not connected to electrical power source, the markings shown in FIGS. 15A-15B can, in some embodiments, be visible as non-powered markings.

Runway markings for a toy airport, as shown for example in FIGS. 15A-15B as black-and-white illustrations, can be colored in any color of the designer's choice. In addition, for a realistic toy airport, the markings can be colored in a color scheme that corresponds substantially to, or in accordance with, ICAO or FAA standards/guidelines/regulations. Additionally, the user can color/paint/modify the airport as desired. Fluorescent and/or glow-in-the-dark markings can be used, too. In other embodiments, the markings can be made to be removable and replaceable, as for example, with decals or other colored material. These materials may or may not be translucent or transparent.

Continuing with examples shown in FIGS. 15A-15B, visual indicators (also called "guides" of "aids") associated with airport toys can be of different types. The following are examples of types of indicators: signage, markings, lights, or any combination of these, and the types of indicators are not limited to these. These visual indicators can be located, for example, on the top surface of runway modules, or on accessory modules. To illustrate, FIG. 15A show an embodiment of a runway with examples of visual marking indicators on any or all modules 1501, 1502, 1503, 1504, 1505, 1506, 1507, 1508, 1509. As an example, in FIG. 15A, the modules 1503, 1507 have visual runway heading indicators (or markings) that can be powered or non-powered, or with indicators that are a combination of electrically powered and non-powered. In the example expanded area, labeled in FIG. 15B as 1515, shows example heading characters as "05" 1513. On a real runway, these markings are sometimes called "runway magnetic bearings."

Figure 16B:
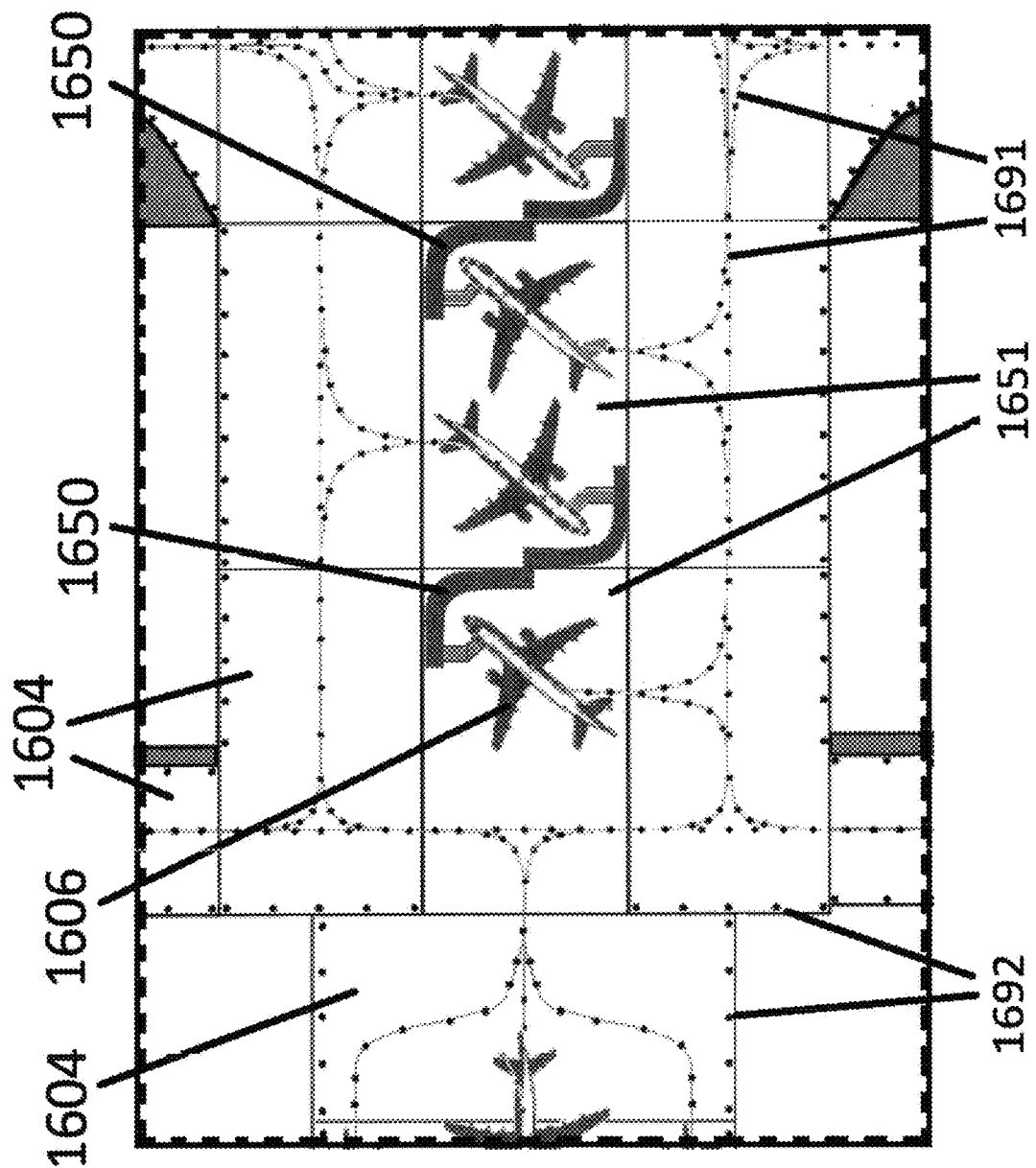
FIG. 16B shows an expanded portion (to show detail) of the illustration of the airport toy shown in FIG. 16A.

The airport toy of this disclosure can be designed to be as realistic as desired. The toy airport can have one or more runways (multiple runways) and the toy can have any combination of parallel runways and non-parallel runways. The toy layout can expand in complexity with any combination of optional modules, accessories, and features. A toy airport can have taxiways, aprons, buildings, and gates, in addition to runways. Buildings can represent any combination of passenger terminals, administrative buildings, cargo terminals, radar towers, communication towers, general aviation terminals, ATTs, and hangars. FIGS. 16A-16B show overhead views of an example airport with some of these features. FIG. 16A shows an example that adds features to the airport toy that can be used to enhance airport setting realism, such as features that can be used for positioning, flying, moving, and/or queuing, of aircraft and ground support equipment (GSE, not shown in FIGS. 16A-16B).

Elaborating further on FIG. 16A, an airport toy is depicted with a plurality of taxiways 1604. Taxiways 1604 also show example marking and lighting patterns along the approximate lines of aircraft travel 1691 and along the taxiway edges 1692. The features 1692 are sometimes called "taxiway edges markings" or "taxiway edge lights". FIG. 16A depicts an overhead view of a double-runway toy in which the runways are parallel. Some examples of passenger terminals 1650 are shown. Each of the two runways shown in FIG. 16A are derived (for this toy airport, from a toy design standpoint) from the runway markings and lightings depicted in FIG. 15B. An H-pad 1671 is also depicted.

Continuing with FIG. 16A, the airport toy can have buildings such as an airport traffic tower (ATT) 1601 and an airport terminal building 1603. As a point of reference, the ATT 1601 and airport terminal building 1603 shown in this example as an overhead view, could be similar in design to that shown perspective view shown in FIG. 12A, as 1201 and 1203, respectively. The ATT and airport terminal building 1601, 1603, are shown on top of power module 1602. There can be more than one terminal and more than one ATT. An ATT can be placed at a location distant from a terminal structure. In addition, one or more terminals can be cargo terminals, and one or more terminals can be passenger terminals.

In FIG. 16A, and in the drawing expansion shown in FIG. 16B, the example also shows a plurality of passenger terminals 1650 for the airport toy. In the example shown, in both FIGS. 16A-16B, passenger terminal modules 1651 are depicted, on which passenger terminals 1650 are placed. In addition, for this example, passenger terminal modules 1651 have taxiway markings and can support one or more mechanical connectors, electrical connectors, support hardware, and support electronics for passenger terminals 1650. Moreover, the terminals 1650 can also be referred to as "gates" for docking the aircraft 1606 for passenger access, cargo access, or both. In addition, there are a plurality of taxiway modules 1604.

Now, turning our attention to FIGS. 17A-17B, embodiments are shown of two airport toy systems, each toy showing parallel runways, terminals, and gates, airport traffic towers 1703, 1703', heliport 1704, power module 1705, and toy aircraft 1706. In these examples, parallel runways are shown for each toy airport system.

Figure 17C:
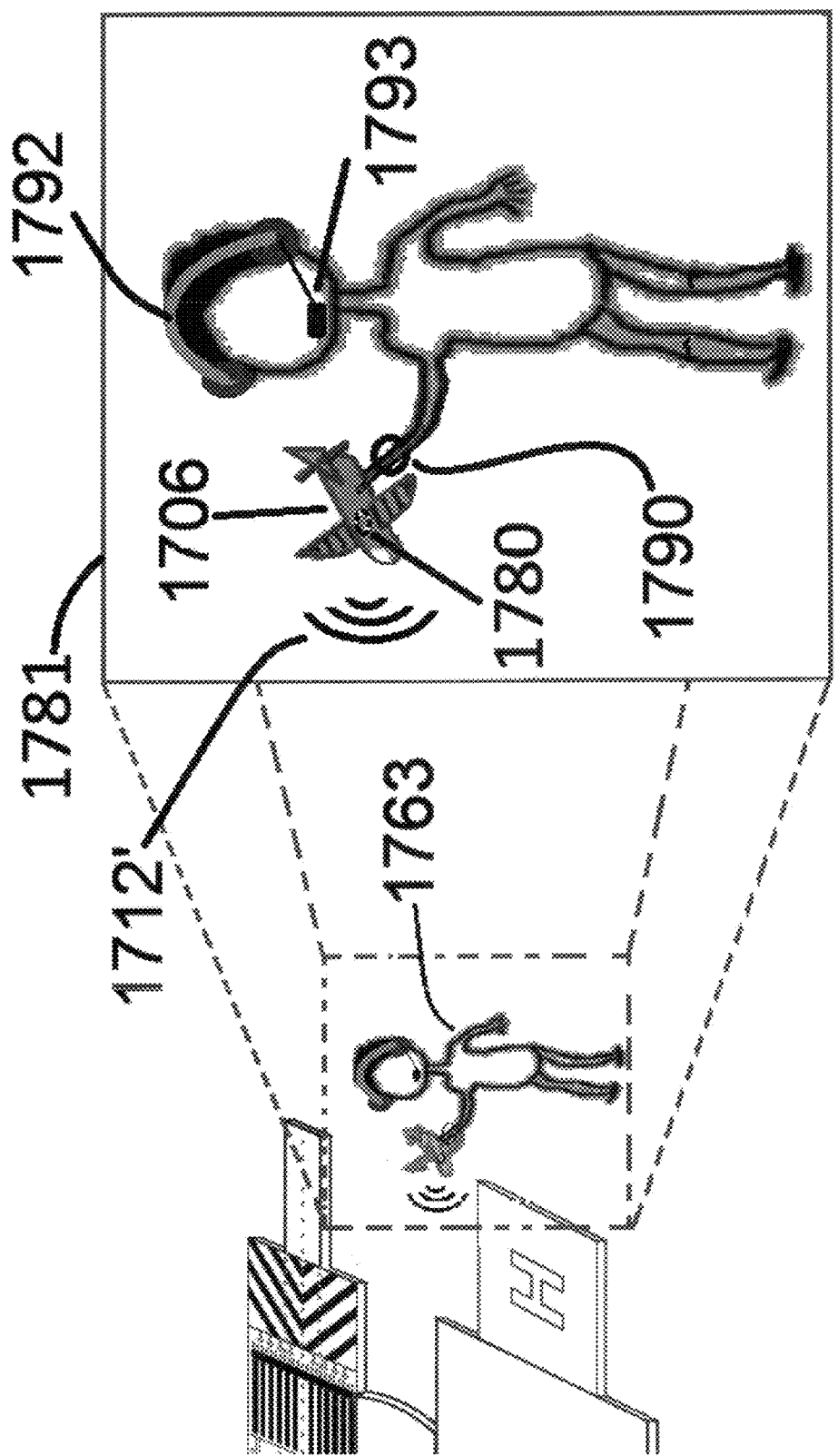
FIG. 17C shows a player with wearable interacting device(s) which can connect wirelessly with the airport toy and/or aircraft. The connections can also be made with wiring or cabling.

To further our discussion, examples in FIGS. 17A-17B, as shown as two independent airport toys 1701, 1701', with each figure showing a perspective view, and depicting users (in this case children) interacting with each toy system. FIG. 17A depicts one example of an airport toy 1701, and FIG. 17B depicts another example of an airport toy 1701', where the toys can be separated by any distance. The airport toys shown in FIGS. 17A-17B can be interfaced to each other using wireless, wireline communication methods, or a combination of wireless and wireline methods. Moreover, two or more airport toy systems can be interfaced to each other with wireless, wireline, or a combination of methods. The two airport toys depicted in FIGS. 17A-17B are substantially similar in shape, form, and/or layout, yet in other examples can be dissimilar in structure (dissimilar in shape and/or form and/or layout). FIGS. 17A-17C also show examples of communication features, to be discussed below.

FIGS. 17A-17B show two airport toys that are operatively coupled using wireless, wireline, or any combination of wireless or wireline technologies. However, any of the airport toys can be used independently, and any of the communication features described in this disclosure can be used with one airport toy. For example, the airport toy 1701 shown in FIG. 17A can be used by itself, independently of airport toy 1701' shown in FIG. 17B, as well as independent of other airport toys not shown in the figure.

A single user can in some examples interact with a single airport toy. And, in some examples, a single user can interact with more than one airport toy. In addition, more than one user can interact with a single airport toy, and in some examples, more than one user can interact with more than one airport toy.

Elaborating on an example of multiple users, where said users are in separate locations (for example, in separate rooms, separate floors, or separate houses, at any distance from each other), communication can be enabled between users verbally via audio communication channels, or by way of Internet, smart phone, or other methods. Moreover, it is also possible to be interactive with the toy and users with video, text, or other communication methods. Multiple users can share a single toy or interact with a plurality of airport toys. Multiple users and multiple toys can be in different locations, as stated.

In example toy airport systems, communication electronics that is used by user or users to communicate with the toy can be physically located anywhere, and in the following example, communication electronics are located in the airport traffic tower (ATT) 1703, 1703'. In the two airport toy system examples depicted in FIGS. 17A-17B, users 1761, 1762, 1763, 1764 are shown interacting with airport toys 1701, 1701'. In FIG. 17A, the example shown depicts user 1761 using wireline communication 1713 with an ATT 1703, and in FIG. 17B user 1764 is communicating using wireline communication 1713' with an ATT 1703'. In FIG. 17A, the example shown depicts user 1762 using wireless communication 1712 with an ATT 1703, and in FIG. 17B user 1763 is communicating using wireless communication 1712' with an ATT 1703'.

Continuing with our discussion of FIGS. 17A-17B, and with our overall discussion of the communication aspects of the toy airport system, airport 1701 to airport 1701' communications are also possible via one or more wireless connections 1714, 1714'. In addition, airport-to-airport communications can be wired 1715 (also called "wireline 1715"). The term "wireline" is synonymous with a wired, physical connection using conductive wire, optical line, or combination conductive wire and optical line. And, in this context, the word "wire" can also be called "cable."

In this disclosure, in the drawings, sets of nearly parallel semicircular lines emanating from a structure, indicates radio waves being transmitted, received, or both transmitted and received, for various purposes, for any combination of communication, passing information, and control of devices. An example of this is shown in FIGS. 17A-17B as radio waves 1714, 1714', 1712, 1712' for wireless communications.

In addition, airport toys can be designed to communicate with any combination of a plurality of other ATTs, other players, other computer networks, other devices, and toy accessories that are not shown in FIGS. 17A-17B.

FIG. 17C shows an illustrative expansion 1781 of FIG. 17B depicting one player 1763 and one toy aircraft 1706. In FIG. 17C, the airport toy can use electronic identification/labeling of GSE, or aircraft, or both GSE and aircraft with one or more wireless devices 1780. The device 1780 can, for example, be of an RFID style, or any other wireless labeling style. Capacitive sensors can be used, for example. Near-field communication (NFC) methods can be used, for example.

Further describing FIG. 17C, a player 1763 can have an optional wireless headset 1792 for communicating with any combination of the following: the toy airport, with other players, smart device, or computer. But, communication may not be limited to these entities. An optional wired headset (not wireless, and not depicted in FIG. 17C) can also be used. A headset can have a microphone 1793. In addition, there can be electronic features of the toy that detect real-time physical pairings between a user and a toy aircraft or GSE. An example of this a wearable smart device 1790 (supporting a body-area-network BAN).

In the preceding paragraphs, an airport traffic tower (ATT) has been described herein as a communications electronics hub, but it should be noted that control electronics or communication electronics can be located in any module of the toy and in any accessory of the toy airport, depending on the design or layout of the airport.

In some examples, the toy airport can have the ability to connect to a communications network; such as Internet using Wi-Fi, Ethernet, wireline, Bluetooth, Bluetooth Low Energy (BLE), or any other electronic communication method. The toy airport can have network connectivity, permitting one or more toys and one or more users to be operatively coupled to a LAN, WAN, PAN, or mesh network. In summary, in some examples of this airport toy, each toy can be connected to the Internet or connected to an application ("App") which in turn in connected to the Internet. The toys can be networked together, for example several toys in a house, can be networked together. In addition, a toy airport system can connect to the Internet to obtain any combination of data and downloadable information such as software updates, firmware updates. In addition, a toy airport system can connect to the Internet to upload data and information.

Airport toys can be interfaced to each other locally, through for example, an LAI, or can be interfaced to each other over greater distances, for example, through a telecommunications network such as a WAN. Or, any combination of networks can be used.

Figure 13B:
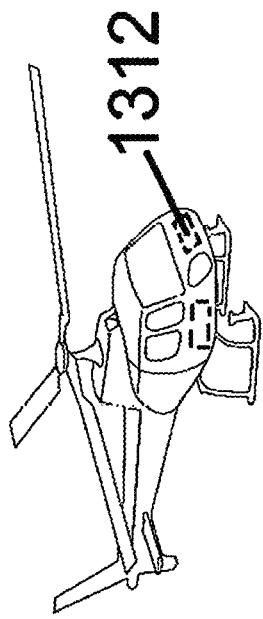
Figure 13C:
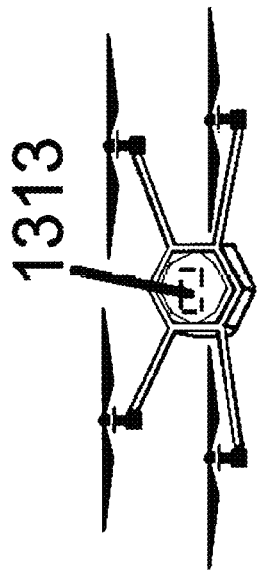
Figure 13A:
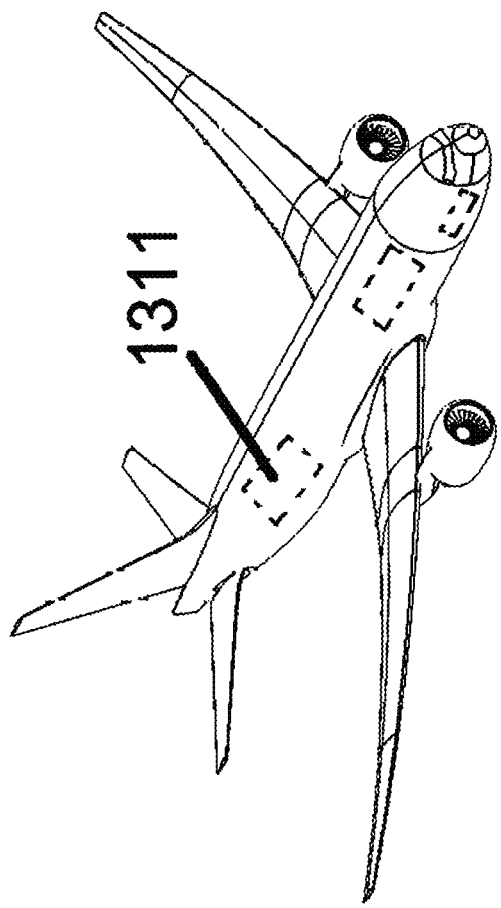

Continuing with our discussion of FIGS. 17A-17B, toy aircraft, ground support equipment (GSE), or any combination of toy aircraft and GSE can be user-manipulated by hand to provide motion and positioning on and around the toy airport system. Some examples of toy aircraft are shown in FIG. 13A, FIG. 13B, and FIG. 13C. Toy aircraft are not limited to these examples. An example of a toy GSE vehicle is shown in FIG. 13F, and examples of GSE are not limited to this single example.

Some examples of this toy can have remote control methods for moving and monitoring toy aircraft and GSE. Other embodiments of this airport toy permit toy aircraft, other vehicles (GSE), any combination of toy aircraft and GSE to be controlled remotely by users when aircraft and other vehicles are on the surfaces of the airport. Remote-control features are in addition to other existing features and infrastructure of the underlying toy airport, as previously described with hand-manipulated aircraft and vehicles.

In other examples, movement of aircraft, GSE, or both aircraft and GSE can be controlled by an individual user from their smart device. For example, smart phones, tablets, smart watches, or similar smart devices can use an installed smart device application or "app" for use with this airport toy.

Further regarding movement of the aircraft/GSE, travel paths for one or more aircraft/vehicle are determined and directed by mechanical limitations and/or controlling circuits. In this example, the path can be similar to what a pilot would experience at a real runway and airport environment. The user is allowed and encouraged to follow the directives given by the toy's electronic systems control module which would represent an ATT (Airport Traffic Tower).

Planes/aircraft/GSE can have embedded motors to enable locomotion off and on a playing surface.

FIG. 13C depicts a toy helicopter (some versions for toy helicopters are called "quadcopter". Some examples of the airport toy feature a heliport pad for vertical takeoff and landing of toy helicopters. Some examples of toy helicopters can move with forward (lateral) motion could also be used with the toy airport system. More than one player can be using one or more helicopters at any one time.

In addition, the toy airport can have one or more location-detecting sensors, for sensing aircraft and GSE. These sensors can provide interactive signaling to the toy airport system (and therefore to the user) to enhance interactive play. The aircraft and GSE locations, as related to the positions on the airport layout, can produce predictive information for the toy, for example to track positions in real time to alert the user of potential hazards from a simulation context. This can further enhance realism. Illustratively, FIG. 13A has one of more sensors 1311 shown as dotted-line rectangles, FIG. 13B has one or more sensors 1312, FIG. 13C has one or more sensors 1313. FIG. 13F has one or more sensors 1314, and the power module 1302 of FIG. 13D has one or more sensors 1320.

Embodiments of this toy can use Hall-effect sensors (or comparable devices) for determining locations, motion, and direction-of-motion of the toy aircraft and ground support equipment (GSE) on or near the playing surface of the airport toy. One or more sensors may be embedded in one or more modules. Sensors can be interfaced to an electronic systems control module. Other types of sensing technologies may include and are not limited to RFID sensors, NFC sensors, and capacitive sensors, or any combination of active and passive sensors.

RFID can be used on one, many, or all individual pieces of the toy, so that the toy can monitor in real-time the status of the overall assembly (how many aircraft, how many GSE, how many accessories, status of aircraft and GSE, and status of airport).

Bluetooth and also BLE (Bluetooth low energy)

Subheading: Further Considerations

An airport toy can also have cameras in one or more aircraft, GSEs, or ATT, so that the user can "see" in real time. In some examples, video can be recorded over time. In some examples, this camera can be smart device enabled. One or more users can use a single camera.

Figure 23:
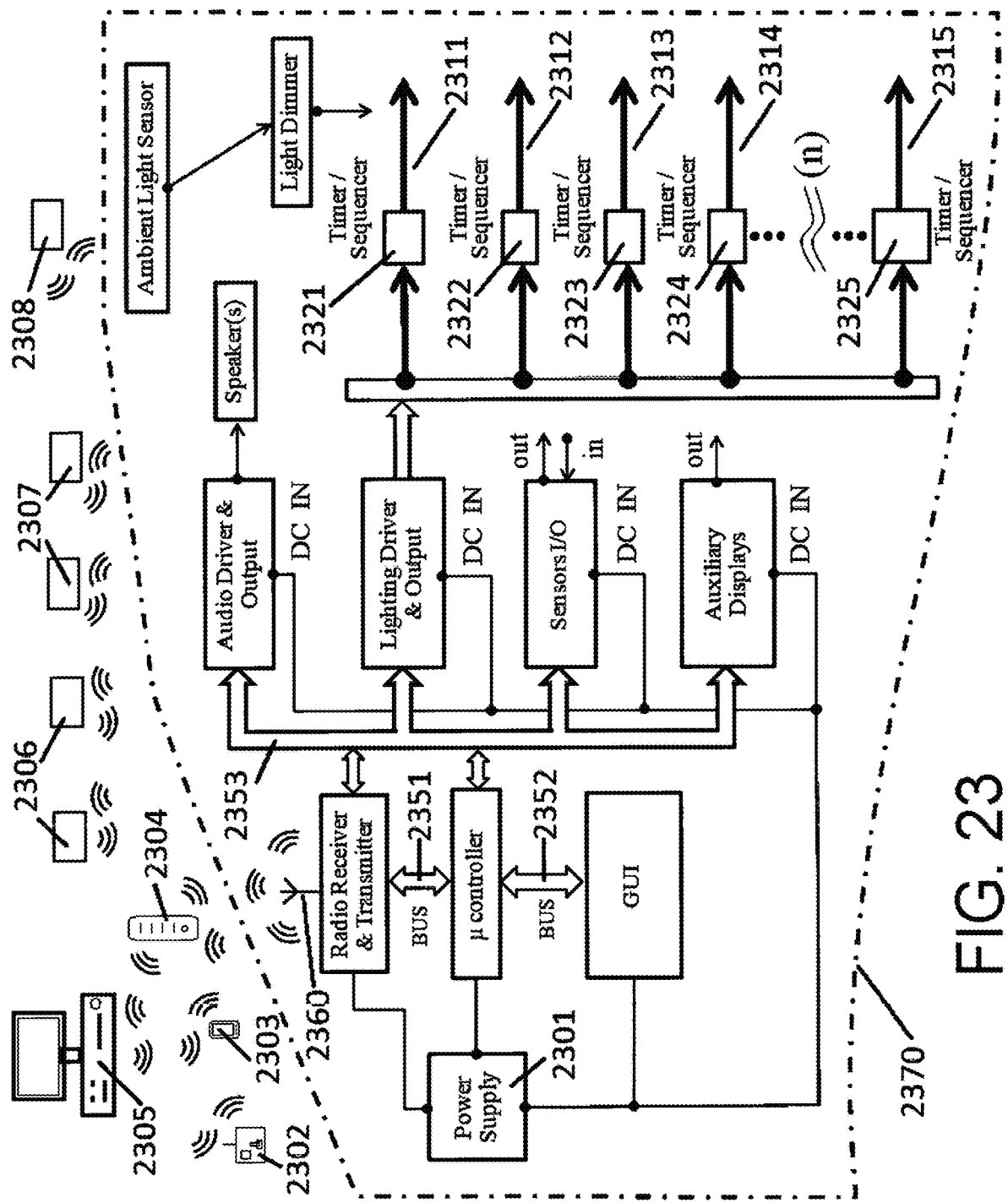
FIG. 23 shows a block diagram of example possible electrical circuits and components used for supplying electrical support for the toy; including, but not limited to, electronics for power, data, communications, and timings, for airport toy features and accessories.

FIG. 23 shows an example block diagram for some of the electronics for the toy airport system. An example electronic systems control module 2370 is shown. The power supply 2301 depicted can in some examples be connected to an AC mains, and can either be integrated within the electronics system control module or exist as a separate subsystem. Electrical power (DC, AC, or both) can be external to the toy airport system and connected to the toy using appropriate cabling/wiring. Some or all of the elements depicted in FIG. 23 can be housed in one or more modules of the toy airport system. An antenna system 2360 is shown. Also shown symbolically are some examples of a plurality of possible external devices that can be connected to the airport toy, such as communication devices, communication busses, or both, either through wireless means (shown) or wired means (not shown). These devices include optional remote control 2302, optional smart device 2303, optional wireless and/or wired router 2304, optional PC 2305, aircrafts 2306, users' headset 2308, and ground support vehicles 2307. Optical means of connection (fiber optic cables, for example) can be used. The connections of one or more external devices to the toy can be simultaneous, i.e., connected to the toy at the same time. Smart devices can be connected to the toy through wireless means (wireless network or Wi-Fi, Bluetooth, BLE, for example, and not limited to these). Any or all external devices (PC, smart devices), can be connected to the Internet. The airport toy itself can be connected to the Internet, either through a LAN or directly. The electronic system control module 2370 can have a plurality of busses 2351, 2352, 2353 for electrically connecting its various subsystems. Further considering FIG. 23, a plurality of timer/sequencers 2321, 2322, 2323, 2324, 2325 are each connected via a signal bus or busses for powering "n" possible individual lights, light arrays, or combination of "n" possible individual lights and light arrays 2311, 2312, 2313, 2314, 2315, where "n" is a whole number, indicating one or more.

Note the (magnetic) connectors can be made to make a single continuous electrical connection between each pair of magnetic connectors. With this, voltage lines, ground lines, and communication lines can be established throughout the toy, permitting the lighting of the LEDs. Moreover, each, any, or selected DC lines could support a higher-frequency DSL-like communication signal. Also, simple DC lines (12V and ground) could be used to drive a set of LEDs. In addition, a third line, supporting a relay signal, could be used for switching the takeoff and landing lighting patterns of the LEDs. Moreover, a third line could be used for data (serial) communications. Examples of perspective views of modules with more than two connectors on connecting faces are shown in FIGS. 9A-9C and FIGS. 21A-21B. In summary, connectors can be capable of handling many electronics-based tasks, beyond AC power, DC power or a combination of AC and DC power.

The modules can be fabricated from any suitable material, for example, the modules can be made from any combination of plastic, polymeric, metal, alloys, circuit board materials. The toy's modules could be made from any material or combination of materials. Or, the toy's modules can be made from a combination of flexible circuit board and rigid circuit board.

The LED strings, LED layouts, circuit boards, or any part of the toy can be waterproof or water resistant, or resistant to spilled liquids (liquid resistant) The toy's lighting, for example, can be LEDs or 2D grids of LEDs, or LCD's, or a flat-panel display for the top-surface of each module.

The magnetic electrical connectors are not substantially protruding, but are attached individually to the modules with some provision for each connector to move independently (freely, float) in the x, y, and z direction as to provide some play or ability for self-adjustment. Thus, the individual connectors can be made without high mechanical tolerances. However, the connectors can protrude a little beyond the face or surface of the module, resulting in up to a two-mm gap between module sections. In other words, the toy is mechanically secure, but having play (in other words, having mechanical tolerances in its assembly). The modules are attached together mechanically by each set of magnetic pair connectors within the modules, so that the mating board can easily make the electrical connections without tight mechanical tolerances. In addition, spring-loaded connectors can be used, with or without magnets.

Figure 19A:
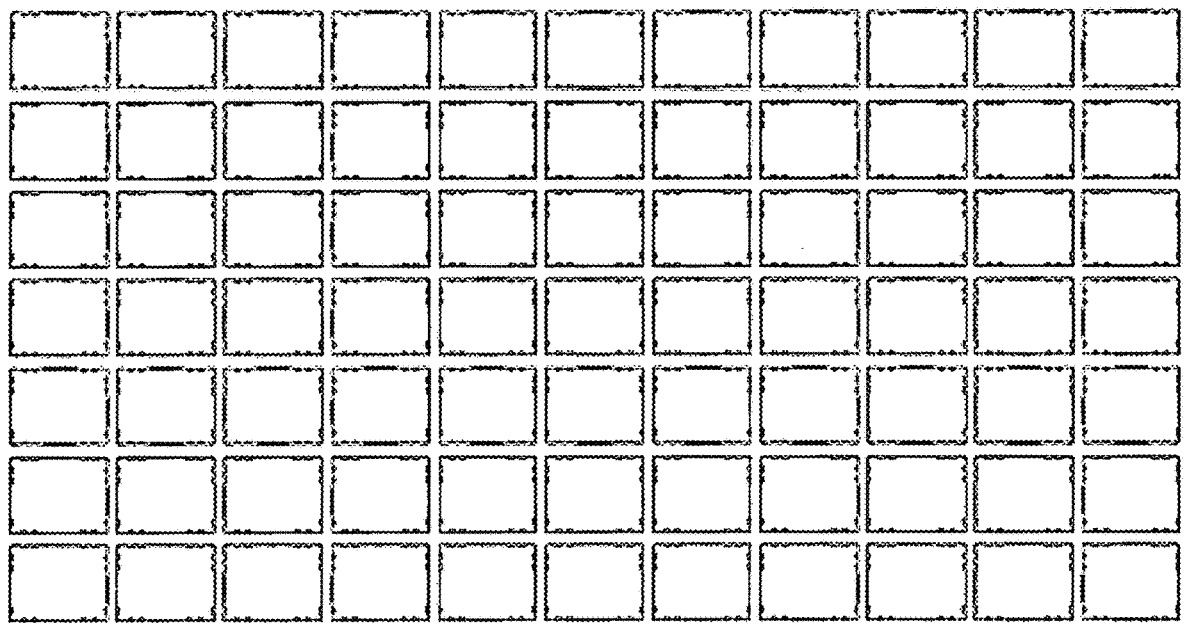
FIGS. 19A-19B show overhead views of an example of this disclosure showing of a grid of connectable modules.
Figure 19B:
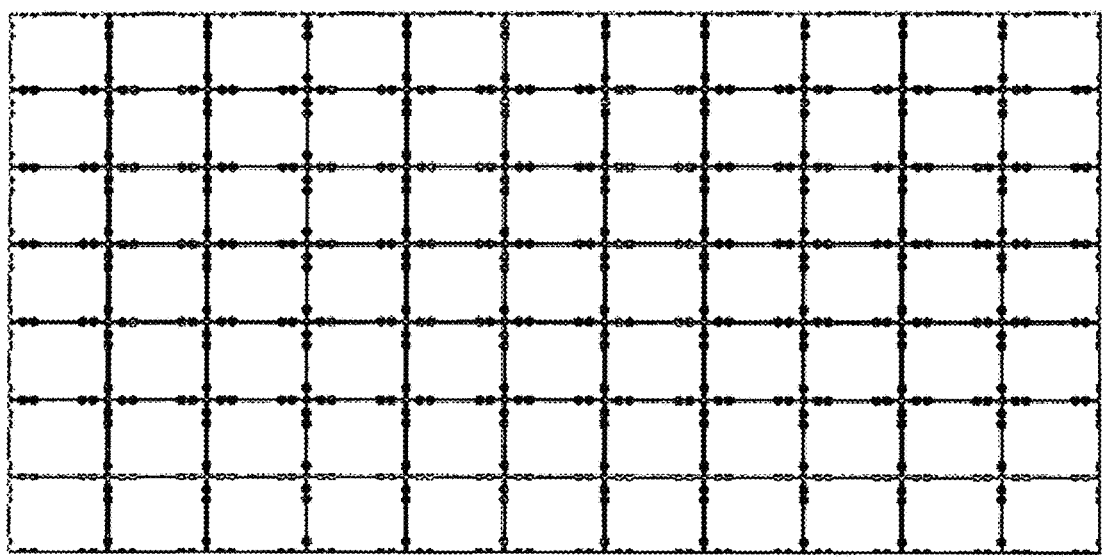

Referring to FIGS. 19A-19B, modules can be laid out in a matrix or grid pattern. FIG. 19A shows a plurality of modules in proximity to each other without being connected. FIG. 19B show a plurality of modules connected to each other, forming a grid pattern meaning that the modules are laid out in a two-dimensional grid style. Consider FIG. 22, overlaying the grid-style module layout, as shown in a replaceable cover or mat can be positioned. This cover can have areas that are any combination of transparent, translucent, or opaque, and in any color scheme.

Further embodiments of the toy airport system include an RF (radio-frequency) wireless communication accessory for communicating between toy aircraft, tower, and users. An RF communication device example is a hand-held RF remote control. Another example is the Donglo RF transociver module, and could use a USB-style connector.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and various embodiments, will be apparent to those of skill in the art upon reviewing the above description. The scope of the present subject matter should be determined with reference to the appended claims, along with the full scope of equivalents to which such claims are entitled.

The toy airport system can have accessories and accessory modules. An example of an accessory module is a heliport. This accessory module can have features that include and are not limited to pressure sensors, motion sensors, and tarmac lighting. Optional pressure sensors can be used to measure impact, for example to measure soft landings and hard landings while the user is landing aircraft on to the playing surface. These pressure sensing and motion sensing features can be used to test a user's ability to land a hand-held toy, a wired toy helicopter, or a wirelessly controlled toy helicopter and to sense and communicate that a helicopter has landed or taken off.

Accessories are placed on top of one or more modules or on top of the playing surface, and accessory modules can be connected to the edge-faces of modules.

Optical connectors, for example for fiber-optic lighting or communications, can also be used—in combination with of electrically conductive wiring—for any combination of sensors, communication, lighting, or module to module connections. Any light source and light transmission medium can be used, for example, and not limited to the following: LED, laser diodes, fiber-optic cable, fiber-optic bundles, using Infrared, visible, or any part of the spectrum.

The airport toy, m some examples, can have date embedded (or recorded) to produce sounds, sound scripts, or sound-bites, to add to the realism. For example, a player can listen to recorded sounds of aircraft, airport traffic tower (ATT), flight controllers, and to select channels from which to listen. This audio could be one way (from toy to user) or multi-way (from toy to users, from users to toy). In some examples, a user can also listen to local airport weather conditions (in real time), or other real airport channels (in real time).

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although this invention has been described with reference to particular embodiments and examples, other modifications and variations will occur to those skilled in the art in view of the above teachings. It should be understood that, within the scope of the appended claims, this invention may be practiced otherwise than as specifically described.

I claim:

1. A toy airport apparatus comprising:
   a runway structure with a first end and a second end, where said runway structure is straight along its length from said first end to said second end;
   said runway structure comprises more than one runway module, where each said runway module comprises a right rectangular parallelepiped shape with a top surface, a bottom surface, a far edge-face, a near edge-face, a left edge-face, and a right edge-face, each said runway module comprises a centerline from said far edge-face to said near edge-face, said runway structure is assembled by aligning said centerline of each said runway module and connected each said runway module in series from said far edge-face of one said runway module to said near edge-face of another said runway module;
   where each said runway module comprises a vertically layered structure, where said vertically layered structure comprises stacked, distinct, parallel layers defining one base section, at least one middle section, and one top section;
   where each said top section comprises a planar continuous top surface, where said planar continuous top surface comprises a total top surface area;
   where said runway structure further comprises a first runway approach module located at said first end and a second runway approach module located at said second end;
   where each said runway approach module is 50% narrower in width than a maximum width of each said runway module;
   where each said runway module is electrically connected to each other through at least one electrical connection;
   where said at least one electrical connection supports electronics on said at least one middle section, where said at least one middle section comprises an electronics layer that controls an interactive runway lighting structure comprised of at least one set of updatable environmental data, at least one embedded firmware program, and at least one set of runway lights;
   where said top section comprises a planar translucent layer without discontinuities;
   where said interactive runway lighting structure is positioned on said electronics layer below said planar translucent layer; and
   where said interactive runway lighting structure emanates light through said top section planar translucent layer.

2. The toy airport apparatus of claim 1 where the runway lighting structure is bidirectional for landing.

3. The toy airport apparatus of claim 1 where said toy airport apparatus further comprises a planar light diffusing layer positioned between said planar translucent layer without discontinuities and said interactive runway lighting structure; where said interactive runway lighting structure emanates light through said planar light diffusing layer and through said top section planar translucent layer.

4. The toy airport apparatus of claim 3 where the runway lighting structure is bidirectional for landing.

* * * * *